US009448900B2

(12) United States Patent
Gordon et al.

(10) Patent No.: US 9,448,900 B2
(45) Date of Patent: Sep. 20, 2016

(54) SYSTEM AND METHOD FOR DATACENTERS DISASTER RECOVERY

(71) Applicant: STORONE LTD., Ra'anana (IL)

(72) Inventors: Raz Gordon, Hadera (IL); Tal Kipnis, Givaatayim (IL); Guy Loewenberg, Givataim (IL)

(73) Assignee: STORONE LTD., Ra'anana (IL)

( * ) Notice: Subject to any disclaimer, the term of this patent is extended or adjusted under 35 U.S.C. 154(b) by 76 days.

(21) Appl. No.: 14/411,251

(22) PCT Filed: Jun. 25, 2013

(86) PCT No.: PCT/IL2013/050548
§ 371 (c)(1),
(2) Date: Dec. 24, 2014

(87) PCT Pub. No.: WO2014/002094
PCT Pub. Date: Jan. 3, 2014

(65) Prior Publication Data
US 2015/0254150 A1    Sep. 10, 2015

Related U.S. Application Data

(60) Provisional application No. 61/663,859, filed on Jun. 25, 2012.

(51) Int. Cl.
*G06F 11/00*    (2006.01)
*G06F 11/20*    (2006.01)
(Continued)

(52) U.S. Cl.
CPC ....... *G06F 11/2094* (2013.01); *G06F 11/1402* (2013.01); *G06F 11/1446* (2013.01);
(Continued)

(58) Field of Classification Search
CPC .......... G06F 11/1469; G06F 11/1446; G06F 11/1402; G06F 11/1461
See application file for complete search history.

(56) References Cited

U.S. PATENT DOCUMENTS 5,987,505 A    11/1999  Fry et al.
6,538,669 B1    3/2003  Lagueux, Jr. et al.
(Continued)

FOREIGN PATENT DOCUMENTS

JP    2002-182859 A    6/2002
JP    2002-312699 A    10/2002
(Continued)

OTHER PUBLICATIONS

He, Xubin et al., Journal of Parallel and Distrubuted Computing, STICS: SCSI-to-IP cache for storage area networks, 2004, 64(9), pp. 1069-1085.
(Continued)

*Primary Examiner* — Charles Ehne
(74) *Attorney, Agent, or Firm* — Oliff PLC

(57) ABSTRACT

A method for configuring an asynchronous Disaster Recovery (DR) process over a storage system comprising a plurality of storage sites, the method comprising: receiving data indicative of the storage sites; calculating information dispersal parameters that enable dispersing slices of DR enabling data based on original data written to a primary storage site out of the storage sites between at least two DR storage sites out of the storage sites, wherein at least one of the DR storage sites is a remote storage site, wherein each of the slices of DR enabling data is smaller than the original data and wherein the DR enabling data is larger than the original data; and configuring the asynchronous DR process in accordance with the calculated information dispersal parameters.

16 Claims, 27 Drawing Sheets

(51) Int. Cl.
*G06F 11/14* (2006.01)
*G06F 11/34* (2006.01)
*G06F 11/16* (2006.01)

(52) U.S. Cl.
CPC ....... *G06F11/1461* (2013.01); *G06F 11/1469* (2013.01); *G06F 11/1662* (2013.01); *G06F 11/3433* (2013.01); *G06F 11/3485* (2013.01); *G06F 11/1464* (2013.01); *G06F 2201/81* (2013.01); *G06F 2201/82* (2013.01); *G06F 2201/88* (2013.01); *G06F 2201/885* (2013.01)

(56) References Cited

U.S. PATENT DOCUMENTS

| | | | |
|---|---|---|---|
| 6,804,819 B1 | 10/2004 | Bates et al. | |
| 6,907,501 B2 | 6/2005 | Tariq et al. | |
| 6,977,927 B1 | 12/2005 | Bates et al. | |
| 7,178,055 B2 * | 2/2007 | Ji | G06F 11/2069 711/162 |
| 7,418,624 B2 * | 8/2008 | Ichikawa | G06F 11/2033 714/13 |
| 7,434,002 B1 | 10/2008 | Zedlewski et al. | |
| 7,463,648 B1 | 12/2008 | Eppstein et al. | |
| 7,525,957 B2 | 4/2009 | Scherer et al. | |
| 7,577,868 B2 | 8/2009 | Aidun | |
| 7,584,337 B2 | 9/2009 | Rowan et al. | |
| 7,594,002 B1 | 9/2009 | Thorpe et al. | |
| 7,702,757 B2 | 4/2010 | Bergman et al. | |
| 7,831,773 B2 | 11/2010 | Zedlewski et al. | |
| 7,992,031 B2 | 8/2011 | Chavda et al. | |
| 8,176,358 B2 | 5/2012 | Bensinger | |
| 8,194,339 B2 | 6/2012 | Wilson | |
| 8,386,834 B1 * | 2/2013 | Goel | G06F 11/0727 714/6.1 |
| 8,417,987 B1 * | 4/2013 | Goel | G06F 11/1076 714/6.1 |
| 2002/0004912 A1 | 1/2002 | Fung | |
| 2002/0152181 A1 | 10/2002 | Kanai et al. | |
| 2002/0156984 A1 | 10/2002 | Padovano | |
| 2003/0131068 A1 | 7/2003 | Hoshino et al. | |
| 2003/0135609 A1 | 7/2003 | Carlson et al. | |
| 2003/0145038 A1 | 7/2003 | Bin Tariq et al. | |
| 2003/0188085 A1 | 10/2003 | Arakawa et al. | |
| 2004/0006589 A1 | 1/2004 | Maconi et al. | |
| 2004/0039959 A1 * | 2/2004 | LeCrone | G06F 11/2094 714/6.3 |
| 2004/0111514 A1 | 6/2004 | Chase et al. | |
| 2004/0123062 A1 | 6/2004 | Dalal et al. | |
| 2004/0230753 A1 | 11/2004 | Amiri et al. | |
| 2005/0027938 A1 | 2/2005 | Burkey | |
| 2005/0081086 A1 | 4/2005 | Williams | |
| 2005/0278360 A1 | 12/2005 | Boyd et al. | |
| 2006/0041644 A1 | 2/2006 | Henseler | |
| 2006/0129759 A1 | 6/2006 | Bartlett et al. | |
| 2006/0236061 A1 | 10/2006 | Koclanes | |
| 2008/0091843 A1 | 4/2008 | Kulkarni | |
| 2008/0168432 A1 | 7/2008 | Ayachitula et al. | |
| 2008/0209142 A1 | 8/2008 | Obernuefemann | |
| 2008/0313242 A1 | 12/2008 | Doerr | |
| 2009/0049328 A1 | 2/2009 | Hattori et al. | |
| 2009/0055689 A1 | 2/2009 | Petersen | |
| 2009/0070337 A1 | 3/2009 | Romem et al. | |
| 2009/0132543 A1 | 5/2009 | Chatley et al. | |
| 2010/0254347 A1 | 10/2010 | Muhanna et al. | |
| 2011/0153770 A1 | 6/2011 | Antani et al. | |
| 2012/0072723 A1 | 3/2012 | Orsini et al. | |
| 2012/0284556 A1 * | 11/2012 | Akirav | G06F 11/1456 714/4.11 |
| 2013/0042260 A1 | 2/2013 | Challenger et al. | |
| 2013/0290399 A1 | 10/2013 | Gordon | |
| 2013/0326308 A1 * | 12/2013 | Angelopoulos | H03M 13/373 714/758 |

FOREIGN PATENT DOCUMENTS

| | | |
|---|---|---|
| JP | 2003-289327 A | 10/2003 |
| JP | 2003-296039 A | 10/2003 |
| JP | 2005-050007 A | 2/2005 |
| JP | 2005-050303 A | 2/2005 |
| WO | 02/067529 A2 | 8/2002 |
| WO | 2005/076120 A1 | 8/2005 |
| WO | 2007-114887 A1 | 10/2007 |
| WO | 2009/114310 A1 | 9/2009 |
| WO | 2012/104847 A1 | 8/2012 |

OTHER PUBLICATIONS

Kim, Song-Kyoo "Enhanced management method of storage area network (SAN) server with random remote backups", Mathematical and Computer Modelling, 2005, 42(9-10), pp. 947-958.

Wang et al., "Design and development of Ethernet-based storage area network protocol", Networks, 2004, 1, pp. 48-52.

Walker, Cameron G. et al., A Single-edge formulation with problem-specific cuts, Core-Edge design of storage area networks, Computers & Operations Research, 2010, 37(5), pp. 916-926.

Burns, Randal Chilton, "Data management in a distrubuted file system for storage area networks", University of California, Santa Cruz, 2000.

Banikazemi et al., "Storage-Based Intrusion Detection for Storage Area Networks (SANs)", Mass Storage Systems and Technologies, 2005, pp. 118-127.

Molero et al., "Performance analysis of storage area networks using high-speed LAN interconnects", Networks, 2000, pp. 474-478.

Wezel et al., "Nuclear Instruments and Methods in Physics Research Section A: Accelerators, Sepctrometers, Detectors and Associated Equipment", First experiences with large SAN storage and Linux, 2004, 534(1-2), pp. 29-32.

Ari et al., "SANBoost: automated SAN-level caching in storage area network", Autonomic Computing, 2004, pp. 164-171.

C. DeCusatis, "Optical Fiber Communication Conference and Exhibit", Storage area network applications, 2002, pp. 443-444.

Jin, Yang et al., "Computer Engineering", Performance Testing of Storage Area Network, 2003.

Oct. 2010 "New Storage Solution Description"; Glasshouse.

Patil et al., "Unified Virtual Storage: Virtualization of Distrubuted Storage in a Network"; International Journal of Computer Applications, vol. 1, pp. 30-33.

* cited by examiner

SYSTEM AND METHOD FOR DATACENTERS DISASTER RECOVERY

FIELD OF THE PRESENTLY DISCLOSED SUBJECT MATTER

This invention relates to the field of datacenters, and more specifically to the field of datacenters disaster recovery.

BACKGROUND

Nowadays, Datacenters Disaster Recovery (DR) systems replicate the data stored in one or more datacenters acting as primary storage sites to at least one datacenter acting as a DR storage site. In many cases, the data is replicated to multiple datacenters acting as DR storage sites. Replicating the data stored in the primary storage sites to multiple DR storage sites can be costly, in terms of storage space, bandwidth consumption, etc.

There is thus a need in the art for a new system and method for datacenters disaster recovery.

References considered to be relevant as background to the presently disclosed subject matter are listed below. Acknowledgement of the references herein is not to be inferred as meaning that these are in any way relevant to the patentability of the presently disclosed subject matter.

U.S. Pat. No. 7,992,031 (Chavda et al.) issued Aug. 2, 2011 discloses a system and associated method for automated disaster recovery (DR) planning. A DR planning process receives disaster recovery requirements and a target environment configuration from a user to design DR plans for the target environment configuration that meets disaster recovery requirements. The DR planning process accesses a knowledgebase containing information on replication technologies, best practice recipes, and past deployment instances. The DR planning process creates the DR plans by analyzing the disaster recovery requirements into element risks, associating replication technologies to protect each element risks, combining associated replication technologies based on the best practice recipes, and selecting highly evaluated combination based on the past deployment instances. The DR planning process presents the DR plans as classified by replication strategy-architecture combination for each DR plans and marks how strongly each DR plans are recommended.

US Patent application No. 2009/0055689 (Peterson) published on Feb. 26, 2009 discloses systems, methods and computer products for coordinated disaster recovery of at least one computing cluster site. According to exemplary embodiments, a disaster recovery system may include a computer processor and a disaster recovery process residing on the computer processor. The disaster recovery process may have instructions to monitor at least one computing cluster site, communicate monitoring events regarding the at least one computing cluster site with a second computing cluster site, generate alerts responsive to the monitoring events on the second computing cluster site regarding potential disasters, and coordinate recovery of the at least one computing cluster site onto the second computing cluster site in the event of a disaster.

SUMMARY

In accordance with an aspect of the presently disclosed subject matter, there is provided a method for configuring an asynchronous Disaster Recovery (DR) process over a storage system comprising a plurality of storage sites, the method comprising:

receiving data indicative of the storage sites;

calculating information dispersal parameters that enable dispersing slices of DR enabling data based on original data written to a primary storage site out of the storage sites between at least two DR storage sites out of the storage sites, wherein at least one of the DR storage sites is a remote storage site, wherein each of the slices of DR enabling data is smaller than the original data and wherein the DR enabling data is larger than the original data; and configuring the asynchronous DR process in accordance with the calculated information dispersal parameters.

In accordance with an embodiment of the presently disclosed subject matter, there is provided a method further comprising receiving a Service Level Specification (SLS) including DR requirements to be met by the DR process and wherein the information dispersal parameters are calculated also based on the SLS in order to enable dispersing the slices of DR enabling data while meeting the SLS.

In accordance with an embodiment of the presently disclosed subject matter, there is provided a method wherein the DR requirements include data indicative of a number of storage sites that are allowed to fail out of the plurality of storage sites, so that following dispersing the slices of DR enabling data the original data can be reconstructed by utilizing the slices of DR enabling data stored within remaining storage sites out of the plurality of storage sites should the allowed number of storage sites fail.

In accordance with an embodiment of the presently disclosed subject matter, there is provided a method wherein the remote storage site is located at least in a distance that causes at least a 20% increase of communication latency between the remote storage site and the primary storage site if working in a synchronous manner.

In accordance with an embodiment of the presently disclosed subject matter, there is further provided a method wherein at least two of the plurality of storage sites are primary storage sites.

In accordance with an embodiment of the presently disclosed subject matter, there is yet further provided a method wherein at least one of the storage sites acts simultaneously as the primary storage site and as one of the DR storage sites for a second primary storage site of the primary storage sites.

In accordance with an embodiment of the presently disclosed subject matter, there is yet further provided a method further comprising, in response to a failure to calculate the information dispersal parameters, to provide a user with a failure notification or with a recommendation indicative of an addition of at least one additional storage-related resource which will allow successful calculation of information dispersal parameters.

In accordance with an embodiment of the presently disclosed subject matter, there is yet further provided a method wherein the DR requirements include at least one of a Recovery Point Objective (RPO) and a Recovery Time Objective (RTO).

In accordance with an embodiment of the presently disclosed subject matter, there is yet further provided a method wherein the DR requirements include an information dispersal model.

In accordance with an embodiment of the presently disclosed subject matter, there is yet further provided a method wherein the information dispersal parameters are calculated also based on dynamic behavior of the storage system.

In accordance with an embodiment of the presently disclosed subject matter, there is yet further provided a method further comprising, upon the SLS being breached, recalculating the information dispersal parameters.

In accordance with an embodiment of the presently disclosed subject matter, there is yet further provided a method wherein the information dispersal parameters include data indicative of a size difference between the written blocks and the DR enabling data, data indicative of a number of slices to slice the DR enabling data into in order to give rise to the slices of DR enabling data and data indicative of a destination storage site of the at least two DR storage sites for dispersing the slices of DR enabling data to.

In accordance with an embodiment of the presently disclosed subject matter, there is yet further provided a method wherein the storage system is a distributed storage system comprising an infrastructure layer including interconnected computer nodes and wherein the method further comprises operating a computer node, configured to being connected to the infrastructure layer, for:

receiving at least one Service Level Specification (SLS) comprising user-defined storage requirements referring to at least one logical storage entity, and storage-related resources parameters data relating to one or more storage-related resources connected to the interconnected computer nodes;

calculating a configuration for the distributed storage system based, at least, on the at least one SLS and the storage-related resources parameters data; and automatically allocating at least part of one of the storage-related resources according to the calculated configuration.

In accordance with an aspect of the presently disclosed subject matter, there is yet further provided a computer node configured to configure an asynchronous Disaster Recovery (DR) process over a storage system comprising a plurality of storage sites, the computer node comprising at least one processing resource configured to:

receive data indicative of the storage sites;

calculate information dispersal parameters that enable dispersing slices of DR enabling data based on original data written to a primary storage site out of the storage sites between at least two DR storage sites out of the storage sites, wherein at least one of the DR storage sites is a remote storage site, wherein each of the slices of DR enabling data is smaller than the original data and wherein the DR enabling data is larger than the original data; and configure the asynchronous DR process in accordance with the calculated information dispersal parameters.

In accordance with an embodiment of the presently disclosed subject matter, there is yet further provided a computer node wherein the at least one processing resource is further configured to receive a Service Level Specification (SLS) including DR requirements to be met by the DR process and wherein the information dispersal parameters are calculated also based on the SLS in order to enable dispersing the slices of DR enabling data while meeting the SLS.

In accordance with an embodiment of the presently disclosed subject matter, there is yet further provided a computer node wherein the DR requirements include data indicative of a number of storage sites that are allowed to fail out of the plurality of storage sites, so that following dispersing the slices of DR enabling data the original data can be reconstructed by utilizing the slices of DR enabling data stored within remaining storage sites out of the plurality of storage sites should the allowed number of storage sites fail.

In accordance with an embodiment of the presently disclosed subject matter, there is yet further provided a computer node wherein the remote storage site is located at least at a distance that causes at least a 20% increase of communication latency between the remote storage site and the primary storage site if working in a synchronous manner.

In accordance with an embodiment of the presently disclosed subject matter, there is yet further provided a computer node wherein at least two of the plurality of storage sites are primary storage sites.

In accordance with an embodiment of the presently disclosed subject matter, there is yet further provided a computer node wherein at least one of the storage sites acts simultaneously as the primary storage site and as one of the DR storage sites for a second primary storage site of the primary storage sites.

In accordance with an embodiment of the presently disclosed subject matter, there is yet further provided a computer node wherein the at least one processing resource is further configured, in response to a failure to calculate the information dispersal parameters, to provide a user with a failure notification or with a recommendation indicative of an addition of at least one additional storage-related resource which will allow successful calculation of information dispersal parameters.

In accordance with an embodiment of the presently disclosed subject matter, there is yet further provided a computer node wherein the DR requirements include at least one of a Recovery Point Objective (RPO) and a Recovery Time Objective (RTO).

In accordance with an embodiment of the presently disclosed subject matter, there is yet further provided a computer node wherein the DR requirements include an information dispersal model.

In accordance with an embodiment of the presently disclosed subject matter, there is yet further provided a computer node wherein the information dispersal parameters are calculated also based on dynamic behavior of the storage system.

In accordance with an embodiment of the presently disclosed subject matter, there is yet further provided a computer node wherein the at least one processing resource is further configured, upon the SLS being breached, to recalculate the information dispersal parameters.

In accordance with an embodiment of the presently disclosed subject matter, there is yet further provided a computer node wherein the information dispersal parameters include data indicative of a size difference between the written blocks and the DR enabling data, data indicative of a number of slices to slice the DR enabling data into in order to give rise to the slices of DR enabling data and data indicative of a destination storage site of the at least two DR storage sites for dispersing the slices of DR enabling data to.

In accordance with an embodiment of the presently disclosed subject matter, there is yet further provided a computer node wherein the storage system is a distributed storage system comprising an infrastructure layer including interconnected computer nodes and wherein the wherein the at least one processing resource is further configured to:

receive at least one Service Level Specification (SLS) comprising user-defined storage requirements referring to at least one logical storage entity, and storage-related resources parameters data relating to one or more storage-related resources connected to the interconnected computer nodes;

calculate a configuration for the distributed storage system based, at least, on the at least one SLS and the storage-related resources parameters data; and automatically allocate at least part of one of the storage-related resources according to the calculated configuration.

In accordance with an aspect of the presently disclosed subject matter, there is yet further provided a method for asynchronously dispersing Disaster Recovery (DR) enabling data between a plurality of storage sites, the method comprising:

receiving, at a primary storage site of the plurality of storage sites, a written block and a write frequency counter associated with the written block, wherein the write frequency counter is indicative of a number of writes to the written block within a certain time window;

in case the write frequency counter is below a threshold, performing the following:

receiving information dispersal parameters including: (a) a number indicative of a size difference between the written block and DR enabling data based on the written block (b) a number of slices to slice the DR enabling data into and (c) data indicative of DR storage sites of the plurality of storage sites for storing the slices, wherein at least one of the DR storage sites is a remote storage site and wherein the DR storage sites are associated with the primary storage site;

calculating the DR enabling data, based on the written block wherein the DR enabling data is larger than the written block by the size difference;

slicing the DR enabling data in accordance with the number of slices; and dispersing the slices in accordance with the data indicative of the DR storage sites.

In accordance with an embodiment of the presently disclosed subject matter, there is yet further provided a method further comprising, in case the write frequency indicator is above the threshold, caching the written block at the primary storage site and increasing an overwrite counter associated with the written block.

In accordance with an embodiment of the presently disclosed subject matter, there is yet further provided a method further comprising:

receiving an indication of available bandwidth between the primary storage site and at least one of the DR storage sites;

selecting a cached block to disperse to the at least one of the DR storage sites;

dispersing slices of DR enabling data based on the cached block to the at least one of the DR storage sites, respectively, based on the data indicative of the DR storage sites of the plurality of storage sites for storing the slices.

In accordance with an embodiment of the presently disclosed subject matter, there is yet further provided a method wherein the cached block is associated with the lowest overwrite counter.

In accordance with an embodiment of the presently disclosed subject matter, there is yet further provided a method wherein the primary storage site comprises a plurality of cached blocks and wherein the method further comprises:

receiving a cache flush request;

dispersing slices of DR enabling data based on each of the plurality of cached blocks to the DR storage sites, respectively.

In accordance with an embodiment of the presently disclosed subject matter, there is yet further provided a method further comprising:

receiving acknowledgements indicative of write success from each of the DR storage sites;

upon receipt of acknowledgements from each of the DR storage sites, sending a consistent generation number notification to the primary storage site and to the DR storage sites, wherein the consistent generation number notification is indicative of a generation number for which the primary storage site and the DR storage sites are consistent.

In accordance with an embodiment of the presently disclosed subject matter, there is yet further provided a method further comprising receiving a Service Level Specification (SLS) including DR requirements, wherein the information dispersal parameters are calculated also based on the SLS in order to enable dispersing the slices while meeting the SLS.

In accordance with an embodiment of the presently disclosed subject matter, there is yet further provided a method further comprising recalculating the information dispersal parameters upon breach of the SLS.

In accordance with an embodiment of the presently disclosed subject matter, there is yet further provided a method wherein the threshold is pre-determined or calculated.

In accordance with an aspect of the presently disclosed subject matter, there is yet further provided a computer node configured to asynchronously disperse Disaster Recovery (DR) enabling data between a plurality of storage sites, the computer node comprising at least one processing resource configured to:

receive, at a primary storage site of the plurality of storage sites, a written block and a write frequency counter associated with the written block, wherein the write frequency counter is indicative of a number of writes to the written block within a certain time window;

in case the write frequency counter is below a threshold, performing the following:

receive information dispersal parameters including: (a) a number indicative of a size difference between the written block and DR enabling data based on the written block (b) a number of slices to slice the DR enabling data into and (c) data indicative of DR storage sites of the plurality of storage sites for storing the slices, wherein at least one of the DR storage sites is a remote storage site and wherein the DR storage sites are associated with the primary storage site;

calculate the DR enabling data, based on the written block wherein the DR enabling data is larger than the written block by the size difference;

slice the DR enabling data in accordance with the number of slices; and disperse the slices in accordance with the data indicative of the DR storage sites.

In accordance with an embodiment of the presently disclosed subject matter, there is yet further provided a computer node wherein the at least one processing resource is further configured, in case the write frequency indicator is above the threshold, to cache the written block at the primary storage site and increase an overwrite counter associated with the written block.

In accordance with an embodiment of the presently disclosed subject matter, there is yet further provided a computer node wherein the at least one processing resource is further configured to:
  receive an indication of available bandwidth between the primary storage site and at least one of the DR storage sites;
  select a cached block to disperse to the at least one of the DR storage sites;
  disperse slices of DR enabling data based on the cached block to the at least one of the DR storage sites, respectively, based on the data indicative of the DR storage sites of the plurality of storage sites for storing the slices.

In accordance with an embodiment of the presently disclosed subject matter, there is yet further provided a computer node wherein the cached block is associated with the lowest overwrite counter.

In accordance with an embodiment of the presently disclosed subject matter, there is yet further provided a computer node wherein the primary storage site comprises a plurality of cached blocks and wherein the at least one processing resource is further configured to:
  receive a cache flush request;
  disperse slices of DR enabling data based on each of the plurality of cached blocks to the DR storage sites, respectively.

In accordance with an embodiment of the presently disclosed subject matter, there is yet further provided a computer node wherein the at least one processing resource is further configured to:
  receive acknowledgements indicative of write success from each of the DR storage sites;
  upon receipt of acknowledgements from each of the DR storage sites, send a consistent generation number notification to the primary storage site and to the DR storage sites, wherein the consistent generation number notification is indicative of a generation number for which the primary storage site and the DR storage sites are consistent.

In accordance with an embodiment of the presently disclosed subject matter, there is yet further provided a computer node wherein the at least one processing resource is further configured to receive a Service Level Specification (SLS) including DR requirements, wherein the information dispersal parameters are calculated also based on the SLS in order to enable dispersing the slices while meeting the SLS.

In accordance with an embodiment of the presently disclosed subject matter, there is yet further provided a computer node wherein the at least one processing resource is further configured to recalculate the information dispersal parameters upon breach of the SLS.

In accordance with an embodiment of the presently disclosed subject matter, there is yet further provided a computer node wherein the threshold is pre-determined or calculated.

In accordance with an aspect of the presently disclosed subject matter, there is yet further provided a method for recovering from a disaster at a primary storage site, the method comprising:
  (a) selecting a target storage site;
  (b) triggering a consistency check within at least two Disaster Recovery (DR) storage sites storing DR enabling data, each DR storage site storing a portion of the DR enabling data, wherein at least one of the DR storage sites is a remote storage site, and wherein the consistency check is performed for a selected flushed generation number;
  (c) receiving a consistency response from each of the at least two DR storage sites, and, based on the consistency responses, determining, for each of the at least two DR storage sites, consistent DR storage sites of the at least two DR storage sites for the generation number;
  (d) in case the portions of the DR enabling data stored on the consistent DR storage sites enable recovery of at least a portion of data that is inaccessible in the primary storage site, utilizing the portions of the DR enabling data in order to recover, to the target storage site, at least the portion of the data that is inaccessible in the primary storage site as of the generation number;
  (e) in case the portions of the DR enabling data stored on the consistent DR storage sites do not enable recovery of at least the portion of the data that is inaccessible in the primary storage site, iteratively executing stages (b) to (d), each time with respect to an earlier flushed generation number than the generation number of the previous iteration, until finding a consistent generation number.

In accordance with an embodiment of the presently disclosed subject matter, there is yet further provided a method wherein the selected generation number is a highest generation number out of a plurality of flushed generation numbers.

In accordance with an embodiment of the presently disclosed subject matter, there is yet further provided a method wherein the portions of the DR enabling data are received by the DR storage sites asynchronously.

In accordance with an embodiment of the presently disclosed subject matter, there is yet further provided a method wherein the consistency response comprises a counter indicative of a sum of a number of successful write operations and overwrite counters associated therewith, wherein the write operations having a write generation number between the selected flushed generation number and the earlier flushed generation number.

In accordance with an aspect of the presently disclosed subject matter, there is yet further provided a computer node configured to recover from a disaster at a primary storage site, the computer node comprising at least one processing resource configured to:
  (a) select a target storage site;
  (b) trigger a consistency check within at least two Disaster Recovery (DR) storage sites storing DR enabling data, each DR storage site storing a portion of the DR enabling data, wherein at least one of the DR storage sites is a remote storage site, and wherein the consistency check is performed for a selected flushed generation number;
  (c) receive a consistency response from each of the at least two DR storage sites, and, based on the consistency responses, determine, for each of the at least two DR storage sites, consistent DR storage sites of the at least two DR storage sites for the generation number;
  (d) in case the portions of the DR enabling data stored on the consistent DR storage sites enable recovery of at least a portion of data that is inaccessible in the primary storage site, utilize the portions of the DR enabling data in order to recover, to the target storage site, at least the portion of the data that is inaccessible in the primary storage site as of the generation number;
  (e) in case the portions of the DR enabling data stored on the consistent DR storage sites do not enable recovery of at least the portion of the data that is inaccessible in the primary storage site, iteratively execute stages (b) to (d), each time with respect to an earlier flushed generation number than the generation number of the previous iteration, until finding a consistent generation number.

In accordance with an embodiment of the presently disclosed subject matter, there is yet further provided a computer node wherein the selected generation number is a highest generation number out of a plurality of flushed generation numbers.

In accordance with an embodiment of the presently disclosed subject matter, there is yet further provided a computer node wherein the portions of the DR enabling data are received by the DR storage sites asynchronously.

In accordance with an embodiment of the presently disclosed subject matter, there is yet further provided a computer node wherein the consistency response comprises a counter indicative of a sum of a number of successful write operations and overwrite counters associated therewith, wherein the write operations having a write generation number between the selected flushed generation number and the earlier flushed generation number.

In accordance with an aspect of the presently disclosed subject matter, there is yet further provided a method for recovering from a disaster at a primary storage site, the method comprising:
(a) selecting a target storage site;
(b) triggering a consistency check within at least two Disaster Recovery (DR) storage sites storing DR enabling data, each DR storage site storing a portion of the DR enabling data, wherein at least one of the DR storage sites is a remote storage site, and wherein the consistency check is performed for a generation number following an acknowledged consistent generation number;
(c) receiving a consistency response from each of the at least two DR storage sites, and, based on the consistency responses, determining, for each of the at least two DR storage sites, consistent DR storage sites of the at least two DR storage sites for the generation number;
(d) in case the portions of the DR enabling data stored on the consistent DR storage sites enable recovery of at least a portion of data that is inaccessible in the primary storage site, marking the generation number as a consistent generation number;
(e) iteratively executing stages (b) to (d), each time for a following generation number if the at least two DR storage sites are consistent for the generation number.
(f) utilizing the portions of the DR enabling data in order to recover, to the target storage site, at least the portion of the data that is inaccessible in the primary storage site as of the generation number.

In accordance with an embodiment of the presently disclosed subject matter, there is yet further provided a method wherein the selected generation number is a highest generation number out of a plurality of flushed generation numbers.

In accordance with an embodiment of the presently disclosed subject matter, there is yet further provided a method wherein the portions of the DR enabling data are received by the DR storage sites asynchronously.

In accordance with an embodiment of the presently disclosed subject matter, there is yet further provided a method wherein the consistency response comprises a counter indicative of a sum of a number of successful write operations and overwrite counters associated therewith, wherein the write operations having a write generation number between the selected flushed generation number and the earlier flushed generation number.

In accordance with an aspect of the presently disclosed subject matter, there is yet further provided a computer node configured to recover from a disaster at a primary storage site, the computer node comprising at least one processing resource configured to:
(a) select a target storage site;
(b) trigger a consistency check within at least two Disaster Recovery (DR) storage sites storing DR enabling data, each DR storage site storing a portion of the DR enabling data, wherein at least one of the DR storage sites is a remote storage site, and wherein the consistency check is performed for a generation number following an acknowledged consistent generation number;
(c) receive a consistency response from each of the at least two DR storage sites, and, based on the consistency responses, determine, for each of the at least two DR storage sites, consistent DR storage sites of the at least two DR storage sites for the generation number;
(d) in case the portions of the DR enabling data stored on the consistent DR storage sites enable recovery of at least a portion of data that is inaccessible in the primary storage site, marking the generation number as a consistent generation number;
(e) iteratively executing stages (b) to (d), each time for a following generation number if the at least two DR storage sites are consistent for the generation number.
(f) utilizing the portions of the DR enabling data in order to recover, to the target storage site, at least the portion of the data that is inaccessible in the primary storage site as of the generation number.

In accordance with an embodiment of the presently disclosed subject matter, there is yet further provided a computer node wherein the selected generation number is a highest generation number out of a plurality of flushed generation numbers.

In accordance with an embodiment of the presently disclosed subject matter, there is yet further provided a computer node wherein the portions of the DR enabling data are received by the DR storage sites asynchronously.

In accordance with an embodiment of the presently disclosed subject matter, there is yet further provided a computer node wherein the consistency response comprises a counter indicative of a sum of a number of successful write operations and overwrite counters associated therewith, wherein the write operations having a write generation number between the selected flushed generation number and the earlier flushed generation number.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
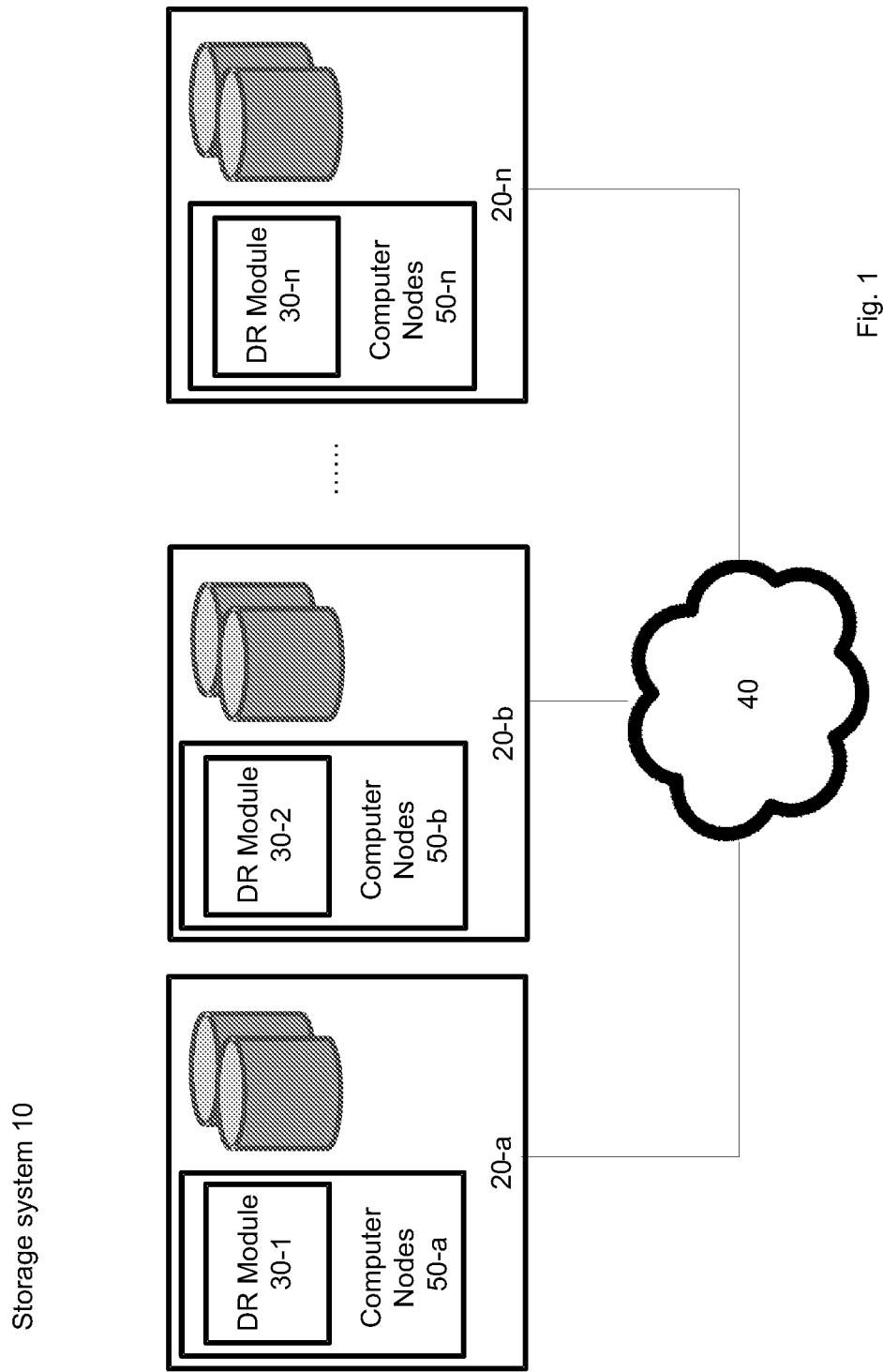
FIG. 1 schematically illustrates a storage system capable of implementing a Disaster Recovery (DR) system according to the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "receiving", "calculating", "configuring", "recalculating", "allocating", "performing", "slicing", "dispersing", "caching", "selecting", "triggering", "utilizing", "marking", "executing" or the like, include action and/or processes of a computer that manipulate and/or transform data into other data, said data represented as physical quantities, e.g. such as electronic quantities, and/or said data representing the physical objects. The term "computer" should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

The operations in accordance with the teachings herein may be performed by a computer specially constructed for the desired purposes or by a general purpose computer specially configured for the desired purpose by a computer program stored in a computer readable storage medium.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

In embodiments of the presently disclosed subject matter, fewer, more and/or different stages than those shown in FIGS. 3-14, 16-18, 20-29, 31-32 and 34-37 may be executed. In embodiments of the presently disclosed subject matter one or more stages illustrated in FIGS. 3-14, 16-18, 20-29, 31-32 and 34-37 may be executed in a different order and/or one or more groups of stages may be executed simultaneously. FIGS. 1, 2, 15, 19, 30 and 33 illustrate a general schematic of the system architecture in accordance with an embodiment of the presently disclosed subject matter. Each module in FIGS. 1, 2, 15, 19, 30 and 33 can be made up of any combination of software, hardware and/or firmware that performs the functions as defined and explained herein. The modules in FIGS. 1, 2, 15, 19, 30 and 33 may be centralized in one location or dispersed over more than one location. In other embodiments of the presently disclosed subject matter, the system may comprise fewer, more, and/or different modules than those shown in FIGS. 1, 2, 15, 19, 30 and 33.

It is to be noted that throughout the specification, when reference is made to a user, this can refer to a human operator such as a system administrator, or to any type of auxiliary entity. An auxiliary entity can refer for example to an external application such as an external management system, including an auxiliary entity that does not require any human intervention, etc.

Bearing this in mind, attention is drawn to FIG. 1, which schematically illustrates a storage system capable of implementing a Disaster Recovery (DR) system according to the presently disclosed subject matter.

In the exemplary storage system 10 illustrated in FIG. 1, there are shown a plurality of storage sites 20-*a*, 20-*b*, . . . , 20-*n*. The storage system 10 can be any type of storage system and/or a combination of two or more storage systems, including, but not limited to, storage systems known in the art. The storage sites 20-*a*, 20-*b*, . . . , 20-*n* can be any type of storage sites, including storage sites known in the art. The storage sites 20-*a*, 20-*b*, . . . , 20-*n* can be interconnected by any type of network 40 (general-purpose network, Wide Area Network, Storage Area Network (SAN), Local Area Network, a combination of any two or more network types, etc.). Optionally, the network infrastructure can include Ethernet, Infiniband, FC (Fibre Channel), FCoE (Fibre Channel over Ethernet), DSL (Digital Subscriber Line), PON (Passive Optical Network), Active Optical Network, ATM (Asynchronous Transfer Mode), etc., or any combination of two or more network infrastructures.

In some cases, the storage sites 20-*a*, 20-*b*, . . . , 20-*n* can be distributed between various geographic locations (e.g. a continent, a country, a city, a street, a building, a floor within a building, a room within a floor, etc.).

In some cases, one or more of the storage sites 20-*a*, 20-*b*, . . . , 20-*n* (and in some cases, each of the storage sites 20-*a*, 20-*b*, . . . , 20-*n*) can act as a primary storage site (e.g. a site that is housing one or more computer systems that directly interact with one or more logical storage entities (such as Logical Units, Object Stores, file system instances, etc.) of the storage system 10) implementing the presently disclosed subject matter. Each primary storage site implementing the presently disclosed subject matter can be associated with two or more storage sites acting as disaster recovery (DR) storage sites. A DR storage site is a storage site that maintains data that enables recovery of all or part of the data stored on the primary storage site in case the data is not accessible (e.g. in case of a natural disaster, a power outage, or from any other reason that causes the data stored on the primary storage site to be inaccessible). In some cases, one or more of the storage sites 20-*a*, 20-*b*, . . . , 20-*n* can simultaneously act as a primary storage site being associated with at least two DR storage sites and as a DR storage site associated with another storage site acting as the primary storage site with which it is associated. It is to be noted that in some cases, a logical storage entity can be distributed between more than one storage site and in such cases, each of the storage sites hosting part of that logical storage entity are primary storage sites (e.g. a site that is housing one or more computer systems that directly interact with that logical storage entity of the storage system 10).

According to some examples of the presently disclosed subject matter, each primary storage site implementing the presently disclosed subject matter can be associated with at least one DR storage site that is located in a remote geographic location. In some cases, a remote geographic location is a location that is not likely to be affected by disasters (e.g. a natural disaster, a power outage, or any other reason that causes the data stored on the primary storage site to be inaccessible) that may affect the primary storage site with which the remote DR storage is associated. In some cases, a remote geographical location is a location in which the communication between the primary storage site and the DR storage site associated therewith and remote therefrom suffers from at least a twenty percent increase of communication latency if the primary storage site and the DR storage site would communicate in a synchronous manner.

According to some examples of the presently disclosed subject matter, each storage site implementing the presently disclosed subject matter can comprise at least one computer node 50-*a*, 50-*b*, . . . , 50-*n* (e.g. any type of computer including, inter alia, one or more processing resources such as one or more processing units, one or more memory resources such as a memory, and one or more network interfaces) associated with a DR module 30-1, 30-2, . . . , 30-*n*, configured to operate and control a DR process in accordance with the presently disclosed subject matter, as further detailed herein.

Figure 2:
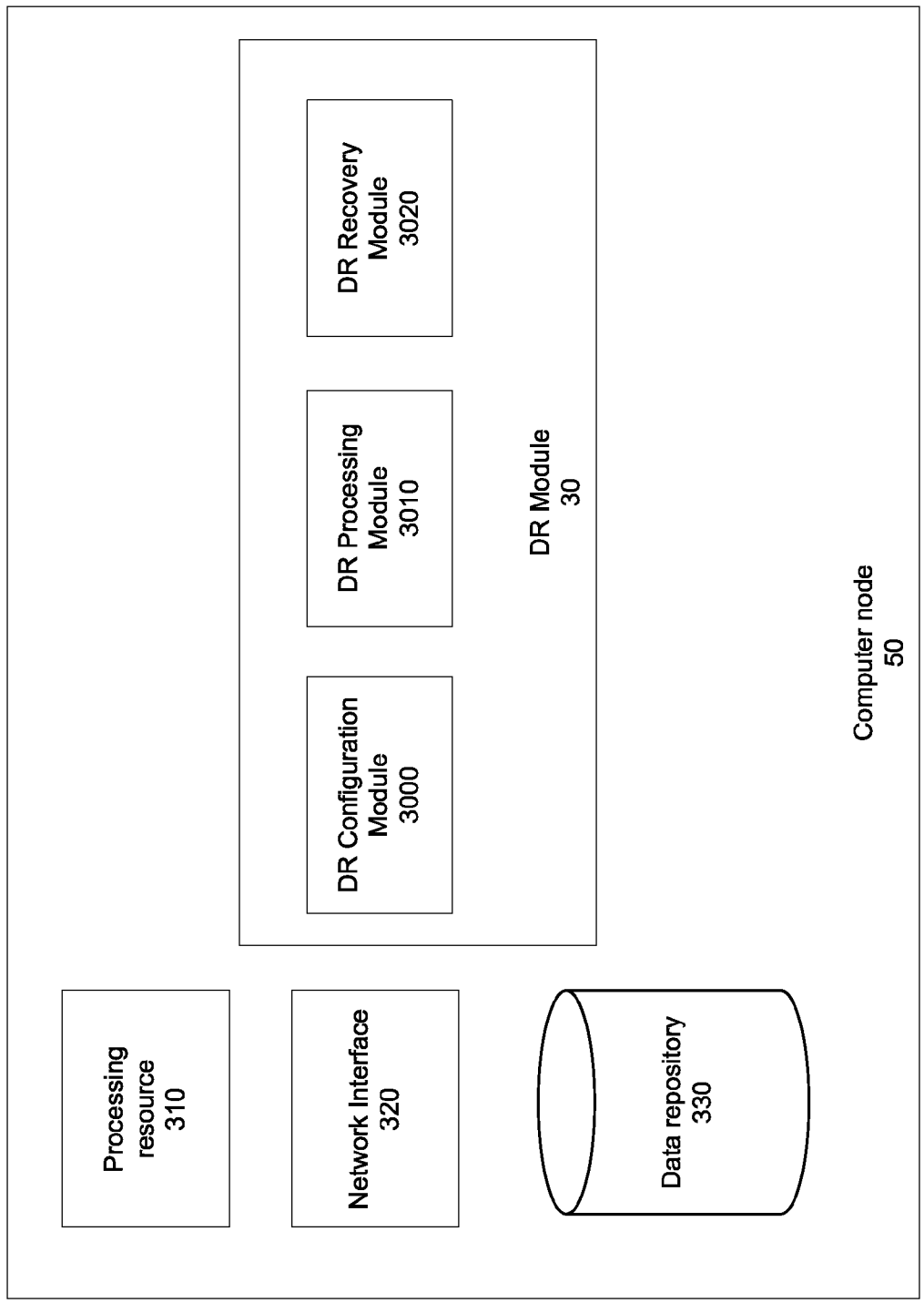
FIG. 2 schematically illustrates a computer node configured to operate and control a DR system according to the presently disclosed subject matter.

Having described a storage system capable of implementing a DR system according to the presently disclosed subject matter, attention is drawn to FIG. 2, illustrating a computer node configured to operate and control a DR system according to the presently disclosed subject matter.

According to some examples of the presently disclosed subject matter, computer node 50 (e.g. computer nodes 50-*a*, 50-*b*, . . . , 50-*n*, or any other computer connected, for example by network 40, to one of the storage sites 20-*a*, 20-*b*, . . . , 20-*n* or to storage system 10), can comprise one or more processing resources 310. The one or more processing resources 310 can be a processing unit, a microprocessor, a microcontroller or any other computing device or module, including multiple and/or parallel and/or distributed processing units, which are adapted to independently or cooperatively process data for controlling relevant computer node 50 resources and for enabling operations related to computer node 50 resources.

Computer node 50 can further comprise one or more network interfaces 320 (e.g. a network interface card, or any other suitable device) for enabling computer node 50 to communicate, inter alia with other computer nodes and/or other resources connected to the storage system 10.

Figure 3:
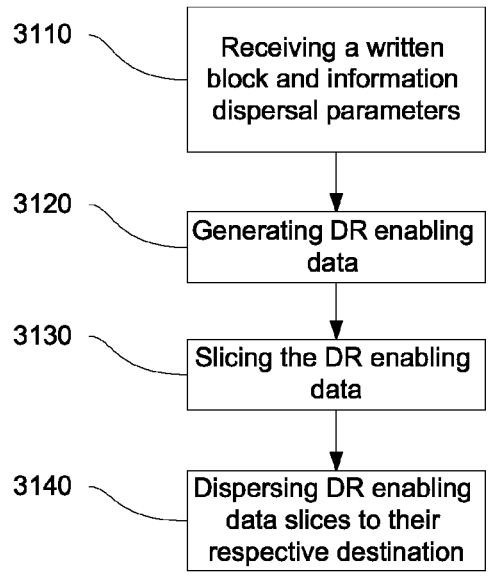
FIG. 3 is a flowchart illustrating a sequence of operations carried out for asynchronously dispersing, between a plurality of DR storage sites, DR enabling data relating to data written to a primary storage site, according to certain examples of the presently disclosed subject matter.

According to some examples of the presently disclosed subject matter, computer node 50 can be associated with a data repository 330, configured to store data, including inter alia, data of DR configuration parameters (e.g. information dispersal parameters, as further detailed herein, inter alia with respect to FIG. 3).

In some cases, data repository 330 can further store data of various parameters relating to computer node 50, and/or data relating to various parameters that refer to the storage system 10 or parts thereof and/or data relating to dynamic behavior of the storage system 10, and/or any other data.

Figure 4:
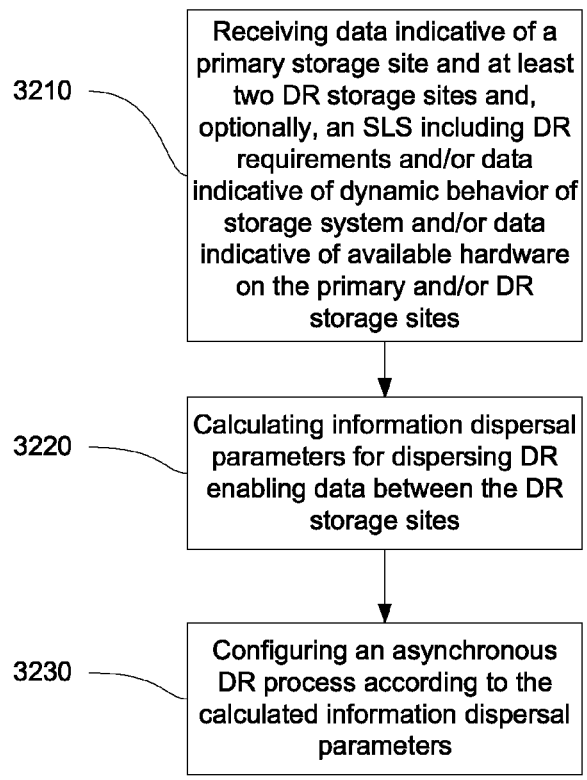
FIG. 4 is a flowchart illustrating a sequence of operations carried out for calculating information dispersal parameters that enable dispersing, between a plurality of DR storage sites, DR enabling data based on data written to a primary storage site, according to certain examples of the presently disclosed subject matter.

In some cases, data repository 330 can still further store data of various user-defined storage requirements defining Service Level Requirements (SLSs) specifying various requirements that the storage system 10 is required to meet (including, inter alia, DR requirements, such as Recovery Point Objective—RPO, Recovery Time Objective—RTO, required global and/or local redundancy level (as further detailed herein), etc., as further detailed inter alia with reference to FIG. 4) and/or data of a logical storage entities (such as Logical Units, Object Stores, file system instances, etc.) associated with each SLS.

In some cases, data repository 330 can be further configured to enable retrieval, update and deletion of the stored data. It is to be noted that in some cases, data repository 330 can be located locally on computer node 50, or on any other suitable device. In some cases, data repository 330 can be distributed between two or more locations. In some cases, data repository 330 can be additionally or alternatively stored on one or more logical storage entities within the storage system 10. In some cases, additionally or alternatively, data repository 330 can be shared between multiple computer nodes (including computer nodes located in multiple storage sites).

According to some examples of the presently disclosed subject matter, computer node 50 can further comprise a DR module 30. The DR module 30 can be configured to configure, control and manage the DR system's DR processes and control and manage a DR system's recovery processes for recovering from various types of disaster (e.g. a natural disaster, a power outage, or any other reason that causes all or part of the data stored on a primary storage site to be inaccessible), as further detailed herein.

According to further examples of the presently disclosed subject matter, DR module 20 can comprise one or more of the following modules: DR configuration module 3000, DR processing module 3010 and DR recovery module 3020.

In some cases, DR configuration module 3000 can be configured to calculate information dispersal parameters and configure a DR process in accordance with calculated information dispersal parameters as further detailed herein, inter alia with reference to FIG. 4. In some cases, DR configuration module 3000 can calculate the information dispersal parameters in accordance with one or more SLSs that can include, in some cases, DR requirements (as further detailed herein, inter alia with reference to FIG. 4).

In some cases, DR processing module 3010 can be configured to control and manage a DR process. In some cases, DR processing module 3010 can utilize information dispersal parameters calculated by the DR configuration module 3000 for controlling and managing a DR process, as further detailed herein.

Figure 12:
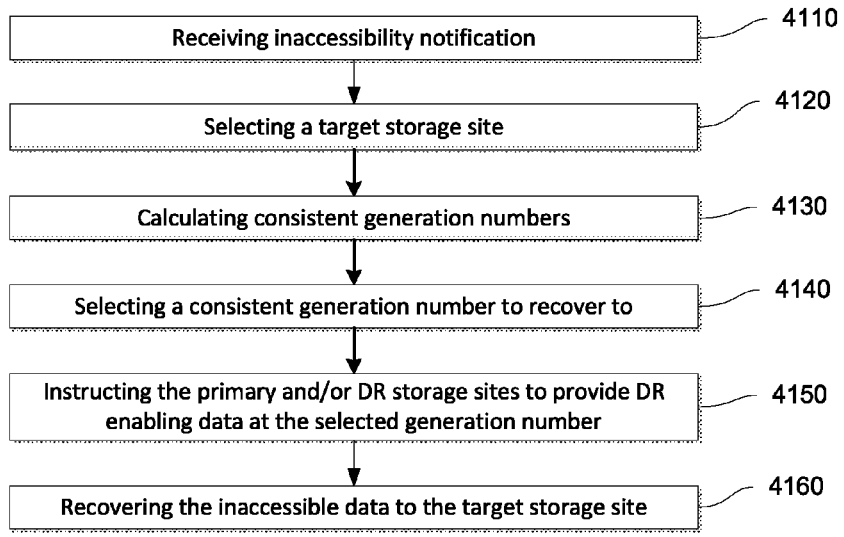
FIG. 12 is a flowchart illustrating a sequence of operations carried out for recovering data stored on a primary storage site in case the data is inaccessible, according to certain examples of the presently disclosed subject matter.

DR recovery module 3020 can be configured to control and manage a recovery process for recovering from various types of disaster at a primary storage site (e.g. by building a replication of one or more failed logical storage entities within the primary storage site at a target storage site), as further detailed herein, inter alia with reference to FIG. 12.

Attention is now drawn to FIG. 3, showing a flowchart illustrating a sequence of operations carried out for asynchronously (or partially asynchronously) dispersing, between a plurality of DR storage sites, DR enabling data relating to data written to a primary storage site, according to certain examples of the presently disclosed subject matter.

According to some examples of the presently disclosed subject matter, the DR system operating on a primary storage site, e.g. by utilizing DR processing module 3010 installed on one or more of the primary storage site's computer nodes, can be configured to receive data (e.g. a block that is written to the primary storage site) associated with a generation number (a sequential number indicative of the order of the writes performed to the primary storage site), and information dispersal parameters that enable dispersing DR enabling data based on the written block between a plurality of DR storage sites (block 3110). In some cases, the information dispersal parameters can define the size difference between the written blocks and the DR enabling data based on the written blocks (as the original written block is transformed into larger DR enabling data in order to enable recovery of the original written block even when parts of the DR enabling data are missing), a number of slices to slice the DR enabling data into, and data indicative of DR storage sites for storing the DR enabling data slices.

It can be appreciated that dispersing slices of the larger DR enabling data (that is a function of the smaller original written block, where in some cases it can include the original block as is with an addition of data and in some cases it can be completely or partially different than the original written block) between a plurality of DR storage sites can enable recovery of the original written block even in situations where one or more (depending on the size difference between the written block and the DR enabling data based on the written block) of the DR storage sites are inaccessible for some reason.

Attention is drawn to a short explanation about savings of storage overhead that can be achieved according to the presently disclosed subject matter: it is to be noted that, assuming that a certain primary storage site is associated with D DR storage sites, and assuming that the DR system allows up to F DR storage sites to be inaccessible at any point in time (where F<D), the remaining DR storage sites (at least D−F DR storage sites) must contain at least Ceiling (N/(D−F)) DR enabling data slices (where N is the minimal number of DR enabling data slices that enable recovery of the original written block) so that in case up to F DR storage sites are inaccessible, the remaining D−F DR storage sites will comprise at least N DR enabling data slices that enable recovery of the original written block.

Therefore, it can be appreciated that the total storage overhead in such a scenario can be limited to D*Ceiling(N/(D−F)), whereas in case of replication schemes, the storage overhead is D*N.

In an exemplary manner, if D=3 and F=1, the storage overhead is limited to 1.5 whereas in replication schemes the storage overhead is 3 (a full copy is stored in each DR storage site). If D=5 and F=1, the storage overhead is 1.25, whereas in replication schemes the storage overhead is 5. If D=5 and F=2, the storage overhead is 1.67, whereas in replication schemes the storage overhead is 5. If D=10 and F=3, the storage overhead is 1.42, whereas in replication schemes the storage overhead is 10.

It is important to note that there may be other DR distribution schemes, and the above example related to an exemplary scheme which yields the minimal storage overhead for any F failed sites. Many other combinations and/or distribution schemes can exist, including ones that have motivations other than pure minimization of the storage overhead.

Returning to FIG. 3, it is to be further noted that in some cases, the information dispersal parameters can be predetermined (e.g. provided as input by a user of the storage system 10, by the application storing the data on the logical storage entity with which the primary site is associated, or by any other means). Alternatively, all or part of the information dispersal parameters can be calculated (e.g. by utilizing DR configuration module 3020 installed on one or more of the storage sites computer nodes and/or on any other computer nodes, including computer nodes that are not related to any storage site and/or to the storage system 10) in accordance with the dynamic behavior of the storage system 10 and its various components, and/or in accordance with DR requirements (provided, for example, by a user of the storage system 10, by the application storing the data on the logical storage entity with which the primary site is associated, or by any other source). A further description of the information dispersal parameters calculation is provided herein, inter alia with reference to FIG. 4.

The DR system can be further configured to generate the DR enabling data (block 3120), slice the entire DR enabling data into non-overlapping slices (block 3130) and asynchronously (or partially asynchronously) disperse the DR enabling data slices to their respective destinations (e.g. by issuing suitable write requests, having a generation number identical to the original written block generation number, to the DR storage sites on which the slices are to be written) (block 3140), all in accordance with the received information dispersal parameters and in accordance with any type of error correction technique (such as FEC—Forward Error Correction, etc.) that enables, inter alia, calculation of the DR enabling data based on the received written block.

It is to be noted, with reference to FIG. 3, that some of the blocks can be integrated into a consolidated block or can be broken down to a few blocks and/or other blocks may be added. Furthermore, in some cases, the blocks can be performed in a different order than described herein. It should also be noted that whilst the flow diagrams are described also with reference to the system elements that realize them, this is by no means binding, and the blocks can be performed by elements other than those described herein.

Turning to FIG. 4, there is shown a flowchart illustrating a sequence of operations carried out for calculating information dispersal parameters that enable dispersing, between a plurality of DR storage sites, DR enabling data based on data written to a primary storage site, according to certain examples of the presently disclosed subject matter.

As indicated hereabove, in some cases, the information dispersal parameters can define the size difference between the written blocks and the DR enabling data based on the written blocks (as the original written block is transformed into larger DR enabling data in order to enable recovery of the original written block even when parts of the DR enabling data are missing), a number of slices to slice the DR enabling data into where each slice is of smaller size than the size of the original written block, and data indicative of DR storage sites for storing the DR enabling data slices.

As further indicated above, and according to some examples of the presently disclosed subject matter, the information dispersal parameters can be calculated by the DR system. In such cases, the DR system (e.g. by utilizing DR configuration module 3020 installed on one or more of the storage sites computer nodes and/or on any other computer nodes, including computer nodes that are not related to any storage site and/or to the storage system 10) can be configured to receive data indicative of a primary storage site and at least two DR storage sites and, optionally, DR requirements and/or data indicative of dynamic behavior of storage system (block 3210).

The DR system can be further configured to calculate the information dispersal parameters (block 3220) (e.g. by utilizing DR configuration module 3020 installed on one or more of the storage sites computer nodes and/or on any other computer nodes, including computer nodes that are not related to any storage site and/or to the storage system 10), and configure an asynchronous (or partially asynchronous) DR process in accordance with the calculated information dispersal parameters (block 3230).

It is to be noted that the information dispersal parameters calculation can be performed for example while taking into account one or more of the following inputs: (1) data indicative of the primary storage site and the at least two DR storage sites; (2) data indicative of the available hardware in each storage site (e.g. computer nodes, data storage resources, cache resources, network resources, additional resources providing further functionality to the storage system and/or enhance its performance such as compression accelerator, encryption accelerator, Host Bus adapter (HBA) enabling communication with SAN resources, etc.); (3) data indicative of the dynamic behavior of the storage system 10 and its various components; (4) an SLS including DR requirements (provided, for example, by a user of the storage system 10, by the application storing the data on the primary site, or by any other source).

In some cases, the calculation can be performed by utilizing an optimization engine (such as ILOG CPLEX Optimizer by International Business Machines Corporation's of New-York United States, Gurobi Optimizer by Gurobi Optimization Inc. of Houston Tex., United States, or any other suitable optimization engine) configured to perform an optimization process based on the input data in order to arrive at a solution (information dispersal parameters) that meets the requirements defined by the input data. It is to be noted that in some cases, the optimization process can be instructed to return the first valid solution that it finds, whereas in other cases, the optimization process can be instructed to search for the optimal solution out of a set of calculated valid solutions. Optionally, the optimization techniques used in the optimization process can include any one of, or any combination of, linear programming, simulated annealing, genetic algorithms, or any other suitable optimization technique known in the art. Optionally, the optimization technique can utilize heuristics and/or approximations. Optionally, optimization decisions can be taken based on partial and/or not up-to-date information. It can be appreciated that an optimizer, having knowledge of available resources and their behaviors and requirements that the resources are required to meet can calculate a solution (including an optimal solution) accordingly.

In addition, optionally, following execution of the optimization process, the DR system can be configured to check whether no valid solution exists (e.g. there is no solution that meets the SLS). If this is the case, the DR system can be configured to notify a user (e.g. a system administrator or another entity, including a non-human entity) about the reason and/or provide such a user with a recommendation for corrective actions to be taken in order to allow calculation of a valid solution. Such a corrective action can include adding one or more DR storage sites in one or more locations, adding one or more components to one or more of the DR storage sites, relaxing one or more SLS constraints, etc., thereby enabling successful calculation of a valid solution. Optionally, the action can additionally or alternatively include adding relevant plug-ins to one or more servers 130. It is to be noted that the recommendations disclosed herein are mere examples, and other recommendations can be additionally or alternatively issued to the user.

In some cases, the data relating to dynamic behavior of the storage system 10 and its various components can include various data of parameters indicative of the current state of one or more of the storage system 10 components (including the computer nodes and other resources connected thereto). Such data can include data of presence and/or loads and/or availability and/or faults and/or capabilities and/or response time(s) and/or connectivity and/or cost(s) (e.g. costs of network links, different types of data storage resources) and/or reliability (e.g. faults frequency, faults average time, or any other data indicative of reliability) and/or any other data relating to one or more of the storage system 10 components. In some cases, such data can include, inter alia, various statistical data.

Figure 5:
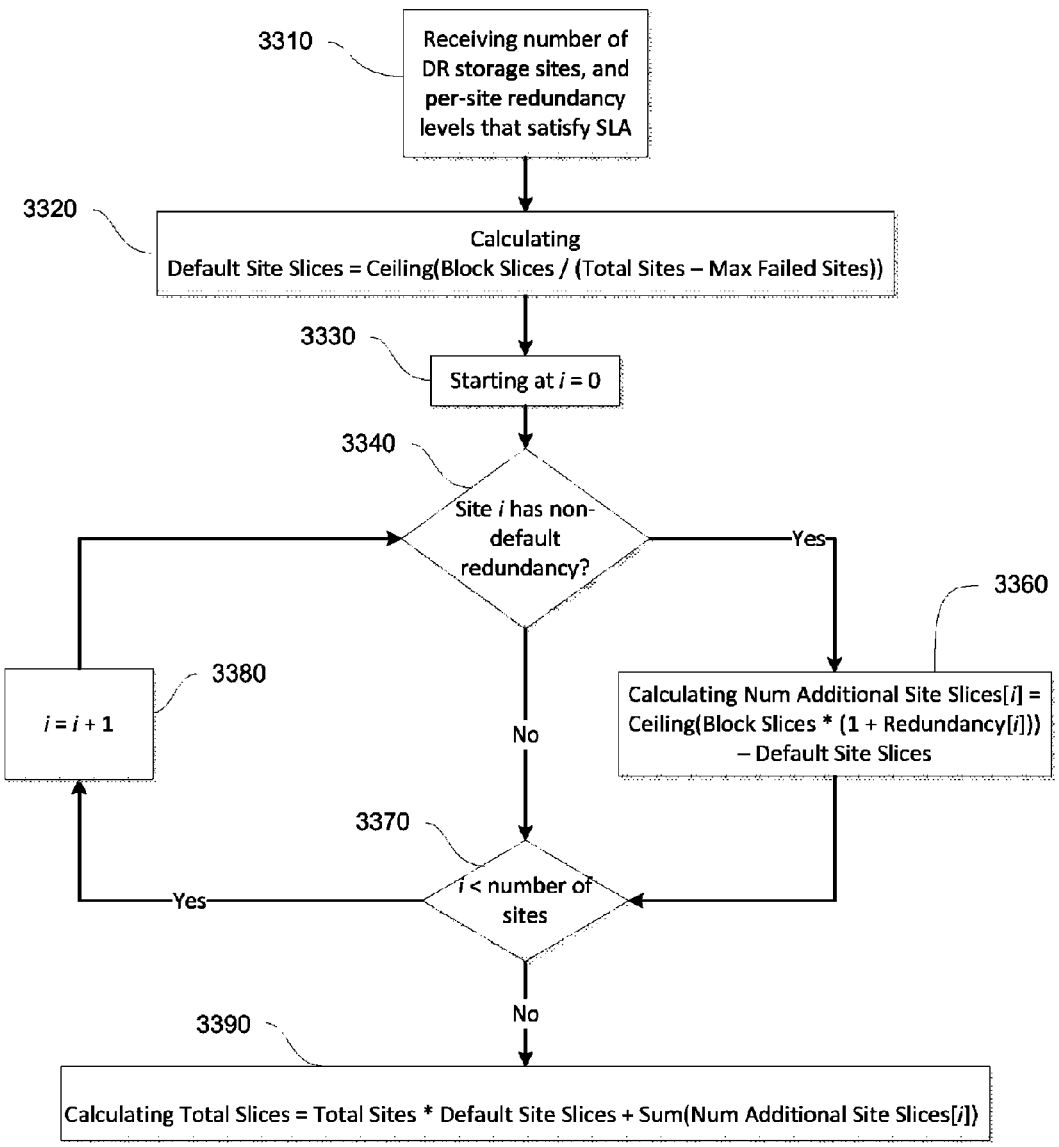
FIG. 5 is a flowchart illustrating a sequence of operations carried out for performing a DR process based on information dispersal parameters and monitoring compliance with an SLS, according to certain examples of the presently disclosed subject matter.

According to some examples of the presently disclosed subject matter, the DR requirements defined by the SLS based on which the information dispersal parameters can be calculated can include one or more of the following: a required Recovery Point Objective (RPO), a required Recovery Time Objective (RTO), a minimal/maximal number of DR storage sites to store the DR enabling data, a global and/or local redundancy level (a global redundancy level refers to a maximal number of DR enabling data slices relating to the original written block that can fail or be inaccessible simultaneously while the DR system can still recover the original written block, and a local redundancy level refers to a number of additional slices to transmit to one or more of the DR storage sites on top of the default site slices that is calculated as further detailed with respect to FIG. 5), various requirements regarding the location of the DR storage sites (e.g. a minimal/maximal distance between the primary storage site and one or more of the DR storage sites associated therewith, a security level of the DR storage sites (e.g. an indication that one or more of the DR storage sites should be located within a cave, within a nuclear shelter, within a secured facility, etc.), etc.), a maximal latency, a minimal throughput, etc.

In some cases, the DR requirements can further include data indicative of an information dispersal model. An information dispersal model can define for example whether or not to store local redundancy data in the primary and/or one or more of the DR storage sites (e.g. by storing locally on the primary and/or one or more of the DR storage sites a higher number of slices than the minimal number of slices required in order to recover original written blocks), whether or not to store global redundancy data in the DR storage sites (e.g. by storing globally on the DR storage sites a higher number of slices than the minimal number of slices required in order to recover original written blocks), whether or not to store a minimal amount of DR enabling data in each DR storage site in order to enable recovery in scenarios where a predetermined number of the sites (e.g. one site, two sites, etc.) are inaccessible, etc. It is to be noted that these are mere examples and various additional information dispersal models can exist.

It is to be noted, with reference to FIG. 4, that some of the blocks can be integrated into a consolidated block or can be broken down to a few blocks and/or other blocks may be added. Furthermore, in some cases, the blocks can be performed in a different order than described herein. It should also be noted that whilst the flow diagrams are described also with reference to the system elements that realize them, this is by no means binding, and the blocks can be performed by elements other than those described herein.

Having described the information dispersal parameters calculation, attention is now drawn to FIG. 5, a flowchart illustrating a sequence of operations carried out for calculating the number of slices to slice the DR enabling data into, according to certain examples of the presently disclosed subject matter.

According to some examples of the presently disclosed subject matter, the DR system (e.g. by utilizing the DR configuration module 3020 installed on one or more of the storage sites computer nodes and/or on any other computer nodes, including computer nodes that are not related to any storage site and/or to the storage system 10) can be configured to receive the number of DR storage sites for storing the DR enabling data slices, a local redundancy level for each of the DR storage sites and the minimal number of slices that is required in order to recover a block (block 3310). It is to be noted that such input can be calculated by the optimization engine (e.g. as described with reference to FIG. 4 herein).

The DR system can be further configured to calculate a minimal number of slices to be transmitted to each of the DR storage sites (block 3320). Such a minimal number of slices can be calculated using the following formula:

Default site slices=Ceiling(Block Slices/(Total Sites−Max Failed Sites)), wherein:

Block Slices is the minimal number of DR enabling data slices that is required in order to recover a block;

Total Sites is the number of storage sites on which the DR enabling data slices are to be stored; and Max Failed Sites is the maximal number of storage sites that are allowed to be inaccessible simultaneously.

It is to be noted that whereas in some cases only DR storage sites can be considered as storage sites in Total Sites and in Max Failed Sites, in other cases, the primary storage site can be also considered as one of the storage sites on which all or part of the DR enabling data slices will be stored (for example, in some cases, the information dispersal model can define that the primary site will also store only part, and in some cases a minimal number of DR enabling data slices required in order to recover the original written block). In such cases, the primary storage site is also taken into account as one of the storage sites in Total Sites and in Max Failed Sites.

In some cases, the DR system can be configured to reset a counter (i=0) (block 3330), and check, for the $i^{th}$ DR storage site, if it has a non-default redundancy level (block 3340) (it is to be noted that by default, the DR storage sites do not maintain data that enables local redundancy). In case it does have a non-default redundancy level, the DR system can be configured to calculate the number of required additional DR enabling data slices to store on the $i^{th}$ DR storage site (block 3360). Such calculation can be performed using the following formula:

Additional Site Slices=Ceiling(Block Slices*(1+redundancy[$i$]))−Default Site Slices, wherein:

Block Slices is the minimal number of DR enabling data slices that is required in order to recover a block;

redundancy[$i$] is the required non-default redundancy level (as defined for example by the DR requirements) for the $i^{th}$ DR storage site, that can be represented by any number equal to or greater than (−1) (it is to be noted that in case redundancy[$i$]=0, the $i^{th}$ DR storage site will contain the minimal number of DR enabling data slices that is required in order to recover the block associated with these DR enabling data slices; in case redundancy[$i$]=1, the $i^{th}$ DR storage site will contain at least twice of the minimal number of DR enabling data slices that is required in order to recover the block associated with these DR enabling data slices; in case redundancy[$i$]=(−1), the $i^{th}$ DR storage site will not contain any DR enabling data slices; usually, redundancy[$i$] will be greater than (−1) and smaller than zero, where the higher redundancy[$i$] is—the higher Additional Site Slices will be); and Default Site Slices is the default number of DR enabling data slices to be transmitted to each of the DR storage sites (calculated, for example, according to the formula provided with reference to block 3320).

Following the calculation of the required additional DR enabling data slices, or in case the $i^{th}$ DR storage site has a default redundancy level, the DR system can be configured to check if i (the counter) is smaller than the number of DR storage sites for storing the DR enabling data slices (indicating that there is an additional DR storage site for which the Additional Site Slices calculation should be performed if required) (block 3370). In case i is smaller than the number of DR storage sites for storing the DR enabling data slices, i is increased by one (block 3380) and the process returns to block 3340. In case i is not smaller than the number of DR storage sites for storing the DR enabling data slices, the DR system can be configured to calculate the number of slices to slice the DR enabling data into. Such calculation can be performed using the following formula:

Total Slices=Total Sites*Default Site Slices+SUM (Additional Sites Slices), wherein:

Total Sites is the number of storage sites on which the DR enabling data slices are to be stored;

Default Site Slices is the minimal number of DR enabling data slices to be transmitted to each of the DR storage sites (calculated, for example, according to the formula provided with reference to block 3320);

SUM(Additional Sites Slices) is the sum of Additional Site Slices calculated for each DR storage site in block 3360.

It is to be noted that in some cases (e.g. when the DR requirements require) the primary storage site can store local redundancy data. In some distribution models, the primary storage site can store the minimal number of DR enabling data slices that is required in order to recover a block locally. In other distribution models, the primary storage site can store a higher number of DR enabling data slices than the minimal number of DR enabling data slices that is required in order to recover a block locally, in accordance with a required local redundancy level defined for the primary storage site (e.g. as defined by the DR requirements of an SLS).

It is to be noted, with reference to FIG. 5, that some of the blocks can be integrated into a consolidated block or can be broken down to a few blocks and/or other blocks may be added. Furthermore, in some cases, the blocks can be performed in a different order than described herein. It should also be noted that whilst the flow diagrams are described also with reference to the system elements that realize them, this is by no means binding, and the blocks can be performed by elements other than those described herein.

Figure 6:
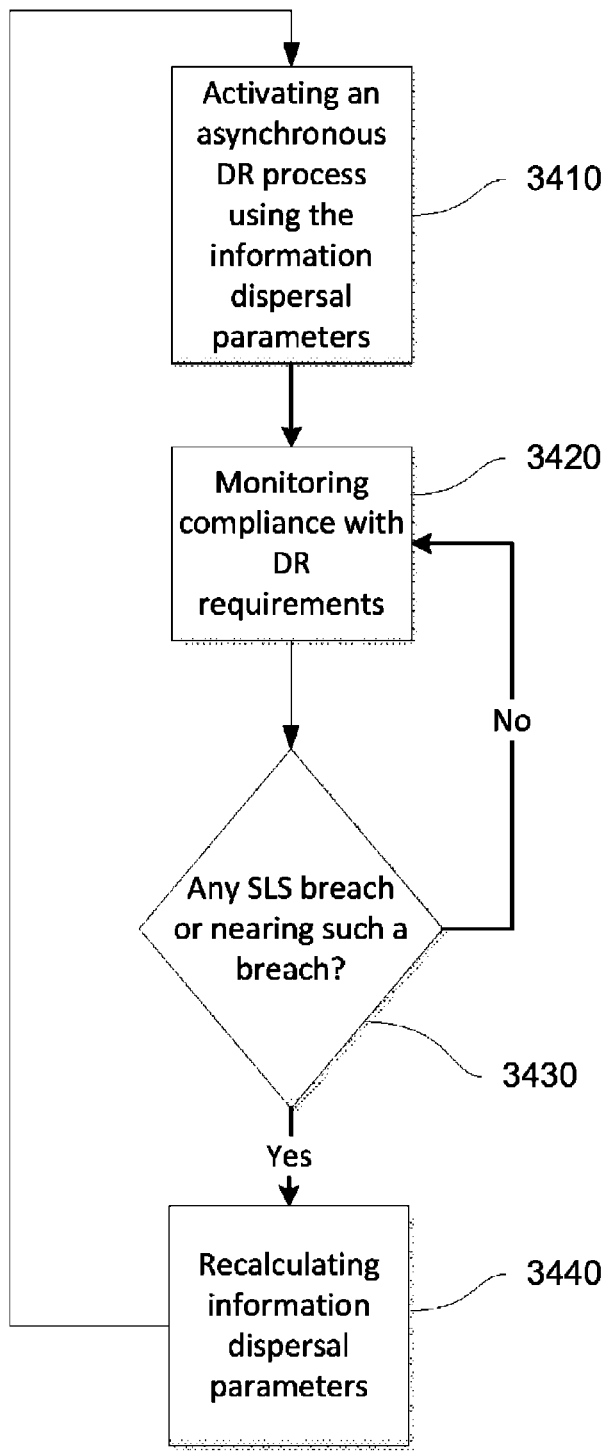
FIG. 6 is a flowchart illustrating a sequence of operations carried out for performing a DR process based on information dispersal parameters and monitoring compliance with an SLS, according to certain examples of the presently disclosed subject matter.

Attention is drawn to FIG. 6, a flowchart illustrating a sequence of operations carried out for performing a DR process based on information dispersal parameters and monitoring compliance with an SLS, according to certain examples of the presently disclosed subject matter.

According to some examples of the presently disclosed subject matter, the DR system (e.g. by utilizing the DR processing module 3010 installed on one or more of the storage sites computer nodes and/or on any other computer nodes, including computer nodes that are not related to any storage site and/or to the storage system 10) can be configured to activate an asynchronous (or a partially asynchronous) DR process using the information dispersal parameters (block 3410). Such a DR process can be configured, for example, to receive written blocks, written to any primary storage site of storage system 10, to calculate, and to asynchronously (or partially asynchronously) disperse DR enabling data in accordance with the information dispersal parameters (as further detailed herein, inter alia with reference to FIG. 6).

Once there is an active DR process, the DR system can be further configured to monitor compliance of the DR process with the DR requirements (block 3420). As indicated above, the DR requirements can include, inter alia, a required RPO, a required RTO, a maximal latency, a minimal throughput, etc. It can be appreciated that compliance with these (and other) parameters defined by the DR requirements can be monitored.

The DR system can be configured to check if there is any breach of the DR requirements, or nearing such a breach (e.g. according to pre-defined thresholds, etc.) (block 3430). If there is no breach, the DR system can be configured to continue monitoring compliance (block 3420). However, if there is a breach (or a breach is imminent), the DR system can be configured to recalculate information dispersal parameters that eliminate the breach situation (or its imminence) (block 3440).

It is to be noted that whereas in some cases, every time the DR requirements are breached (or are close to being breached, e.g. according to pre-defined thresholds, etc.) a recalculation can be initiated. In other cases such recalculation can be initiated depending on meeting some pre-defined criteria. Such criteria can be, for example, a pre-defined number of detected DR requirements breaches required to be met, either within a pre-defined time frame or irrespective of the time, etc. Thus, for example, exemplary criteria can be detection of three DR requirements breaches, or detection of three DR requirements breaches within one day, etc. In some cases, the importance of a breach can additionally or alternatively be considered as a criterion. For this purpose, the DR system can be configured to utilize the statistical data and historical data related to DSS 200.

It is to be noted, with reference to FIG. 6, that some of the blocks can be integrated into a consolidated block or can be broken down to a few blocks and/or other blocks may be added. Furthermore, in some cases, the blocks can be performed in a different order than described herein. It should also be noted that whilst the flow diagrams are described also with reference to the system elements that realize them, this is by no means binding, and the blocks can be performed by elements other than those described herein.

Figure 7:
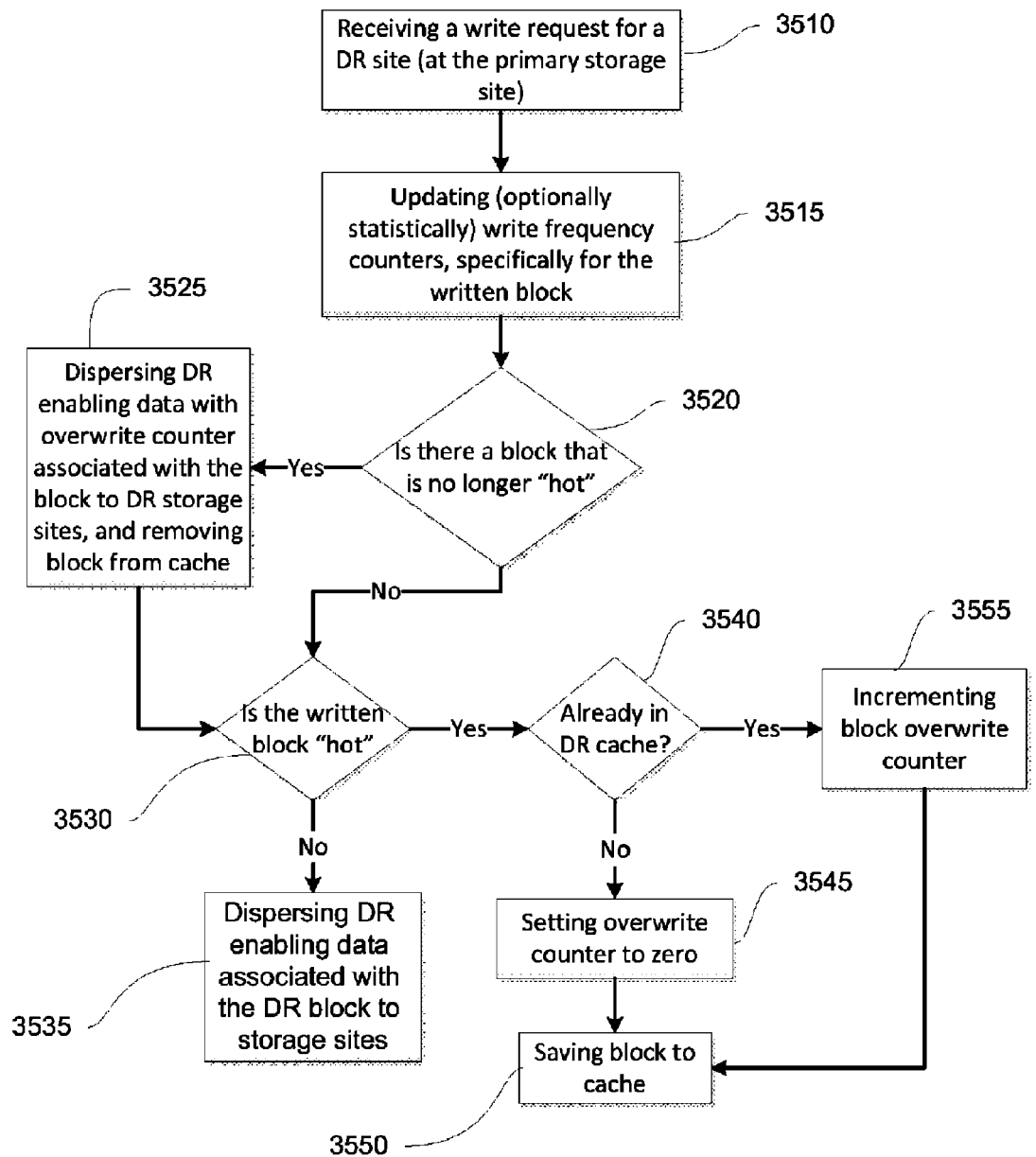
FIG. 7 is a flowchart illustrating a sequence of operations carried out for performing a write to a primary storage site, according to certain examples of the presently disclosed subject matter.

Having described the information dispersal parameters calculations, attention is drawn to FIG. 7 showing a flowchart illustrating a sequence of operations carried out for performing a write to a primary storage site, according to certain examples of the presently disclosed subject matter.

According to some examples of the presently disclosed subject matter, the DR system (e.g. by utilizing DR processing module 3010 installed on one or more of the primary storage site's computer nodes) can be configured to receive a write request for writing a block at a primary storage site (block 3510).

In some cases, the DR system can be configured to manage a cache scheme, in which some of the write requests performed at a primary storage site will not automatically trigger the DR process of dispersing slices of DR enabling data (corresponding to the written block) to their respective destinations as described with reference to FIG. 3, for example in order to save communication bandwidth between the primary storage site and the DR storage sites associated therewith.

In some cases, for that purpose, the DR system can be configured to maintain a table (or any other suitable data structure or data structures) comprising write frequency counters indicative of the number of writes performed to the blocks (to which the write requests relate), for example within a certain sliding time window (e.g. of a few seconds, minutes, hours, etc.). In order to maintain such a table (or any other suitable data structure), the DR system can be configured to update the write frequency counters corresponding to the block to which the write request relates (block 3515). It is to be noted that in some cases, the DR system can be configured to trigger an update of the write frequency counters each time a write request is received. In other cases, the DR system can be configured to perform such an update statistically (e.g. update the write frequency counters only for part of the write requests, for example according to a random or a pre-determined pattern, etc.).

Following update of the write frequency counters, the DR system can be configured to check if any block that was considered a hot block with respect to one or more DR storage sites is no longer considered as such (block 3520). A hot block is a block that is considered as a relatively active block with respect to one or more DR storage sites, for which write requests to such DR storage sites are received more often than for other blocks. In some cases, the determination of which block is a hot block is based on the write frequency counters. Thus, for example, each block associated with a write frequency counter that is above a pre-determined or calculated threshold (that can be different for each DR storage site) is considered a hot block. Alternatively, a pre-determined or calculated number of hot blocks per DR storage sites can exist (e.g. B hot blocks) and the B blocks associated with the B highest write frequency counters are considered hot blocks for a certain DR storage site. In some cases the number of hot blocks (B) can be set as a certain pre-determined or calculated percentage of the amount of blocks that exist per DR storage site.

Figure 8:
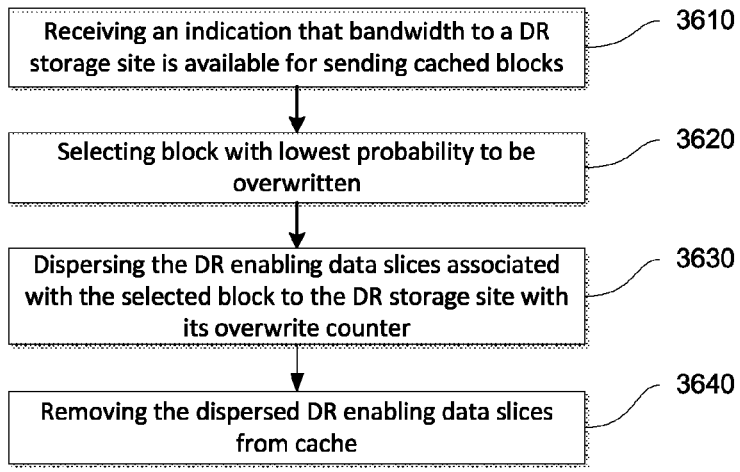
FIG. 8 is a flowchart illustrating a sequence of operations carried out for writing a cached block to the DR storage sites when there is available bandwidth, according to certain examples of the presently disclosed subject matter.

If there is a block that was considered a hot block with respect to one or more DR storage sites and is no longer considered as such following updating the write frequency counters, the DR system can be configured to asynchronously (or partially asynchronously) disperse (for example in accordance with the description provided with respect to FIG. 3) any non-dispersed DR enabling data slices based on the data written to the block in accordance with the received write request (it is to be noted in this respect that in some cases, part of the DR enabling data slices can be pre-dispersed to some of the respective DR storage sites, as further detailed herein with reference to FIG. 8) (block 3525). The DR system can be also configured to accompany the dispersed DR enabling data slices with an overwrite counter indicating the number of times that a write request relating to the block was received when the block was considered hot (a time during which the block is cached and no DR enabling data slices corresponding thereto are dispersed to the DR storage sites). Still further, the DR system can be configured to remove the block (or any DR enabling data slices derived therefrom) from the cache (as it is no longer considered hot).

It is to be noted that in some cases the cached objects are not the blocks but the DR enabling data based thereon (or the DR enabling data slices), and the process described above is adapted accordingly.

It is to be further noted that the DR system can utilize various known de-duplication techniques. Thus, for example, in case the cached objects are DR enabling data slices based on the written block, if the DR system identifies that data identical to a certain DR enabling data slice already exists in the DR storage site to which the DR enabling slice data is to be transmitted, instead of caching the DR enabling data slice, an indication to the location of such data within the DR storage site can be cached. In addition, instead of sending the DR enabling data slice, an indication of the location of the data identical to a certain DR enabling data slice can be sent with a request to copy that data to the location of the DR enabling data slice within the DR storage site.

If there is no block that was considered a hot block with respect to one or more DR storage sites and is no longer considered as such following updating the write frequency counters, the DR system can be configured to check if the written block is a hot block with respect to one or more DR storage sites (block 3530). If not—the DR system can be configured to asynchronously (or partially asynchronously) disperse DR enabling data slices based on the data written to the block in accordance with the received write request, in accordance with the description provided with respect to FIG. 3 (block 3535).

If however, the written block is indeed a hot block with respect to one or more DR storage sites, the DR system can be configured to check if the block is already in the cache (block 3540). If not—the DR system can be configured to set the overwrite counter associated with the block to zero (block 3445) and to save the block to the cache (block 3550).

If, however, the block is indeed already in the cache, the DR system can be configured to increment the block overwrite counter by one (block 3555) and to save the block to the cache (block 3550).

With reference to block 3550, it is to be noted that, as indicated above, in some cases the cached objects are not the blocks but the DR enabling data based thereon (or the DR enabling data slices), and the process described above is adapted accordingly. As further detailed above, in case DR enabling data slices are cached and the DR system identifies that data identical to a certain DR enabling data slice already exists in the DR storage site to which the DR enabling slice data is to be transmitted, instead of caching the DR enabling data slice, an indication to the location of such data within the DR storage site can be cached.

It is to be noted, with reference to FIG. 7, that some of the blocks can be integrated into a consolidated block or can be broken down to a few blocks and/or other blocks may be added. Furthermore, in some cases, the blocks can be performed in a different order than described herein. It should also be noted that whilst the flow diagrams are described also with reference to the system elements that realize them, this is by no means binding, and the blocks can be performed by elements other than those described herein.

In some cases, the DR system can be configured to utilize available bandwidth between a primary storage site and DR storage sites associated therewith. Attention is drawn to FIG. 8, a flowchart illustrating a sequence of operations carried out for writing a cached block to the DR storage sites when there is available bandwidth, according to certain examples of the presently disclosed subject matter.

According to some examples of the presently disclosed subject matter, the DR system (e.g. by utilizing DR processing module 3010 installed on one or more of the primary storage site's computer nodes) can be configured to receive an indication that available bandwidth exists between the primary storage site and any of the DR storage sites associated therewith (block 3610). Upon receipt of such indication, the DR system can be configured to select the cached block with the lowest probability to be overwritten (e.g. the hot block associated with the lowest write frequency counter) (block 3620).

In some cases, the DR system can be further configured to asynchronously (or partially asynchronously) disperse any DR enabling data slices (and, in case they do not already exist, also create them, for example as detailed with respect to FIG. 3) that are to be transmitted to the DR storage site to which the primary storage site has available bandwidth, along with the overwrite counter associated therewith and with an indication of the generation number of the original written block (block 3630). The DR system can be further configured to remove any dispersed DR enabling data slices from the cache (block 3640).

It is to be noted, with reference to FIG. 8, that some of the blocks can be integrated into a consolidated block or can be broken down to a few blocks and/or other blocks may be added. Furthermore, in some cases, the blocks can be performed in a different order than described herein. It should also be noted that whilst the flow diagrams are described also with reference to the system elements that realize them, this is by no means binding, and the blocks can be performed by elements other than those described herein.

Figure 9:
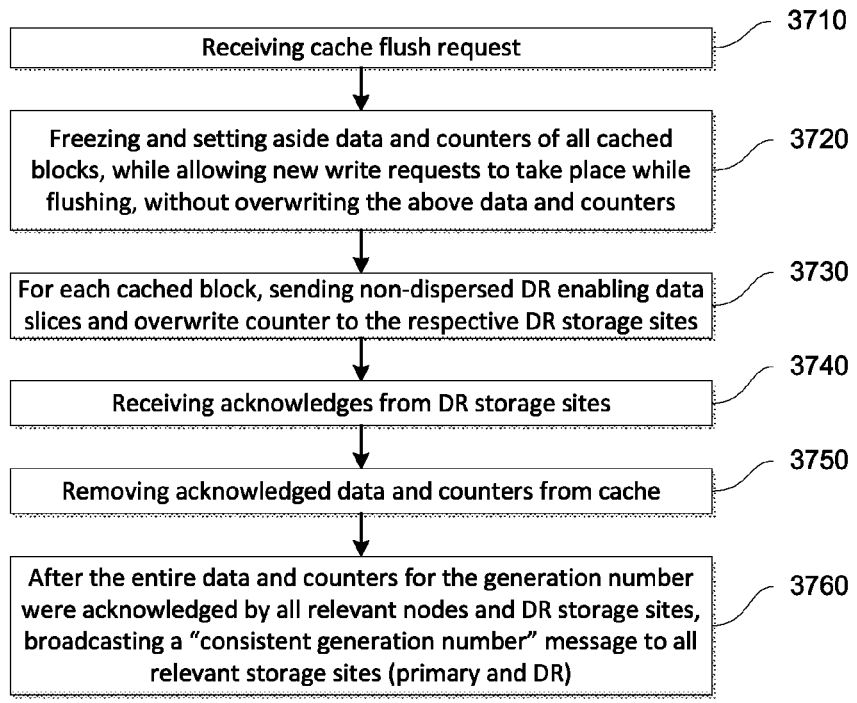
FIG. 9 is a flowchart illustrating a sequence of operations carried out for performing a cache flush in a primary storage site, according to certain examples of the presently disclosed subject matter.

In some cases, the DR system can be configured to perform a flush of the cache. Attention is now drawn to FIG. 9, illustrating a sequence of operations carried out for performing a cache flush in a primary storage site, according to certain examples of the presently disclosed subject matter.

According to some examples of the presently disclosed subject matter, the DR system (e.g. by utilizing DR processing module 3010 installed on one or more of the primary storage site's computer nodes) can be configured to receive a cache flush request for a certain generation number (block 3710). A flush request can be issued for example manually by a user and/or in accordance with a pre-determined schedule and/or in according to the RPO and/or RTO (for example, the lower the RPO and/or RTO are, the more frequent the flush operations need to be performed), etc.

Following receipt of a cache flush request, the DR system can be configured to save (e.g. locally on the primary storage site) copies all of the currently cached data (e.g. the cached blocks and/or the cached DR enabling data slices based thereon) along with the respective overwrite counters (block 3720). It is to be noted that following saving of the data, the DR system can be configured to continue receiving further write requests and operate the caching mechanism disclosed herein on the new data received after the cache flush request, without overwriting the saved copies.

In some cases, the DR system can be configured to asynchronously (or partially asynchronously) disperse (for example in accordance with the description provided with respect to FIG. 3) any non-dispersed DR enabling data slices based on the saved copies (it is to be noted in this respect that in some cases part of the DR enabling data slices can be pre-calculated and pre-dispersed to some of the respective DR storage sites, for example as further detailed herein with reference to FIG. 8) (block 3730). The DR system can be also configured to accompany the dispersed DR enabling data slices with the respective saved overwrite counters.

It is to be further noted, as further detailed herein, that the DR system can utilize various known de-duplication techniques. Thus, for example, in case the cached objects are DR enabling data slices based on the written block, if the DR system identifies that data identical to a certain DR enabling data slice already exists in the DR storage site to which the DR enabling slice data is to be transmitted, instead of sending the DR enabling data slice, an indication of the location of the data identical to a certain DR enabling data slice can be sent with a request to copy that data to the location of the DR enabling data slice within the DR storage site.

The DR system can be further configured to receive acknowledgements from the DR storage sites to which one or more DR enabling data slices are asynchronously (or partially asynchronously) dispersed (block 3740), thereby making sure that the DR enabling data slices and the overwrite counters associated therewith were received by the respective DR storage sites. In some cases, in case the DR system does not receive an acknowledgement relating to one or more dispersed DR enabling data slices, such DR enabling data slices can be retransmitted to their respective destinations, until an acknowledgement is received from the respective DR storage sites.

In some cases, following receipt of acknowledgements relating to the one or more DR enabling data slices from the respective DR storage site, the DR system can be further configured to delete the saved copies and the overwrite counters associated with the acknowledged data (block 3750).

Upon receipt of acknowledgements relating to the dispersed DR enabling data slices from all of the DR storage sites to which such DR enabling data slices have been sent, the DR system can be further configured to broadcast a "consistent generation number" message to the DR storage sites associated with the primary storage site, indicating that all of the DR storage sites are consistent at least for the generation number for which the flush was performed (block 3760). It is to be noted that an indication of such a consistent generation number is also stored on the primary storage site.

It is to be noted, with reference to FIG. 9, that some of the blocks can be integrated into a consolidated block or can be broken down to a few blocks and/or other blocks may be added. Furthermore, in some cases, the blocks can be performed in a different order than described herein. It should also be noted that whilst the flow diagrams are described also with reference to the system elements that realize them, this is by no means binding, and the blocks can be performed by elements other than those described herein.

Figure 10:
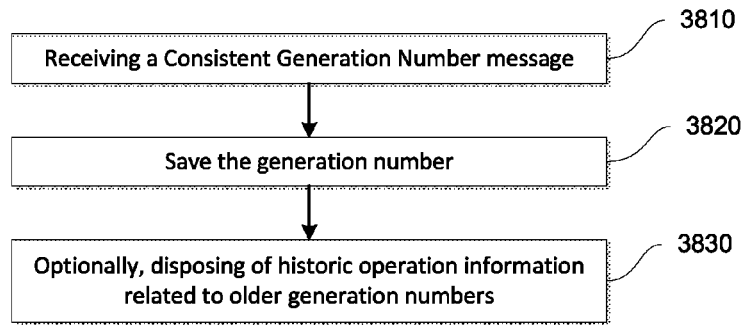
FIG. 10 is a flowchart illustrating a sequence of operations carried out for receiving and processing a consistent generation number message in a DR storage site, according to certain examples of the presently disclosed subject matter.

With reference to the "consistent generation number" message, attention is drawn to FIG. 10, illustrating a sequence of operations carried out for receiving and processing a consistent generation number message in a DR storage site, according to certain examples of the presently disclosed subject matter.

According to some examples of the presently disclosed subject matter, the DR system (e.g. by utilizing DR processing module 3010 installed on one or more of a DR storage site's computer nodes) can be configured to receive a consistent generation number message, indicative of a generation number with which all of the DR storage site associated with a primary storage site are consistent (originating, for example, from a primary storage site, as detailed herein with reference to block 3760) (block 3810).

The DR system can be configured to save the generation number (block 3820) and, optionally to dispose all or part of the historic information (e.g. overwrite counters, old block data, etc.) related to older generation numbers (block 3830).

It is to be noted, with reference to FIG. 10, that some of the blocks can be integrated into a consolidated block or can be broken down to a few blocks and/or other blocks may be added. Furthermore, in some cases, the blocks can be performed in a different order than described herein. It should also be noted that whilst the flow diagrams are described also with reference to the system elements that realize them, this is by no means binding, and the blocks can be performed by elements other than those described herein.

It can be appreciated, while referring for example to blocks 3730, 3525 and 3535 described herein, that there could be at least two write scenarios relating to a write on a DR storage site. Attention is now drawn to FIG. 11, illustrating a sequence of operations carried out for writing a DR enabling data slice in a DR storage site, according to certain examples of the presently disclosed subject matter.

According to some examples of the presently disclosed subject matter, the DR system (e.g. by utilizing DR processing module 3010 installed on one or more of a DR storage site's computer nodes) can be configured to receive a write request for a DR enabling data slice (block 3910).

The DR system can be configured to check if the write request is accompanied by an overwrite counter (as in some cases, the write request can be triggered by a cache flush request, as detailed herein inter alia with reference to FIG. 9) (block 3920). If it is not, the DR system can be configured to save the written data and an indication of its generation number locally (block 3940). If however the write request is accompanied by an overwrite counter, the DR system can be configured to save the written data, the overwrite counter and the generation number of the write request locally (block 3930).

Figure 11:
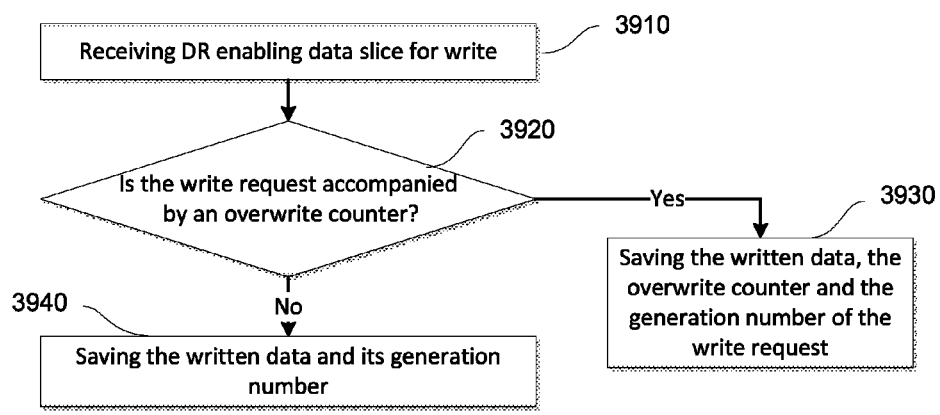
FIG. 11 is a flowchart illustrating a sequence of operations carried out for writing a DR enabling data slice in a DR storage site, according to certain examples of the presently disclosed subject matter.

It is to be noted, with reference to FIG. 11, that some of the blocks can be integrated into a consolidated block or can be broken down to a few blocks and/or other blocks may be added. Furthermore, in some cases, the blocks can be performed in a different order than described herein. It should also be noted that whilst the flow diagrams are described also with reference to the system elements that realize them, this is by no means binding, and the blocks can be performed by elements other than those described herein.

The DR system can be configured to enable recovery of all or part of the data stored on the primary storage site in case the data is inaccessible. In this respect, attention is drawn to FIG. 12, illustrating a sequence of operations carried out for recovering data stored on a primary storage site in case the data is inaccessible, according to certain examples of the presently disclosed subject matter.

The DR system (e.g. by utilizing DR recovery module 3020 installed on one or more of the active storage site's computer nodes, where an active storage site could be the primary storage site or one of the DR storage sites in case the primary storage site fails) can be configured to receive an inaccessibility notification (that can originate from any source, including by the DR system itself and/or by a user of the DR system, etc.), indicative that all or part of the data stored on the primary storage site is inaccessible for some reason (block 4110). Following receipt of such notification, the DR system can be configured to select a target storage site on which a replication of the inaccessible data can be rebuilt (block 4120). It is to be noted that in some cases, the target storage site can be the primary storage site (in case the primary storage site is accessible and capable of containing the replication). In other cases, the target storage site can be one of the DR storage sites associated with the primary storage site (in case the DR storage site is capable of containing the replication). In still other cases, the target storage site can be any other storage site that is capable of containing the replication.

In some cases, the DR system can be further configured to calculate consistent generation numbers (block 4130). For this purpose, the DR system can be configured to perform a consistency check (as further detailed inter alia with reference to FIGS. 13 and 14) for flushed generation numbers (the generation numbers for which a flush was performed) starting from the last known consistent generation number (a notification of which is received for example as detailed herein, inter alia with reference to block 3760) (block 4130) upwards, until a inconsistent flushed generation number is found or the last flushed generation number is verified to be consistent. Alternatively the consistency check can be performed starting from the highest flushed generation number (the last generation number for which a flush was performed) downwards, until a consistent generation number is found.

The DR system can be still further configured to select a consistent generation number (in some cases the maximal consistent generation number) (block 4140), instruct the primary and/or DR storage sites to provide the target storage site with the consistent DR enabling data (associated with the selected consistent generation number) relating the inaccessible data (block 4150), and recover a replication of the inaccessible data in the target storage site based on the DR enabling data received in response to the instruction (e.g. by operating a reverse function that recovers the original written blocks based on the DR enabling data) (block 4160).

It is to be noted, with reference to FIG. 12, that some of the blocks can be integrated into a consolidated block or can be broken down to a few blocks and/or other blocks may be added. Furthermore, in some cases, the blocks can be performed in a different order than described herein. It should also be noted that whilst the flow diagrams are described also with reference to the system elements that realize them, this is by no means binding, and the blocks can be performed by elements other than those described herein.

Figure 13:
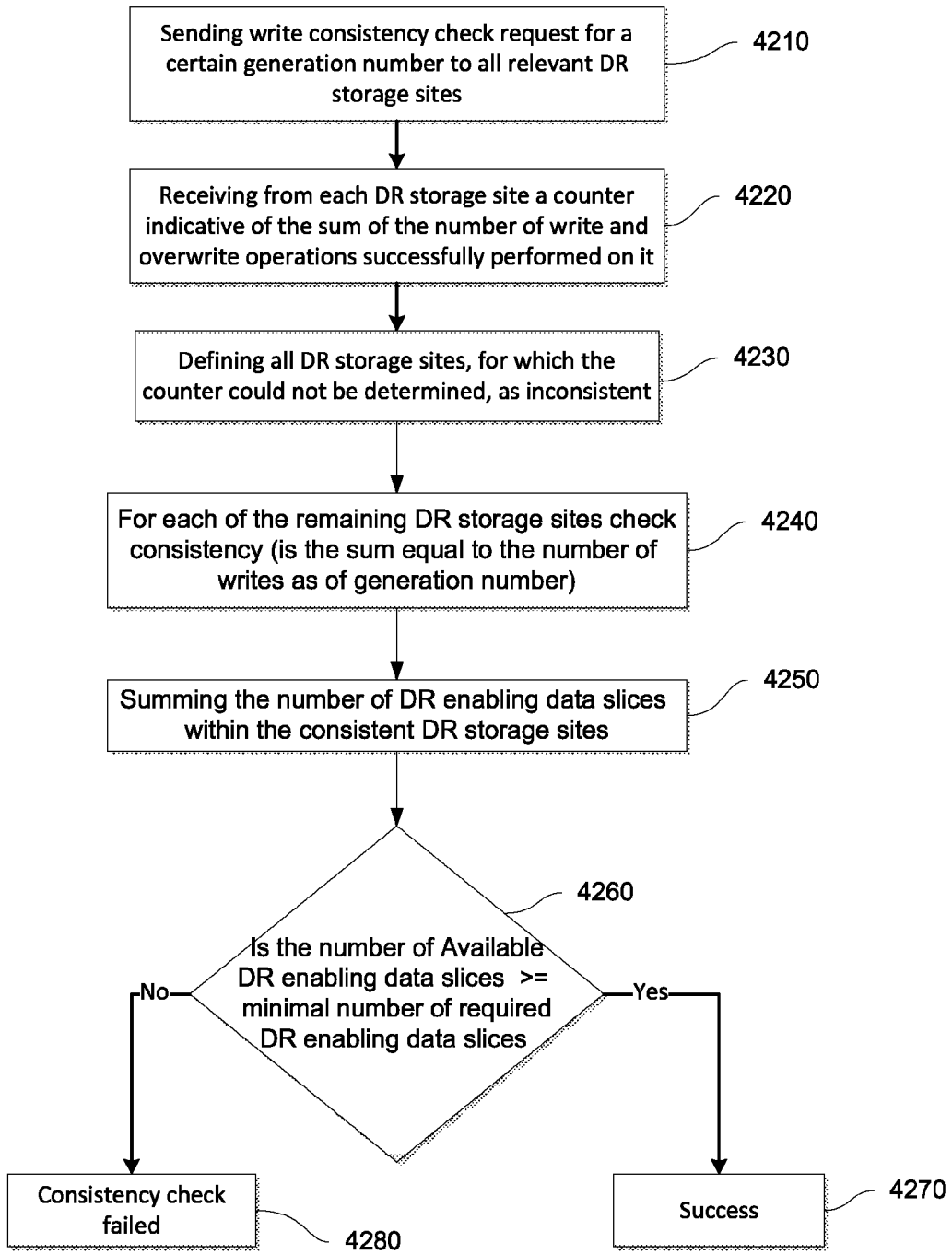
FIG. 13 is a flowchart illustrating a sequence of operations carried out for performing a consistency check for a certain generation number within all DR storage sites storing one or more DR enabling data slices relating to inaccessible data, according to certain examples of the presently disclosed subject matter.

As indicated above, in some cases, in order to determine consistent generation numbers, the DR system can be configured to perform a consistency check. Attention is now drawn to FIG. 13, illustrating a sequence of operations carried out for performing a consistency check for a certain generation number within all DR storage sites storing one or more DR enabling data slices relating to inaccessible data, according to certain examples of the presently disclosed subject matter.

The DR system (e.g. by utilizing DR recovery module 3020 installed on one or more of the active storage site's computer nodes, where an active storage site could be the primary storage site or one of the DR storage sites in case the primary storage site fails) can be configured to send a write consistency check for a certain generation number to all DR storage sites storing one or more DR enabling data slices relating to data that is inaccessible in the primary storage site (block 4210).

In response to the write consistency check, the DR system can be configured to receive, from each of these DR storage sites, a consistency response, comprising a counter indicative of the sum of the number of successful write operations, having a generation number between a known consistency point (e.g. the last known consistent flushed generation number) and the generation number for which the consistency check is performed, that have been performed on the DR storage site and the overwrite counters associated with the write operations, if any (block 4220). In some cases, the DR system can be further configured to define all of the DR storage sites that were unable to determine the counter as inconsistent (e.g. by setting an appropriate flag) (block 4230).

In some cases, the DR system can be further configured to check, for each of the DR storage sites that are not defined as inconsistent, if the counter equals to the number of write requests relating to the inaccessible data that have been performed in the primary storage site (block 4240). If the number is equal—the DR storage site can define the respective DR storage site as consistent, whereas in case the number is not equal the DR storage site can define the respective DR storage site as inconsistent (e.g. by setting an appropriate flag).

In some cases, the DR system can be still further configured to sum the number of DR enabling data slices within the consistent DR storage sites (block 4250), and check if the sum is greater than or equal to the minimal number of DR enabling data slices required in order to recover the inaccessible data (block 4260). If so—the consistency check is successful (block 4270) whereas if not—the consistency check failed (block 4280).

It is to be noted, with reference to FIG. 13, that some of the blocks can be integrated into a consolidated block or can be broken down to a few blocks and/or other blocks may be added. Furthermore, in some cases, the blocks can be performed in a different order than described herein. It should also be noted that whilst the flow diagrams are described also with reference to the system elements that realize them, this is by no means binding, and the blocks can be performed by elements other than those described herein.

Figure 14:
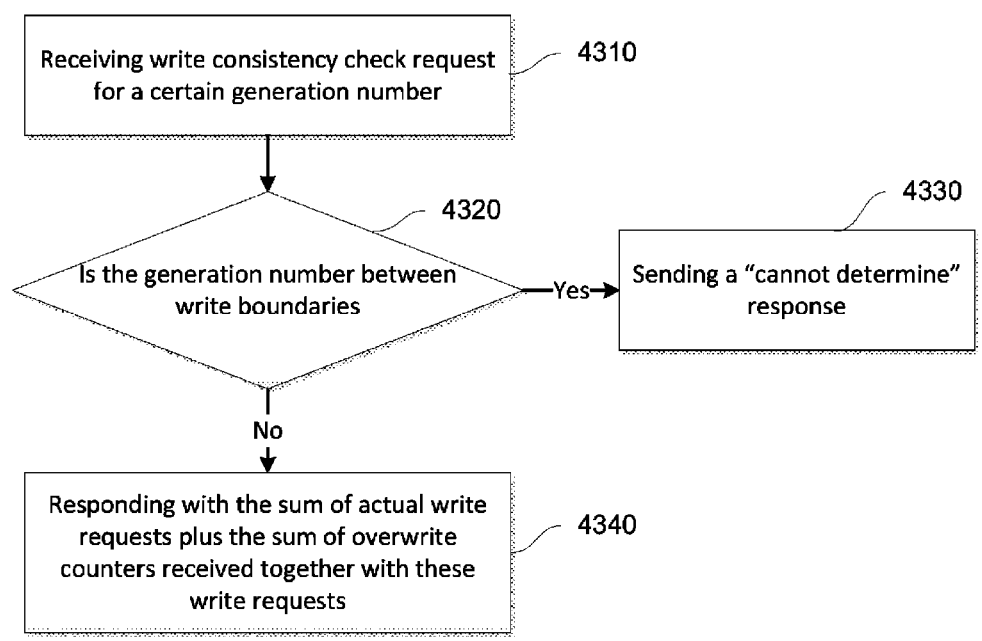
FIG. 14 is a flowchart illustrating a sequence of operations carried out for performing a consistency check for a certain generation number on a DR storage site storing one or more DR enabling data slices relating to inaccessible data, according to certain examples of the presently disclosed subject matter.
Figure 15:
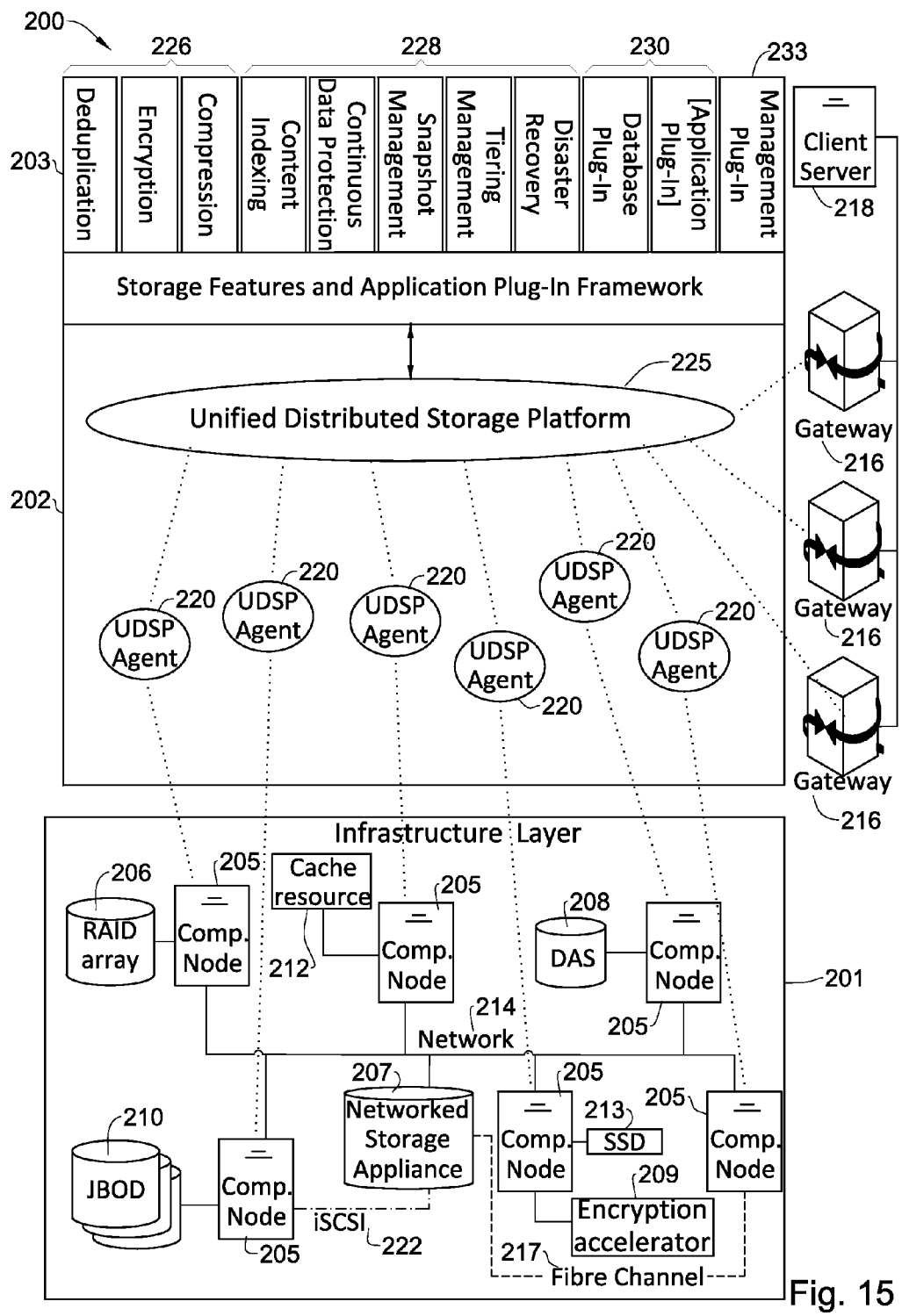
FIG. 15 schematically illustrates a top-level architecture of a Distributed Storage System including an Infrastructure Layer, according to an exemplary embodiment of the invention.

Attention is now drawn to FIG. 14, illustrating a sequence of operations carried out for performing a consistency check for a certain generation number on a DR storage site storing one or more DR enabling data slices relating to inaccessible data, according to certain examples of the presently disclosed subject matter.

The DR system (e.g. by utilizing DR recovery module 3020 installed on one or more of the DR storage site's computer nodes) can be configured to receive a write consistency check for a certain generation number (block 4310).

In some cases, the DR system can be configured to check if the generation number, for which the write consistency check is performed, is not a generation number for which a flush was performed (block 4320). It is to be noted that for this purpose, the DR system can utilize, for example, appropriate indications associated with write requests resulting from a flush request. If the generation number is not a generation number for which a flush was performed—the DR system can be configured to return a response that consistency cannot be determined (it can be appreciated that in case the generation number is not a generation number for which a flush was performed, due to the caching mechanism described herein, consistency of such a generation number cannot be determined)(block 4330). If, however, the generation number is a generation number for which a flush was performed, the DR system can be configured to return a counter indicative of the sum of the successful write operations, having a generation number between the last known consistent flushed generation number and the generation number for which the consistency check is performed, that have been performed on the DR storage site and the overwrite counters associated with the write operations, if any (block 4340).

It is to be noted, with reference to FIG. 14, that some of the blocks can be integrated into a consolidated block or can be broken down to a few blocks and/or other blocks may be added. Furthermore, in some cases, the blocks can be performed in a different order than described herein. It should also be noted that whilst the flow diagrams are described also with reference to the system elements that realize them, this is by no means binding, and the blocks can be performed by elements other than those described herein.

In the description, the term partially asynchronously is used. It is to be noted that partially asynchronously means that in some cases, part of the DR related operations (such as the DR enabling data slices dispersal) can be performed synchronously, however, at least part of the DR related operations are performed asynchronously.

It is to be noted that the description provided above refers to a non-interleaved storage data system. However, following the same logic, it can be adapted to operate in an interleaved storage system, i.e. such that contains multiple storage components as described above, each responsible for storing part of the above storage block space. In such cases, it can be appreciated that the consistency check mechanism described above can be easily modified to count the number of interleaved write and overwrite operations by summing up individual counters from each such underlying storage component, thereby determining, using the same logic, if such an interleaved system is consistent for a certain generation number.

As indicated above, the storage system 10 can be any type of storage system and/or a combination of two or more storage systems, including, but not limited to, storage systems known in the art. In some cases, the storage system 10 can be the Distributed Storage System described herein, with reference to FIGS. 15-37. Attention is now drawn to FIG. 15, which schematically illustrates a top-level architecture of a Distributed Storage System including an Infrastructure Layer, according to the presently disclosed subject matter. According to examples of the presently disclosed subject matter, Distributed Storage System (DSS) 200 can comprise one or more of the following layers: an Infrastructure Layer 201, a Unified Distributed Storage Platform (UDSP) layer 202, and an API/framework layer 203.

Figure 18:
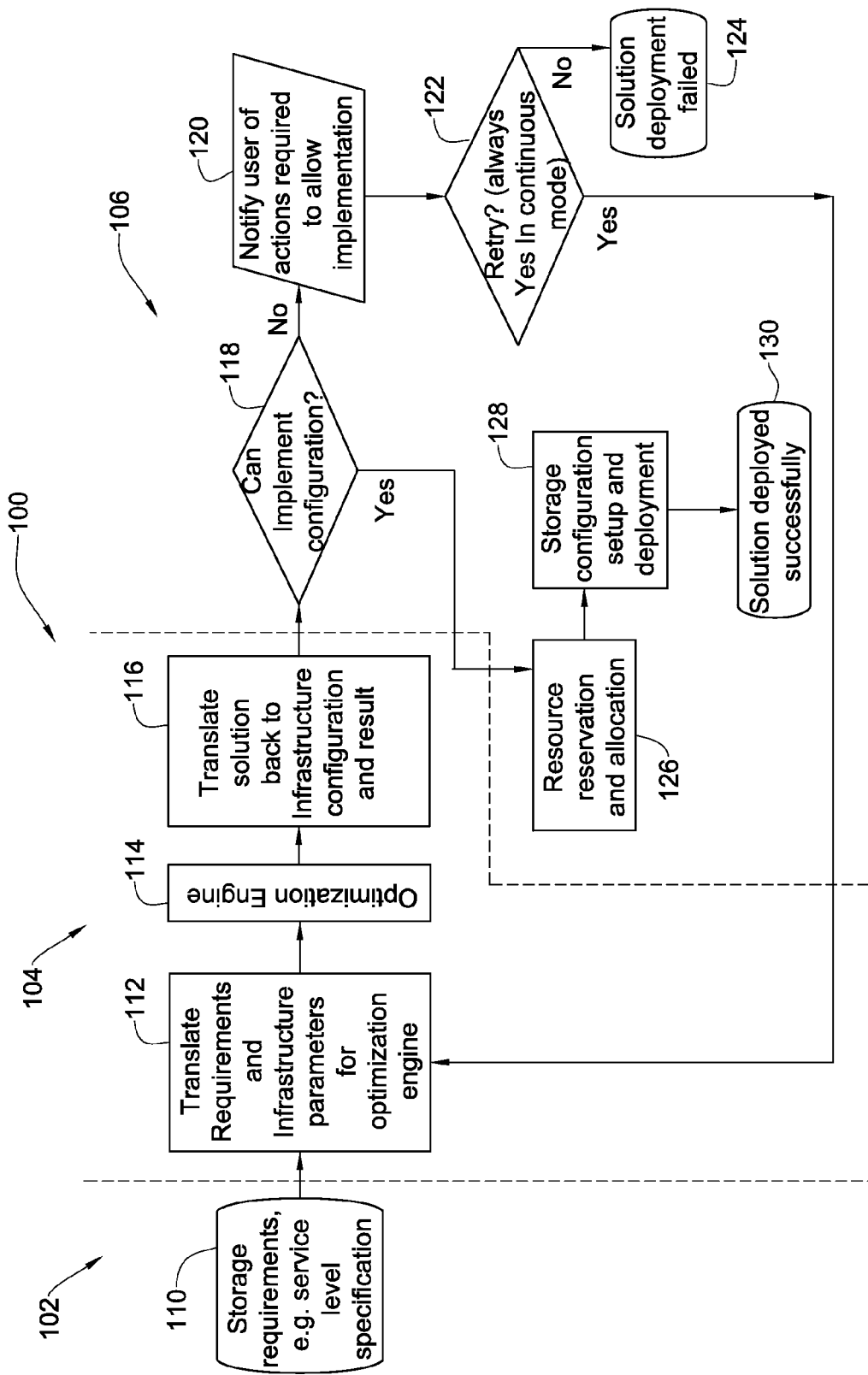
FIG. 18 schematically illustrates a simplified flow diagram of an exemplary operational algorithm of a configuration process performed by the objective-based management system, according to the presently disclosed subject matter.
Figure 19:
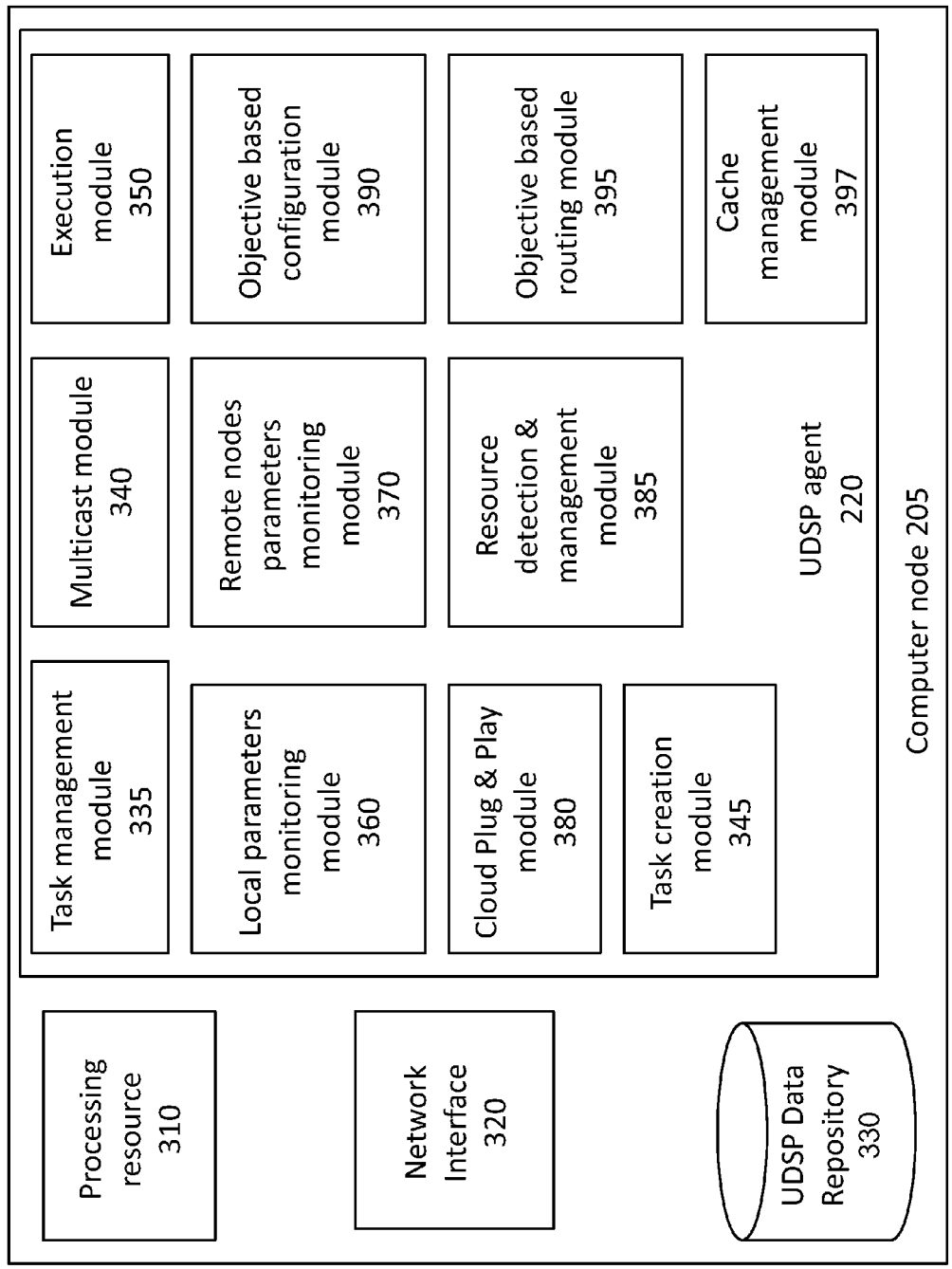
FIG. 19 is a block diagram schematically illustrating an exemplary computer node connected to the Distributed Storage System, according to certain examples of the presently disclosed subject matter.

According to some examples of the presently disclosed subject matter, infrastructure layer 201 can include one or more interconnected computer nodes 205 (e.g. any type of computer including, inter alia, one or more processing resources such as one or more processing units, one or more memory resources such as a memory, and one or more network interfaces), and in some cases two or more interconnected computer nodes 205, on which a more detailed description is provided herein, inter alia with reference to FIG. 19. The interconnected computer nodes 205 can be distributed between multiple geographical locations and sites. In some cases, the interconnected computer nodes 205 can be distributed between two or more continents, countries, cities, buildings, etc. It is to be noted, with respect to computer nodes, that the reference numeral 250 (used throughout the description of FIGS. 15-37) and the reference numeral 20 (used throughout the description of FIGS. 1-14) are used interchangeably.

Infrastructure layer 201 can further include one or more of the following storage-related resources: (a) data storage resources (e.g. data storage device 204, RAID (redundant array of independent disks) 206, DAS (direct attached storage) 208, JBOD (just a bunch of drives) 210, network storage appliance 207 (e.g. SAN, NAS, etc.), SSD 213, etc.); (b) cache resources 212 such as memory resources (e.g. RAM, DRAM, etc.), volatile and/or non-volatile, and/or a data storage resources (e.g. SSD 213) that in some cases can be used additionally or alternatively as a cache resource), etc.; (c) network resources 214; and (d) additional resources providing further functionality to the DSS 200 and/or enhance its performance (such as compression accelerator, encryption accelerator 209, Host Bus adapter (HBA) enabling communication with SAN resources, etc.).

In some cases, the resources can include more than one of a same type of device, and/or more than one of a different type of device. A more detailed description of some of the resources will follow herein.

In some cases, the computer nodes 250 can be grouped to two or more sub storage systems (e.g. that can act as primary storage sites and/or as DR storage sites) within the DSS 200. Each sub storage system can comprise one or more computer nodes 205, at least one which has at least one data storage resource connected thereto. In some cases, the grouping of the computer nodes 205 is based on their geographic location (e.g. a continent, a country, a city, a street, a building, a floor within a building, a room within a floor, etc.). In some cases, the geographic location can be defined for example by geographical boundaries provided by a user or calculated by the DSS 200. Alternatively or additionally, the grouping can be performed by a user that can associate one or more computer nodes 205 to one or more specific storage sites. It is to be noted that the grouping can be performed in other manners (including automatically, according to various algorithms, externally by a management system, etc.), and based on various considerations, as well. It can be appreciated that each sub storage system can act as one of storage sites 20-a, 20-b, . . . , 20-n.

According to some examples of the presently disclosed subject matter, the computer nodes 205 (and/or the sub storage systems) can be interconnected by a network (e.g. a general-purpose network).

In some cases, one or more of the resources of the infrastructure layer 201 can be connected to one or more computer nodes 205 directly. In some cases, one or more of the resources of the infrastructure layer 201 can be comprised within a computer node 205 and form a part thereof. In some cases, one or more of the resources of the infrastructure layer 201 can be connected (e.g. by a logical connection such as iSCSI 222, etc.) to one or more of the computer nodes 205 by a network (e.g. a general-purpose network).

Optionally, the network can be a general-purpose network. Optionally, the network can include a WAN. Optionally, the WAN can be a global WAN such as, for example, the Internet. Optionally, the network resources can interconnect using an IP network infrastructure. Optionally, the network can be a Storage Area Network (SAN). Optionally, the network can include storage virtualization. Optionally, the network can include a LAN. Optionally, the network infrastructure can include Ethernet, Infiniband, FC (Fibre Channel) 217, FCoE (Fibre Channel over Ethernet), DSL (Digital Subscriber Line), PON (Passive Optical Network), Active Optical Network, ATM (Asynchronous Transfer Mode), etc., or any combination of two or more network infrastructures. Optionally, the network can be any type of network known in the art, including a general purpose network and/or a storage network. Optionally, the network can be any network suitable for applying an objective-based management system for allocating and managing resources within the network, as further detailed herein. Optionally, the network can be a combination of any two or more network types (including, inter alia, the network types disclosed herein).

According to some examples of the presently disclosed subject matter, at least one resource of the infrastructure layer 201 (including, inter alia, the computer nodes 205, the data storage resources, the cache resources, the network resources, additional resources connected to a computer node 205, or any other resources) can be an off-the-shelf, commodity, not purposely-built resource connected to the network and/or to one or more computer nodes 205. It is to be noted that such a resource can be interconnected as detailed herein, irrespective of the resource characteristics such as, for example, manufacturer, size, computing power, capacity, etc. Thus, any resource (including, inter alia, the computer nodes 205), irrespective of its manufacturer, which can communicate with a computer node 205, can be connected to the infrastructure layer 201 and utilized by the DSS 200 as further detailed herein. In some cases any number of resources (including, inter alia, the computer nodes 205) can be connected to the network and/or to one or more computer nodes 205 and utilized by the DSS 200, thus enabling scalability of the DSS 200. In some cases, any number of computer nodes 205 can be connected to the network and any number of resources can be connected to one or more computer nodes 205 and utilized by the DSS 200, thus enabling scalability of the DSS 200.

Turning to the UDSP layer 202, according to some examples of the presently disclosed subject matter, it can include one or more UDSP agents 220 that can be installed on (or otherwise associated with or comprised within) one or more of the computer nodes 205. In some cases, a UDSP agent 220 can be installed on (or otherwise associated with) each of the computer nodes 205. In some cases, a UDSP agent 220 can be additionally installed on (or otherwise associated with) one or more of gateway resources 216 (that can act, inter alia, as protocol converters as further detailed herein), and in some cases, on each of the gateway resources 216. In some cases, a UDSP agent 220 can be additionally installed on (or otherwise associated with) one or more of the client servers 218 (e.g. servers and/or other devices connected to the DSS 200 as clients), and in some cases, on each of the client servers 218. It is to be noted that in some cases, client servers 218 can interact with DSS 200 directly without a need for any gateway resources 216 that are optional. It is to be further noted that in some cases there can be a difference in the UDSP agent 220 (e.g. a difference in its functionality and/or its capability, etc.) according to its installation location or its association (e.g. there can be a difference between a UDSP agent 220 installed on, or otherwise associated with, a computer node 205, a UDSP agent 220 installed on, or otherwise associated with, a gateway resources 216, a UDSP agent 220 installed on, or otherwise associated with, a client server 218, etc.).

It is to be noted that a detailed description of the UDSP agents 220 is provided herein, inter alia with respect to FIG. 19. Having said that, it is to be noted that according to some examples of the presently disclosed subject matter, UDSP agents 220 can be configured to control and manage various operations of DSS 200 (including, inter alia, automatically allocating and managing the resources of the Infrastructure Layer 201, handling data-path operations, controlling and operating a DR process, etc.). In some cases, UDSP agents 220 can be configured to manage a connection of a new computer node 205 to the Infrastructure Layer 201 of DSS 200. In some cases, UDSP agents 220 can be configured to detect resources connected to the computer node 205 on which they are installed and to manage such resources. As indicated above, a more detailed description of the UDSP agents 220 is provided herein, inter alia with respect to FIG. 19.

In some cases, UDSP layer 202 can include UDSP 225 which includes a management system for DSS 200. Optionally, management system processing can be implemented through one or more UDSP agents 220 installed on the computer nodes 205 in Infrastructure Layer 201, or through one or more UDSP agents 220 installed on a gateway resource 216 or on a client server 218 with access to DSS 200 (e.g. directly and/or through gateway resources 216), or any combination thereof.

Management system can enable a user to perform various management tasks (including, inter alia monitoring and reporting tasks) relating to DSS 200, such as, creating new logical storage entities (such as Logical Units, Object Stores, file system instances, etc.) that can be associated with Service Level Specifications (SLSs) (in some cases, each logical storage entity is associated with a single SLS), updating logical storage entities, granting access permissions of logical storage entities to gateway resources 216 and/or to client servers 218, creating snapshots, creating backups, failover to remote site, failback to primary site, monitoring dynamic behavior of DSS 200, monitoring SLSs compliance, generation of various (e.g. pre-defined and/or user-defined, etc.) reports (e.g. performance reports, resource availability reports, inventory reports, relationship reports indicative of relationships between computer nodes 205 and other resources, trend reports and forecast reports of various parameters including Key Performance Indicators, etc.) referring to different scopes of the DSS 200 (e.g. in the resolution of the entire DSS 200; certain storage sites such as primary and or DR storage sites; certain types of use such as for a certain SLS; certain resources; etc.), managing various alerts provided by DSS 200 (e.g. alerts of failed hardware, etc.), etc. It is to be noted that the above management tasks are provided as non-limiting examples only. It is to be noted that in some cases, the logical storage entities can be created automatically by DSS 200 according to the SLS, as further detailed herein. It is to be noted that each of the logical storage entities can be associated with one or more data storage resources.

In some cases, management system can enable a user to provide DSS 200 with user-defined storage requirements defining a service level specification (SLS) specifying various requirements that the user requires the DSS 200 to meet. In some cases, the SLS can be associated with a logical storage entity. Optionally, the SLS can include information such as, for example, specifications of one or more geographical locations where the data is to be stored and/or handled; a local protection level defining availability, retention, DR requirements (such as Recovery Point Objective—RPO, Recovery Time Objective—RTO, required global and/or local redundancy level, a remote protection level for DR defining one or more remote geographical locations in order to achieve specified availability, retention and recovery goals under various disaster scenarios, etc., as further detailed inter alia with reference to FIG. 4); a backup retention policy defining for how long information should be retained; local and/or remote replication policy; performance levels (optionally committed) defined using metrics such as IOPS (input/output operations per second), response time, and throughput; encryption requirements; de-duplication requirements; compression requirements; a storage method (physical capacity, thin capacity/provisioning), etc.

In some cases, management system can enable management (including creation, update and deletion) of various Service Level Groups (SLGs). An SLG is a template SLS that can be shared among multiple logical storage entities. An SLG can be a partial SLS (that requires augmentation) and/or contain settings that can be overridden. Thus, for example, an SLG can define various recovery parameters only that can be inherited by various SLSs, each of which can add and/or override SLS parameters.

According to some examples of the presently disclosed subject matter, UDSP 225 can include an automatic management system for allocating resources and managing the resources in the DSS 200. Optionally, the automatic management system is an Objective-Based Management System (OBMS) 100 that can be configured to allocate and manage the resources in the network, inter alia based on any one of, or any combination of, user-defined requirements defined by one or more service level specifications (SLSs) (that can include, inter alia, DR requirements), data of various parameters relating to computer nodes 205 and/or to resources connected thereto and/or to storage sites (such as primary and or DR storage sites), data of various parameters that refer to the DSS 200 or parts thereof (e.g. maximal allowed site-level over-commit, maximal allowed overall over-commit, various security parameters, etc.) and data of various parameters that refer to the dynamic behavior of the DSS 200 and/or the storage sites (such as primary and/or DR storage sites) and/or the environment (e.g. the client servers 218, gateway resources 216, etc.), as further detailed herein, inter alia with respect to FIG. 16 and FIG. 19. Optionally, OBMS 100 processing can be implemented through one or more UDSP agents 220 installed on one or more of the computer nodes 205 in Infrastructure Layer 201, or through one or more UDSP agents 220 installed on a gateway resource 216 or on a client server 218 with access to DSS 200 (e.g. directly or through gateway resources 216), or any combination thereof.

According to some examples of the presently disclosed subject matter, API/framework layer 203 includes a plug-in layer which facilitates addition of software extensions (plug-ins) to DSS 200. Such plug-ins can be utilized for example for applying processes to the data, introducing new functionality and features to DSS 200, interfacing DSS 200 with specific applications and implementing application-specific tasks (e.g. storage related tasks, etc.), implementing various resource specific drivers, introducing new SLS parameters (that can include, inter alia, DR requirements) and/or parameter group/s (e.g. in relation to a plug-in functionality and/or goals), implementing management functionality, etc. In some cases, the plug-in layer can also include drivers associated with various hardware components (e.g. encryption cards, etc.).

In some cases the plug-ins can be deployed on one or more UDSP agents 220. In some cases, the plug-ins can be deployed on one or more UDSP agents 220 for example, according to the plug-in specifications (e.g. a software encryption plug-in can be installed on any UDSP agent 220), according to various resources connected to a computer node 205 and/or to a gateway resource 216 and/or to a client server 218 on which a UDSP agent 220 is installed (e.g. a hardware accelerator plug-in can be automatically deployed on each UDSP agent 220 associated with a computer node 205 that is associated with such a hardware accelerator), according to a decision of the automatic management system (e.g. OBMS 100), or according to a selection of a system administrator, etc. In some cases the plug-ins can be deployed automatically, e.g. by the automatic management system (e.g. OBMS 100) and/or by the computer nodes 205. Optionally, the software extensions can include data processing plug-ins 226 such as, for example, a data deduplication plug-in enabling for example deduplication of data stored on DSS 200, a data encryption plug-in enabling for example encryption/decryption of data stored on DSS 200, a data compression plug-in enabling for example compression/decompression of data stored on DSS 200, etc. Optionally, the software extensions can include storage feature plug-ins 228 such as, for example, a content indexing plug-in enabling for example indexing of data stored on DSS 200, a snapshot management plug-in enabling management of snapshots of data stored on DSS 200, a tiering management plug-in enabling for example tiering of data stored on DSS 200, a disaster recovery plug-in enabling for example management of process, policies and procedures related to disaster recovery, a distribution plug-in for calculating information dispersal parameters (not shown), a continuous data protection plug-in enabling for example management of continuous or real time backup of data stored on DSS 200, etc. Optionally, the software extensions can include application plug-ins 230 such as, for example a database plug-in enabling for example accelerating query processing, a management plug-in 233 enabling for example performance of various DSS 200 management tasks and other interactions with users, client servers 218, and other entities connected to DSS 200, and other suitable application plug-ins.

As indicated herein, in some cases, a plug-in can introduce new SLS parameters and/or parameter group(s) (e.g. in relation to a plug-in functionality and/or goals). In such cases, according to the plug-in functionality, respective SLS parameters and/or parameter group(s) can be introduced to DSS 200. Such introduced SLS parameters can be used in order to set plug-in related requirements, e.g. by a user and/or automatically by the automatic management system (e.g. OBMS 100), etc.

In some cases, the software extensions can be stored on one of the computer nodes 205 or distributed on more than one computer node 205. In some cases, the software extensions can be stored on one or more data storage resources connected to one or more computer nodes 205. In some cases, the software extensions can be stored in a virtual software extensions library that can be shared by the UDSP agents 220.

In some cases, the software extensions can be managed, automatically and/or manually (e.g. by a system administrator). Such management can sometimes be performed by utilizing the management plug-in 233. In such cases, management plug-in 233 can enable addition/removal of software extension to/from DSS 200, addition/removal of various software extensions to/from one or more UDSP agents 220, etc.

Figure 16:
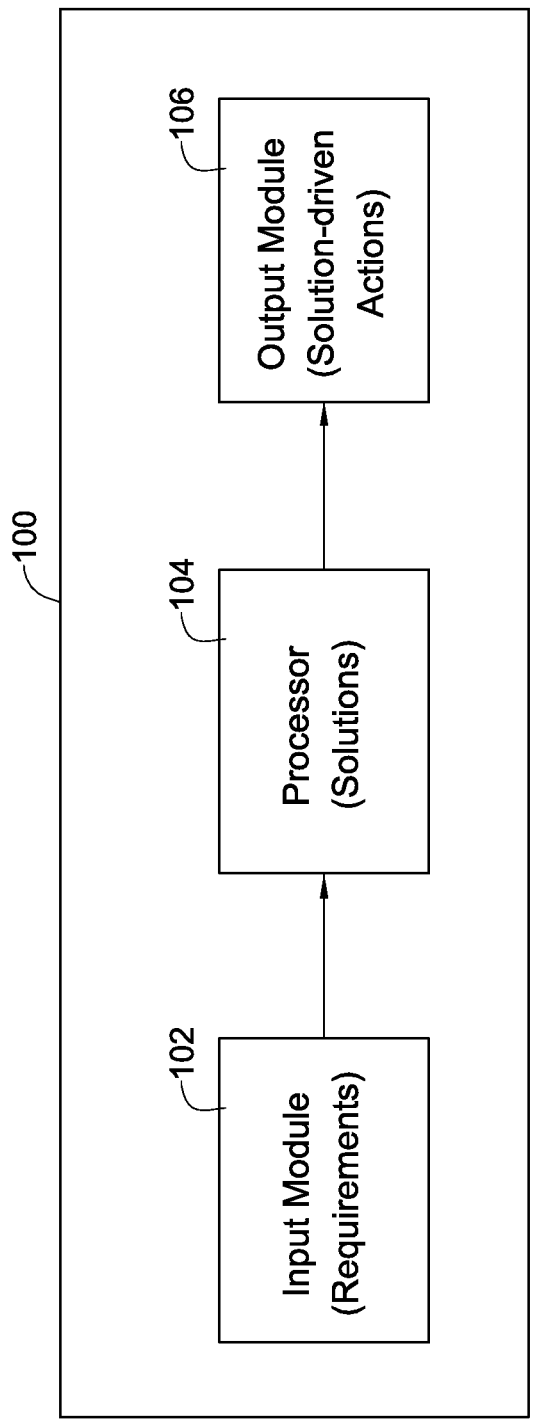
FIG. 16 schematically illustrates a simplified, exemplary system for configuring a Distributed Storage System, according to the presently disclosed subject matter.

Following the description of the top-level architecture of DSS 200, a detailed description of a DSS 200 configuration process that can be performed by Objective Based Management System (OBMS) 100 is hereby provided. For this purpose, attention is now drawn to FIG. 16, illustrating a simplified, exemplary system for configuring a Distributed Storage System 200, according to the presently disclosed subject matter. For this purpose, OBMS 100 can be configured, inter alia, to automatically allocate and manage resources in the Infrastructure Layer 201. OBMS 100 can include an Input Module 102, one or more Processors 104, and an Output Module 106.

In some cases, input Module 102 can be configured to receive input data. Such input data can include, inter alia, any one of, or any combination of, user-defined storage requirements defined by one or more service level specifications (SLSs) (that can include, inter alia, DR requirements), definitions of one or more logical storage entities, data of various parameters relating to computer nodes 205 and/or to resources connected thereto (including storage-related resources, also referred to as storage-related resources data), data of various parameters that refer to the DSS 200 and/or parts thereof (e.g. maximal allowed site-level over-commit, maximal allowed overall over-commit, various security parameters, etc.) and/or to the storage sites (such as primary and/or DR storage sites), data of various parameters relating to dynamic behavior (dynamic behavior parameter data) of the DSS 200 and the environment (e.g. the client servers 218, gateway resources 216, etc.), etc.

In some cases, user-defined requirements can define one or more service level specifications (SLSs) (that can include, inter alia, DR requirements) specifying various requirements that one or more users require the DSS 200 and/or one or more logical storage entities to meet.

In some cases, the data of various parameters relating to dynamic behavior of the DSS 200 and the environment (dynamic behavior parameter data) can include various parameters data indicative of the current state of one or more of the DSS 200 components (including the storage sites, the computer nodes 205 and the resources connected thereto). Such data can include data of presence and/or loads and/or availability and/or faults and/or capabilities and/or response time(s) and/or connectivity and/or cost(s) (e.g. costs of network links, different types of data storage resources) and/or any other data relating to one or more of the resources, including data relating to one or more storage site, one or more computer nodes 205, one or more gateway resources 216, one or more client servers 218, etc. In some cases, such data can include, inter alia, various statistical data.

In some cases, the data of various parameters relating to computer nodes 205 and/or to resources connected thereto (including storage-related resources, also referred to as storage-related resources data) can include data of various parameters indicative of the resources of the DSS 200, including hardware resources, including storage-related resources, such as, for example:
  a. parameters relating to a data storage resource, (e.g. for each of the its hard drives):
    1. Hard drive category parameters (e.g. hard drive size, interface (e.g. SAS, SATA, FC, Ultra-SCSI, etc.), cache size, special features (e.g. on-drive encryption, etc.), etc.);
    2. Hard drive performance parameters (e.g. response time, average latency, random seek time, data transfer rate, etc.);
    3. Hard drive power consumption;
    4. Hard drive reliability parameters (e.g. Mean Time Between Failure (MTBF), Annual Failure Rate (AFR), etc.).
  b. computer node 205 parameters:
    1. Number of CPUs and cores per CPU.
    2. Performance parameters of each CPU and/or core, such as frequency, L2 and L3 cache sizes.
    3. Architecture (e.g. does the CPU and/or core support 64-bit computing, is it little-endian or big-endian)
    4. Support for certain instruction sets (e.g. AES-NI, a new instruction set for speeding up AES encryption).
    5. Number of hard drive slots available;
    6. Available storage interfaces (SATA, SAS, etc.);
    7. Maximal amount of memory;
    8. Supported memory configurations;
  c. Cache resource parameters:
    1. Cache resource type (e.g. DRAM, SSD), size and performance.
    2. Is the cached storage space local or remote.
    3. NUMA parameters.
  d. Gateway resource parameters:
    1. Number of CPUs and cores per CPU.
    2. Performance parameters of each CPU and/or core, such as frequency, L2 and L3 cache sizes.
    3. Architecture (e.g. does the CPU and/or core support 64-bit computing, is it little-endian or big-endian)
    4. Support for certain instruction sets (e.g. AES-NI, a new instruction set for speeding up AES encryption).
    5. Number of hard drive slots available in the enclosure;
    6. Available storage interfaces (SATA, SAS, etc.);
    7. Maximal amount of memory;
    8. Supported memory configurations;
    9. Networking parameters relating to gateway (number of ports, speed and type of each port, etc.)
  e. Network resource parameters:
    1. Switching and routing capacities;
    2. Network types;
    3. Security parameters.

It is to be noted that these are mere examples and additional and/or alternative various parameters can be used.

In some cases, data relating to dynamic behavior of the DSS 200 and the environment (dynamic behavior parameter data) can include various parameters indicative of the resources of the DSS 200, including hardware resources such as, for example:
  a. Parameters relating to a data storage resource (e.g. for each of its hard drives):
    1. Hard drive free space.
    2. S.M.A.R.T. parameters of the hard drive.
    3. The power state of the hard drive (turned off, in spin-up phase, ready, etc.)
    4. Recent and current load on hard drive.
    5. Existing allocations and reservations.
  b. Computer node 205 parameters:
    1. Recent and current load statistics for each core.
    2. Existing allocations and reservations.
    3. Current amount of memory.
  c. Cache resource parameters:
    1. Available size.
    2. Occupancy level of the cache.
    3. Recent and current swapping/page fault statistics.
    4. Existing allocations and reservations.
  d. Gateway resource parameters:
    1. Recent and current network connections statistics.
    2. Recent and current node load statistics.
    3. Recent and current latency statistics.
    4. Recent and current routing cost statistics (for commands routed by a gateway into a DSS).
    5. Existing allocations and reservations.
  e. Network resource parameters:
    1. Recent and current load of network segments.
    2. Recent and current reliability and quality parameters of network segments.
    3. Existing allocations and reservations.

It is to be noted that these are mere examples and additional and/or alternative various parameters can be used.

In some cases, input Module 102 can be configured to transfer the input data to one or more Processors 104. As indicated, OBMS 100 processing can be implemented through one or more UDSP agents 220 (e.g. while utilizing Objective based configuration module 380 as further detailed herein, inter alia with reference to FIG. 19), e.g. through UDSP agents 220 installed on one or more of the computer nodes 205 in Infrastructure Layer 201, or through UDSP agents 220 installed on one or more gateway resources 216, or through UDSP agents 220 installed on one or more client servers 218 with access to DSS 200 (e.g. directly or through gateway resources 216), or any combination thereof. In such cases, the one or more processors 104 can be one or more processing resources (e.g. processing units) associated with such UDSP agents 220 (e.g. if the processing is implemented through a UDSP agent 220 installed on a computer node 205, then processor can be the processing unit of that computer node 205, etc.). It is to be noted that more than one processing resource (e.g. processing unit) can be used for example in case of parallel and/or distributed processing.

The one or more Processors 104 can be configured to receive the input data from Input Module 102 and to perform an optimization process based on the input data for determining configuration requirements that meet all of the user-defined storage requirements (e.g. SLSs) (that, as indicated above, can include, inter alia, DR requirements) provided by the one or more users of DSS 200, inter alia with respect to entities that they affect (such as logical storage entities associated with such SLSs). A more detailed description of the optimization process and of the determined configuration requirements is provided herein, inter alia with respect to FIG. 17.

The configuration requirements can be transferred to Output Module 106 which, in some cases, can determine if the current DSS 200 resources are sufficient to meet the determined configuration requirements. Accordingly, Output Module 106 can be configured to perform solution-driven actions, which include allocation, reservation, commit or over-commit (e.g. virtually allocating more resources than the actual resources available in the infrastructure layer 201), grouping to storage sites, of the resources if the configuration requirements can be met by the system, or issuing improvement recommendations to be acted upon by the user which may include adding resources and/or adding plug-ins and/or any other recommendations for enabling the system to meet the configuration requirements. Such improvement recommendations can include, for example, recommendation to add one or more resources, to add or upgrade one or more plug-ins, to span the infrastructure across additional and/or different locations (local and/or remote), etc.

It is to be noted that in some cases the configuration process, or parts thereof, can be initiated when deploying the DSS 200 and/or one or more logical storage entities for the first time, and/or following one or more changes (e.g. pre-defined changes) applied to DSS 200 and/or to one or more logical storage entities (e.g. addition/removal of a resource such as computer nodes 205, cache resources, data storage resources, network resources, plug-ins or any other resource to DSS 200; a change in one or more user-defined storage requirements; etc.), and/or according to the dynamic behavior of DSS 200 (as further detailed below, inter alia with respect to FIG. 19 and FIG. 25), etc. Additionally or alternatively, the configuration process, or parts thereof, can be initiated in a semi-continuous manner (e.g. at pre-determined time intervals, etc.). Additionally or alternatively, the configuration process, or parts thereof, can be performed continuously.

It is to be further noted that, with reference to FIG. 16, some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to system elements that realizes them, this is by no means binding, and the blocks can be performed by elements other than those described herein.

Figure 17:
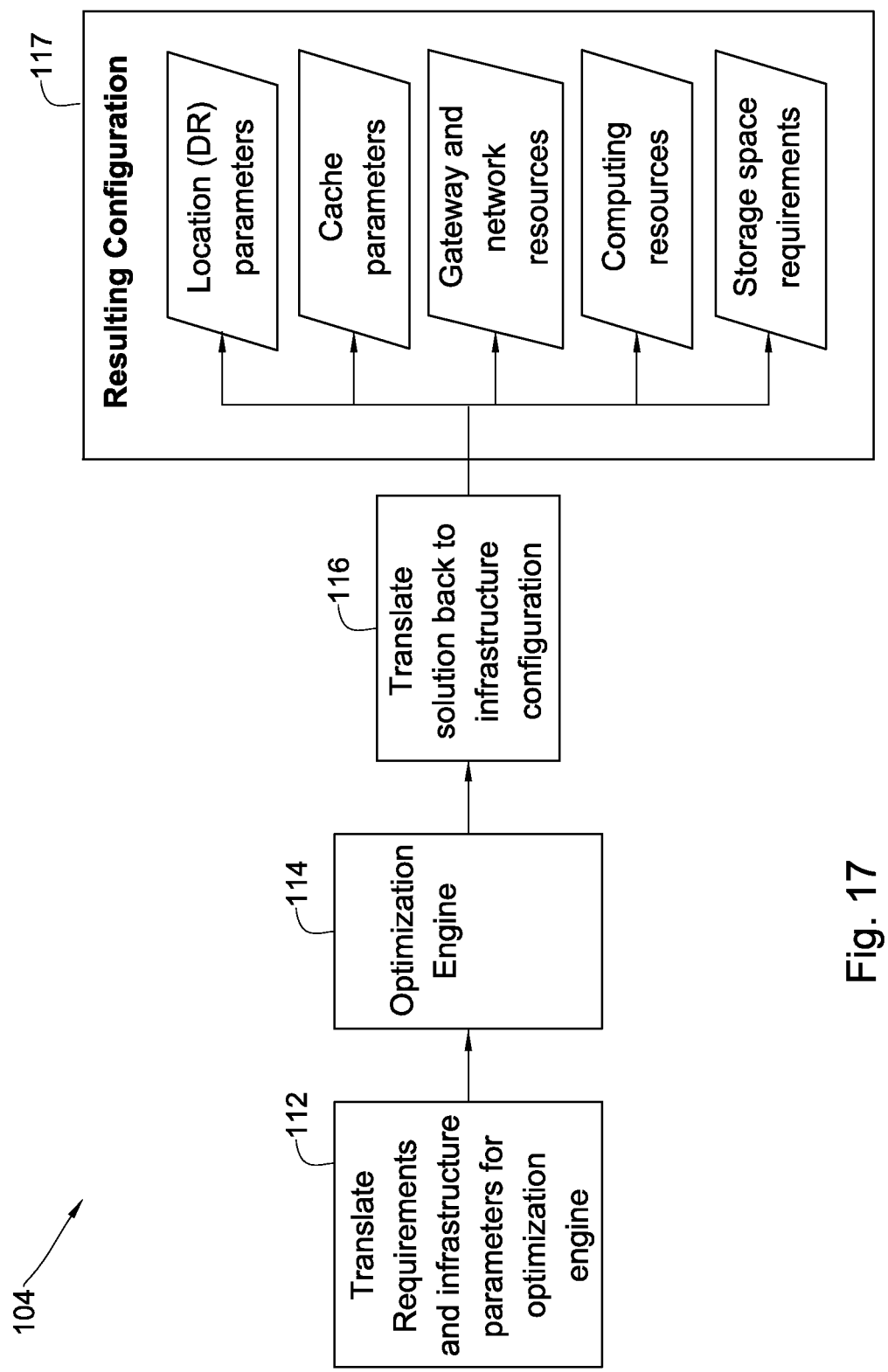
FIG. 17 schematically illustrates a simplified and exemplary flow diagram of an optimization process performed by the objective-based management system, according to the presently disclosed subject matter.

Attention is now drawn to FIG. 17, which schematically illustrates a simplified and exemplary flow diagram of an optimization process performed by the objective-based storage management system, according to the presently disclosed subject matter. In some cases, one or more Processors 104 can be configured to receive input data (e.g. from input module 102) and, in some cases, convert the received input data into a format suitable for processing by an optimization engine (e.g. into an optimization problem representation) (block 112). As indicated above, the optimization engine can be any suitable optimization engine, e.g. ILOG CPLEX Optimizer by International Business Machines Corporation's of New-York United States, Gurobi Optimizer by Gurobi Optimization Inc. of Houston Tex., United States, or any other suitable optimization engine.

An optimization engine associated with one or more Processors 104 can be configured to perform an optimization process, based on the original and/or converted input data to arrive at a required configuration which satisfies the requirements as defined by the input data (as further detailed herein, inter alia with respect to FIG. 16) (block 114). It is to be noted that in some cases, the optimization process can be instructed to return the first valid solution that it finds, whereas in other cases, the optimization process can be instructed to search for the optimal solution out of a set of calculated valid solutions. Optionally, the optimization techniques used in the optimization process can include any one of, or any combination of, linear programming, simulated annealing, genetic algorithms, or any other suitable optimization technique known in the art. Optionally, the optimization technique can utilize heuristics and/or approximations. Optionally, optimization decisions can be taken based on partial and/or not up-to-date information.

In some cases, the output of the optimization engine can be converted by the one or more Processors 104 from an optimization solution representation to a configuration requirements representation (block 116).

In some cases, the configuration requirements are output by the one or more Processors 104 for example as any one of, or any combination of, the following: location requirements (e.g. availability of one or more additional site (primary storage sites and/or DR storage sites), availability of a certain amount of storage space in the additional site/s, maximal latency between sites, minimal geographical distance between two or more of the sites for example for disaster recovery purposes, etc.), cache resources requirements (e.g. required cache size, required cache type, required cache locations, required cache performance parameters, etc.), gateway resources requirements (e.g. required Fibre Channel bandwidth, required processing performance parameters, etc.), network resources requirements (e.g. required network bandwidth, required network type, etc.), computing resources requirements (e.g. computer nodes processing performance parameters, computer nodes number of CPU cores, etc.), data storage resources requirements (e.g. required storage space, required storage type, etc.), additional resource requirements (e.g. required compression performance, required encryption performance, etc.), plug-in requirements (e.g. required database plug-in, etc.), environment requirements (e.g. required physical security level, etc.), etc. (block 117).

It is to be noted that, with reference to FIG. 17, some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

Turning to FIG. 18, there is shown a schematic illustration of a simplified flow diagram of an exemplary operational algorithm of a configuration process performed by the objective-based management system, according to the presently disclosed subject matter. In some cases, as indicated above, Input Module 102 can receive the input data and transfer the data to the one or more Processors 104 (block 110). As further indicated above, the one or more Processors 104 can, in some cases, convert the input data into a format suitable for processing by an optimization engine (e.g. into an optimization problem representation) (block 112).

An optimization engine associated with one or more Processors 104 can be configured to perform an optimization process, based on the original and/or converted input data to arrive at a required configuration which satisfies the requirements as defined by the input data (as further detailed herein, inter alia with respect to FIG. 16), including, inter alia, DR requirements (block 114). In some cases, the output of the optimization engine can be converted by the one or more Processors 104 from an optimization solution representation to a configuration requirements representation (block 116).

In some cases, output module can compare the required configuration with the actual data of the DSS 200 resources (e.g. the computer nodes 205, the storage sites (primary storage sites and/or DR storage sites), the storage-related resources, etc.) and/or environment for determination if the DSS 200 can meet the required configuration (block 118). It is to be noted that in some cases the actual DSS 200 resources can refer to those parts of the DSS 200 resources that are currently available. If the actual DSS 200 resources and/or environment can meet the required configuration, OBMS 100 can be configured to reserve and/or allocate the resources according to the required configuration (block 126). In some cases, OBMS 100 can be configured to set up the DSS 200 configuration and/or perform any induced deployment actions (block 128). In some cases, the set-up and/or deployment action can include, inter alia, automatically creating new logical storage entities (such as Logical Units, Object Stores, file system instances, etc.) associated with SLSs. In some cases, each logical storage entity is associated with a single SLS.

As part of setting-up the storage configuration and/or performing any induced deployment actions, relevant set-up and/or deployment action requests can be sent to the UDSP agents 205; in some cases such requests are sent to the UDSP agents 205 associated with the storage-related resources relevant for the requested set-up and/or deployment action. In some cases, the UDSP agents 205 that receive such requests can be configured to update a data repository associated therewith about the set-up and/or deployment requested to be used by DSS 200 as further detailed below, inter alia with respect to FIG. 19. In some cases, following the deployment, the process of deploying the DSS 200 ends successfully (block 130). It can be appreciated that the requirements can include DR storage requirements, and the storage configuration, calculated by the optimization engine, can include configuration of a DR process, as further detailed inter alia with reference to FIG. 4.

If the actual DSS 200 resources and/or environment cannot meet the required configuration, OBMS 100 can be configured to send a message to the user (e.g. a system administrator) providing the user with a failure notification and/or recommendations as to corrective actions to be taken by the user for allowing implementation of the required infrastructure configuration (block 120). Optionally, the action can include adding infrastructure resources which will allow successful calculation of a configuration. Optionally, the action can include adding relevant plug-ins. Optionally, the action can involve spanning infrastructure resources across additional and/or alternative locations (e.g. primary and/or DR storage sites). It is to be noted that the recommendations disclosed herein are mere examples, and other recommendations can be additionally or alternatively issued to the user. In some cases, OBMS 100 can be configured to make a decision as to whether the required infrastructure configuration should be re-evaluated, optionally after some interval/delay, or not (block 122). If yes, OBMS 100 can be configured to return to block 112. Optionally, the Output Module 106 automatically goes to 112, optionally after some interval/delay, if set to a continuous mode. Optionally, the decision to retry or not is based on user input of a retry instruction. If no, the process of deploying the DSS 200 failed. In some cases, OBMS 100 can be configured to report failures.

It is to be noted that, with reference to FIG. 18, some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

Attention is now drawn to FIG. 19, in which a block diagram schematically illustrating an exemplary computer node connected to the Distributed Storage System, according to certain examples of the presently disclosed subject matter, is shown.

According to some examples of the presently disclosed subject matter, Computer node 205 can comprise one or more processing resources 310. The one or more processing resources 310 can be a processing unit, a microprocessor, a microcontroller or any other computing device or module, including multiple and/or parallel and/or distributed processing units, which are adapted to independently or cooperatively process data for controlling relevant computer node 205 resources and/or storage-related resources connected to computer node 205 and for enabling operations related to computer node 205 resources and/or to storage-related resources connected to computer node 205.

Computer node 205 can further comprise one or more network interfaces 320 (e.g. a network interface card, or any other suitable device) for enabling computer node 205 to communicate, inter alia with other computer nodes and/or other resources connected to DSS 200.

According to some examples of the presently disclosed subject matter, computer node 205 can be associated with a UDSP data repository 330, configured to store data, including inter alia data of various user-defined storage requirements defining SLSs (that can include, inter alia, DR requirements), and/or data of a logical storage entities associated with each SLS, and/or data of various parameters relating to computer nodes 205 and/or to storage-related resources connected thereto and/or data relating to various parameters that refer to the DSS 200 or parts thereof and/or data relating to storage sites (primary and/or DR storage sites) and/or data relating to dynamic behavior of the DSS 200 and the environment (e.g. the client servers 218, gateway resources 216, etc.), and/or data relating to the DSS 200 set-up and/or deployment and/or any other data. In some cases, UDSP data repository 330 can be further configured to enable retrieval, update and deletion of the stored data. It is to be noted that in some cases, UDSP data repository 330 can be located locally on computer node 205, on a storage-related resource connected to computer node 205 (e.g. a data storage resource, a cache resource, or any other suitable resource), on a client server 218, on a gateway resource 216, or any other suitable location. In some cases, UDSP data repository 330 can be distributed between two or more locations. In some cases, UDSP data repository 330 can be additionally or alternatively stored on one or more logical storage entities within the DSS 200. In some cases, additionally or alternatively, UDSP data repository 330 can be shared between multiple computer nodes.

According to some examples of the presently disclosed subject matter, computer node 205 can further comprise a UDSP agent 220 that can be executed, for example, by the one or more processing resources 310. As indicated above, UDSP agents 220 can be configured, inter alia, to control and manage various operations of computer node 205 and/or DSS 200. UDSP agent 220 can comprise one or more of the following modules: a task management module 335, a multicast module 340, a task creation module 345, an execution module 350, a local parameters monitoring module 360, a remote nodes parameters monitoring module 370, a cloud plug & play module 380, a resource detection and management module 385, an objective based configuration module 390, a cache management module 397 and an objective based routing module 395. In some cases, the UDSP agent can further comprise the DR module 30 (not shown in FIG. 19).

Figure 22:
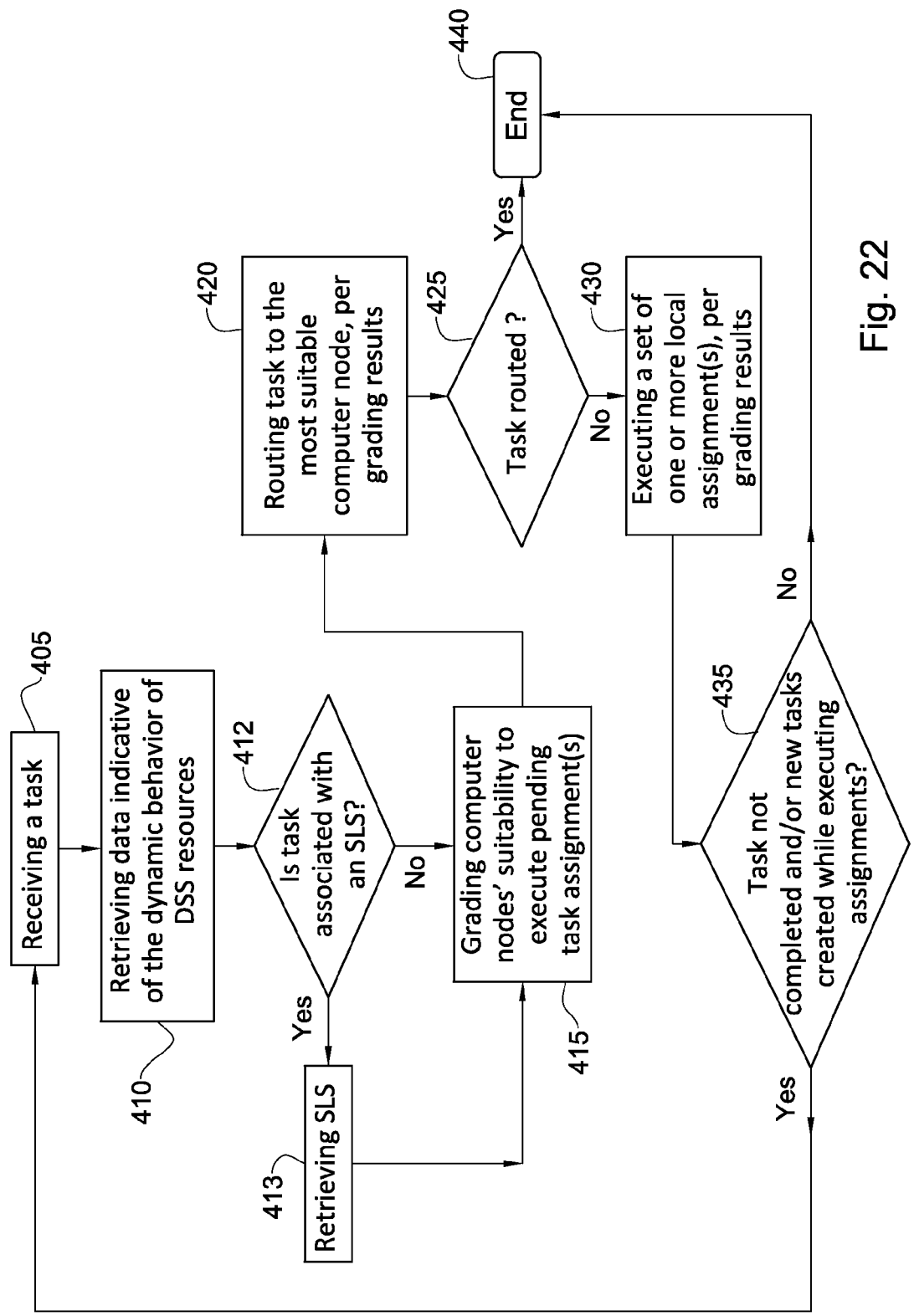
FIG. 22 is a flowchart illustrating a sequence of operations carried out for managing a task received by a UDSP agent, according to certain examples of the presently disclosed subject matter.

According to some examples of the presently disclosed subject matter, task management module 335 can be configured to manage a received task, such as a data path operation (e.g. read/write operation), as further detailed, inter alia with respect to FIG. 22.

Multicast module 340 can be configured to propagate (e.g. by unicast/multicast/recast transmission) various notifications to various UDSP agents 220 (e.g. UDSP agents installed on other computer nodes, gateway resources 216, client servers 218, etc.). Such notifications can include, for example, notifications of a resource status change, notifications of addition of a new resource, notifications of disconnection of a resource, notifications of a change in a local parameter, etc. In addition, multicast module 340 can be configured to handle any protocols between various UDSP agents 220 and other entities of the DSS 200 as well as external entities (such as external management systems, etc.).

Task creation module 345 can be configured to create a new task for execution in DSS 200, as further detailed inter alia with respect to FIGS. 8 and 9.

Figure 24:
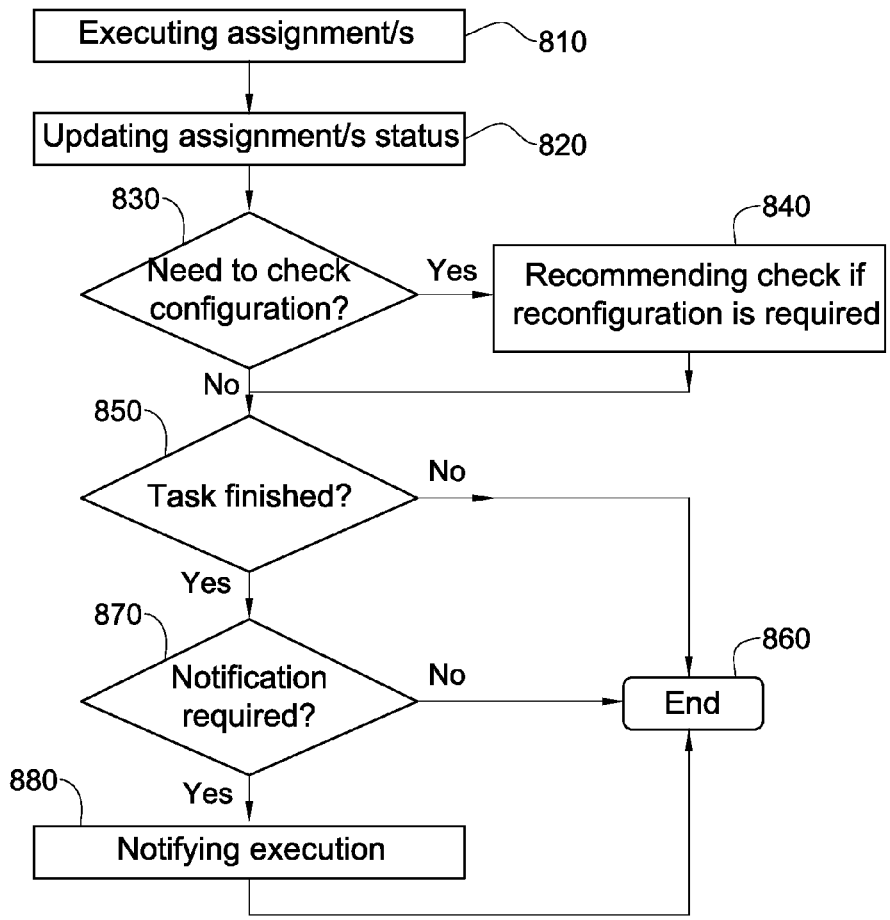
FIG. 24 is a flowchart illustrating a sequence of operations carried out for executing pending assignments on a computer node, according to certain examples of the presently disclosed subject matter.

Execution module 350 can be configured to locally execute one or more assignments associated with a received task, as further detailed herein, inter alia with respect to FIG. 24.

Figure 26:
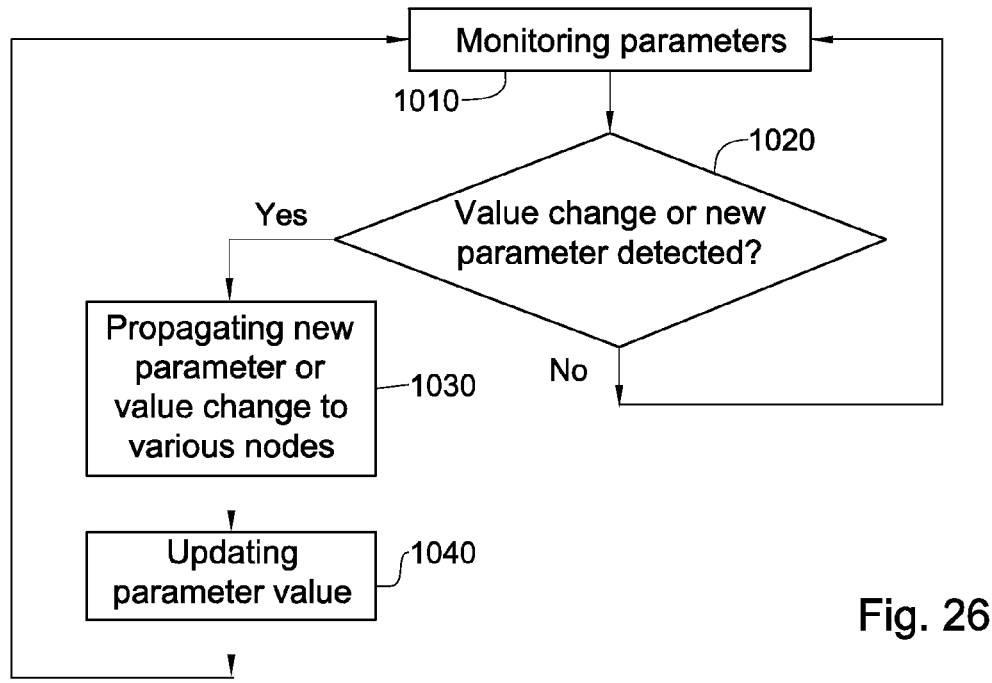
FIG. 26 is a flowchart illustrating a sequence of operations carried out for monitoring local parameters of a computer node and resources connected thereto, according to certain examples of the presently disclosed subject matter.

Local parameters monitoring module 360 can be configured to monitor various local parameters, such as parameters indicative of the dynamic behavior of the computer node 205 and/or any resource connected thereto, and propagate (e.g. while utilizing Multicast module 340) notifications indicative of a change to one or more local parameters, as further detailed, inter alia with respect to FIG. 26. It is to be noted that in some cases local parameters are parameters relating to a specific computer node 205 (or a gateway resource 216 or a client server 218, mutatis mutandis), on which the monitoring is performed, and/or to resources connected thereto.

Figure 29:
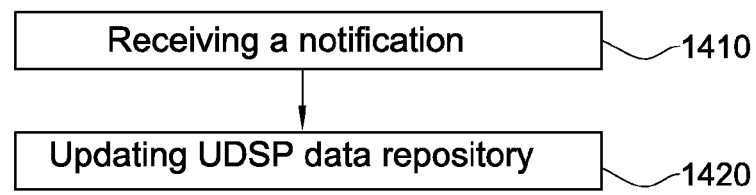
FIG. 29 is a flowchart illustrating a sequence of operations carried out for receiving a notification from a remote computer node and updating a Unified Distributed Storage Platform (UDSP) data repository accordingly, according to certain examples of the presently disclosed subject matter.

Remote nodes parameters monitoring module 370 can be configured to receive notifications indicative of a change in one or more parameters of one or more remote computer nodes 205 and/or resources connected thereto, and update UDSP data repository 330 accordingly, as further detailed, inter alia with respect to FIG. 29. In some cases, remote nodes parameters monitoring module 370 can be configured to register with another computer node 205 (e.g. with a UDSP agent 220 associated with the other computer node 205) to receive selective notifications therefrom. It is to be noted that in some cases, remote nodes parameters monitoring module 370 can be configured to independently and/or actively query a remote computer node 205 for any required information.

Figure 28:
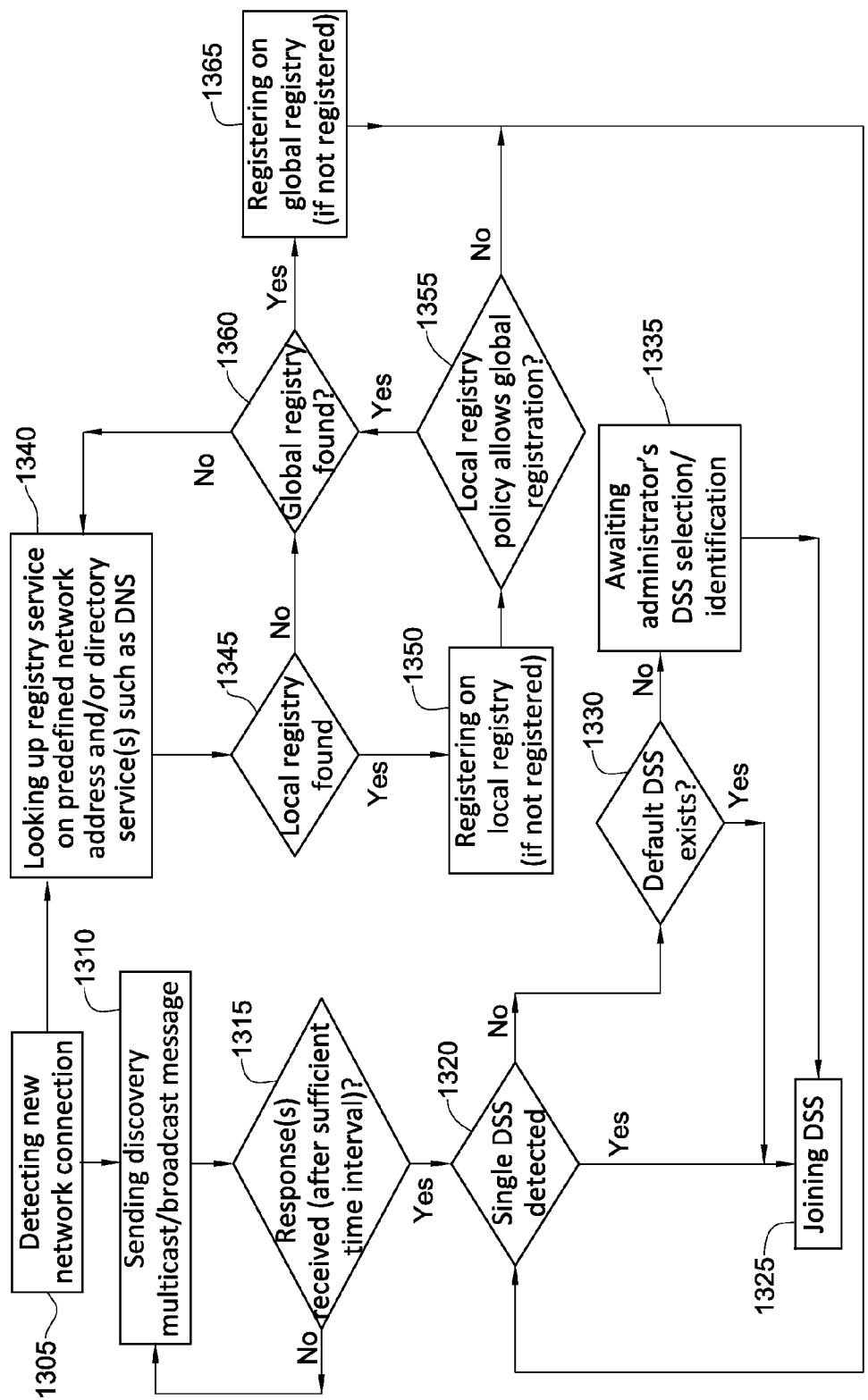
FIG. 28 is a flowchart illustrating a sequence of operations carried out for connecting a new computer node to Distributed Storage System (DSS), according to certain examples of the presently disclosed subject matter.

Cloud plug & play module 380 can be configured to enable autonomous and/or automatic connection of a computer node 205 to DSS 200, as further detailed, inter alia with respect to FIG. 28.

Figure 27:
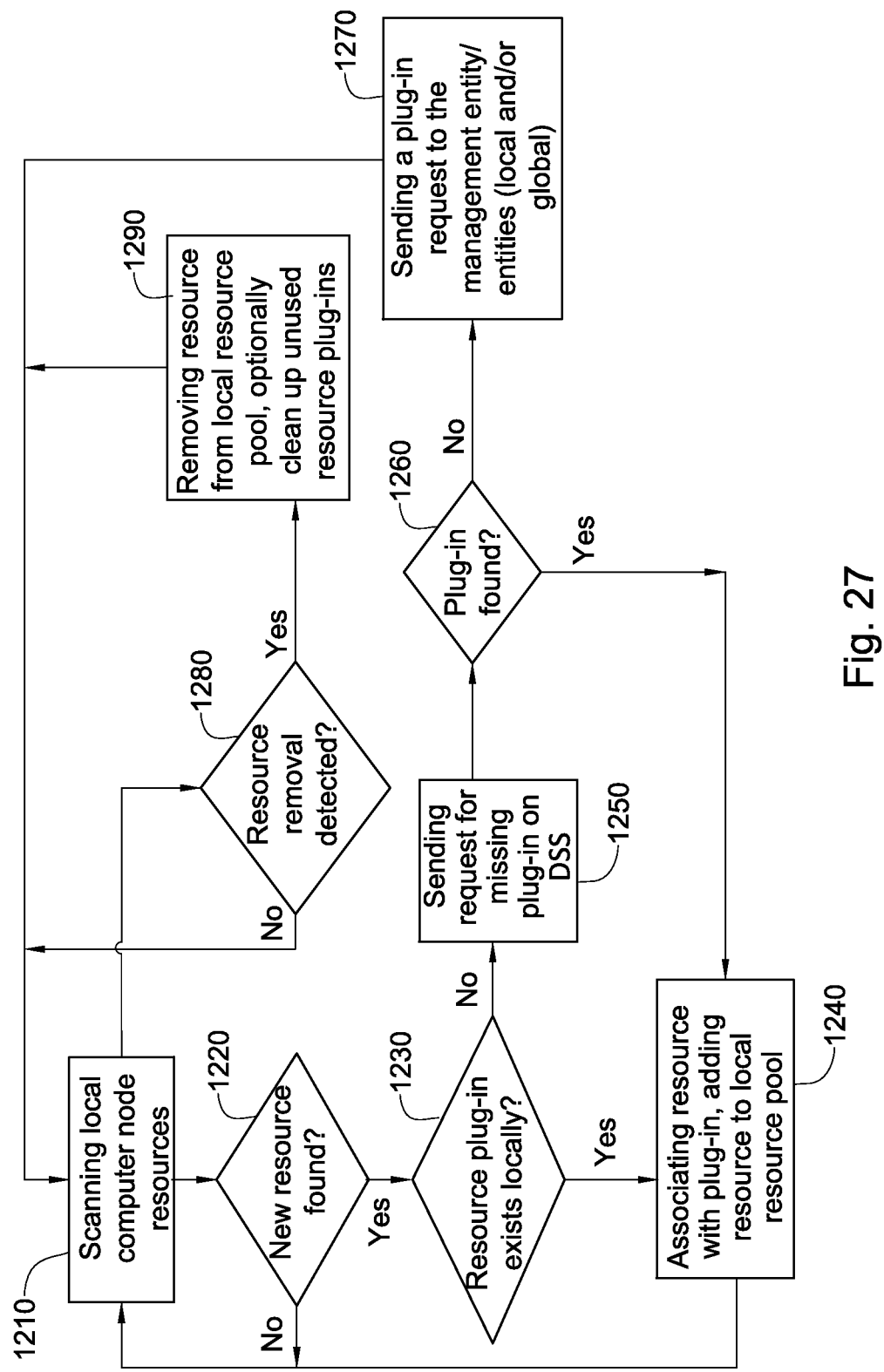
FIG. 27 is a flowchart illustrating a sequence of operations carried out for detecting and managing resources connected to a computer node, according to certain examples of the presently disclosed subject matter.

Resource detection and management module 385 can be configured to detect and manage resources connected to the computer node 205, as further detailed inter alia with respect to FIG. 27.

Objective based configuration module 390 can be configured to configure and/or reconfigure DSS 200 as detailed inter alia with respect to FIGS. 2-4 and 11.

Objective based routing module 395 can be configured to route a received task to a computer node 205 as further detailed, inter alia with respect to FIGS. 6 and 8.

Cache management module 397 can be configured, inter alia, to monitor parameters relating to cache resources, and to manage cache resources connected to the computer node (including, inter alia, to perform cache handoffs), as further detailed herein, inter alia with respect to FIGS. 16-22.

DR module 30 can be configured to configure, control and manage DSS 200 DR processes and control and manage recovery processes for recovering from various types of disasters (e.g. a natural disaster, a power outage, or any other reason that causes all or part of the data stored on a primary storage site to be inaccessible), as further detailed herein, inter alia with reference to FIGS. 2-14.

It is to be noted that the one or more processing resources 310 can be configured to execute the UDSP agent 220 and any of the modules comprised therein.

It is to be noted that according to some examples of the presently disclosed subject matter, some or all of the UDSP agent 220 modules can be combined and provided as a single module, or, by way of example, at least one of them can be realized in a form of two or more modules. It is to be further noted that in some cases UDSP agents 220 can be additionally or alternatively installed on one or more gateway resources 216 and/or client servers 218, etc. In such cases, partial or modified versions of UDSP agents 220 can be installed on and/or used by the one or more gateway resource 216 and/or client server 218, etc.

Figure 20:
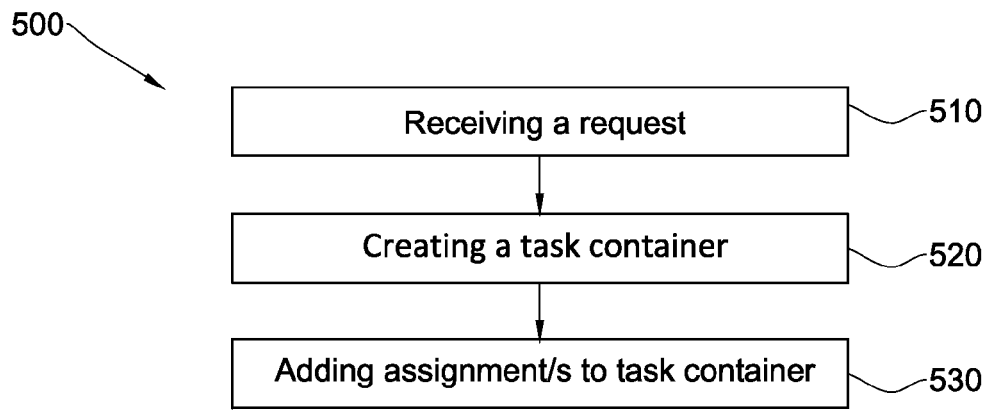
FIG. 20 is a flowchart illustrating a sequence of operations carried out for creating a task, according to certain examples of the presently disclosed subject matter.

Turning to FIG. 20, there is shown a flowchart illustrating a sequence of operations carried out for creating a task, according to certain examples of the presently disclosed subject matter. A task can be generated in order to execute a requested operation received by the DSS 200 (e.g. a read/write operation, a management operation, etc.). In some cases, a task can comprise a list of one or more assignments to be executed as part of the requested operation.

In some cases, task creation module 345 can perform a task creation process 500. For this purpose, in some cases, task creation module 345 can receive a requested operation (block 510) originating for example from a client server 218, a gateway resource 216, a computer node 205, or any other source. The received requested operation can include data indicative of the type of operation (e.g. read, write, management, etc.), and/or any other data relevant to the requested operation (e.g. in a write request, data indicative of the relevant logical storage entity on which the operation is to be performed, a block to be written, etc.).

Task creation module 345 can be configured to create a task container (block 520). The task container can comprise, inter alia, one or more of: data indicative of the requested operation originator (e.g. a network identifier thereof), data indicative of the relevant logical storage entity on which the operation is to be performed, operation specific data (e.g. in case of a block-write operation—the block to write) and an empty assignment list.

In some cases, e.g. when the request is associated with a logical storage entity, task creation module 345 can be configured to retrieve the SLS associated with the logical storage entity, and create one or more assignments to be performed in accordance with the SLS (for example, if the SLS requires data to be encrypted, an encryption assignment can be automatically created, etc.) (block 530).

It is to be noted that the task creation process 500 can be performed by task creation module 345 of UDSP agent 220 associated with computer node 205. However, it is to be noted that additionally and/or alternatively, task creation process 500 can be performed by task creation module 345 of UDSP agent 220 associated with client server 218 and/or gateway resource 216, or any other source having a task creation module 345. Thus, in some cases, computer node 205 can receive one or more tasks that have already been created, e.g. by a client server 218 and/or a gateway resource 216, etc.

It is to be noted that, with reference to FIG. 20, some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

Figure 21:
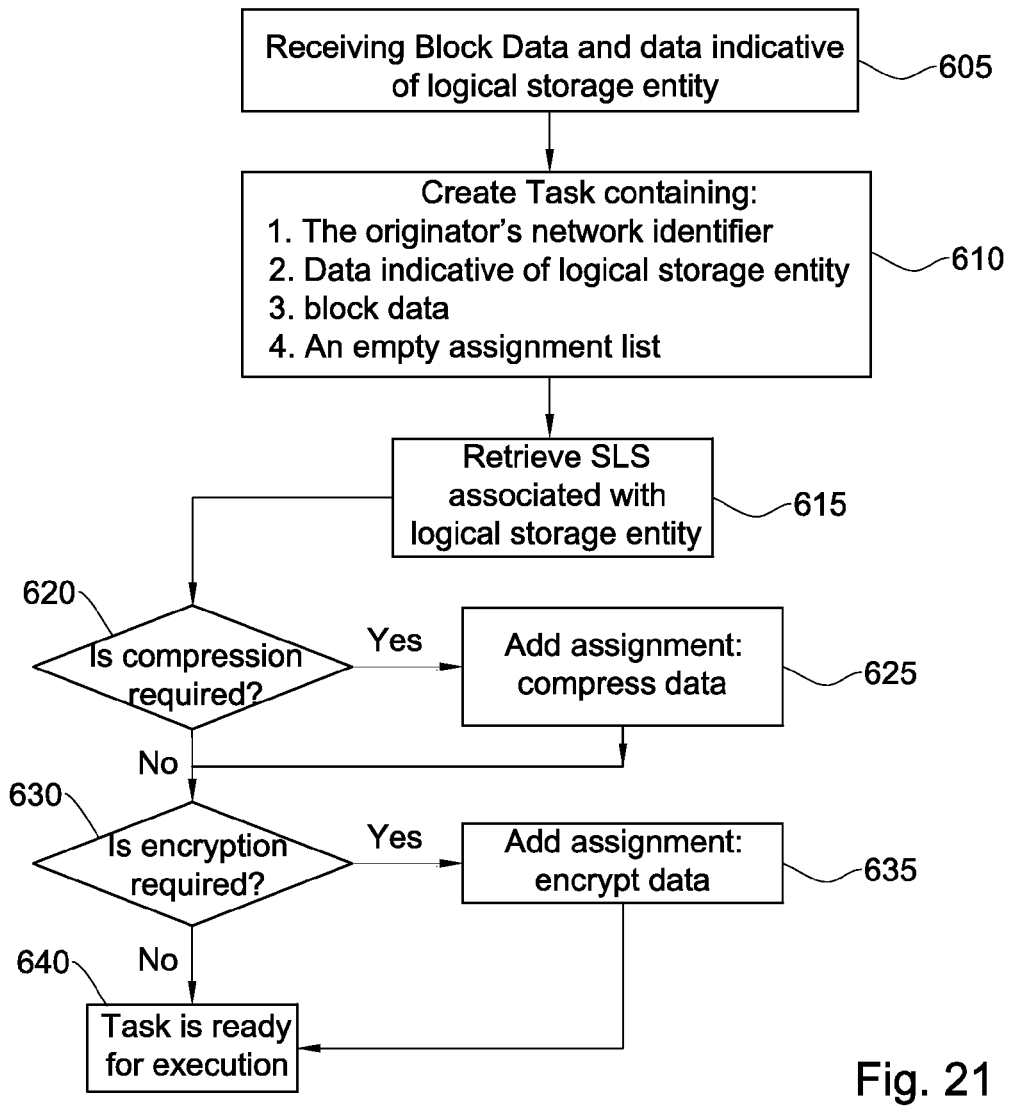
FIG. 21 is a flowchart illustrating a sequence of operations carried out for creating an exemplary storage block-write task, according to certain examples of the presently disclosed subject matter.

In order to better understand the process of a task creation, attention is drawn to FIG. 21, showing a flowchart illustrating a sequence of operations carried out for creating an exemplary storage block-write task, according to certain examples of the presently disclosed subject matter. In the example provided herein, task creation module 345 can receive block data to be written in DSS 200 and data indicative of the relevant logical storage entity on which the block is to be written (block 605).

In some cases, task creation module 345 can be configured to create a new task container. The task container can comprise, inter alia, data indicative of the originator from which the operation originated (e.g. a network identifier thereof), data indicative of the relevant logical storage entity on which the block is to be written, storage block data to be written in the logical storage entity and an empty assignment list (block 610).

In some cases, each task can be assigned with a Generation Number (which has also been referred to hereinabove, inter alia with reference to FIGS. 3-14). Such a Generation Number can be a unique sequential (or any other ordered value) identifier that can be used by various plug-ins and resources in order to resolve conflicts and handle out-of-order scenarios. For example, it can be assumed that a first task (FT) is issued before a second conflicting task (ST) and that the ST is received for processing first. In such cases, execution module 350 can be configured to check if the Generation Number of FT is earlier than that of ST, and in such cases, execution module 350 can be configured not to overwrite the data previously updated according to ST.

Task creation module 345 can also be configured to retrieve the SLS associated with the logical storage entity on which the operation is to be performed (block 615), and introduce relevant assignments to the assignments list associated with the task accordingly. Thus, task creation module 345 can be configured to check if compression is required according to the SLS (block 620), and if so, task creation module 345 can be configured to add the relevant assignment (e.g. compress data) to the assignments list (block 625). Task creation module 345 can be further configured to check if encryption is required according to the SLS (block 630), and if so, task creation module 345 can be configured to add the relevant assignment (e.g. encrypt data) to the assignments list (block 635).

Assuming that these are the only two assignments to be performed according to the SLS, task creation module 345 has successfully created the new task and the new task is ready for execution (block 640). It can be appreciated that with respect to DR, additional and/or alternative designated assignments can be introduced to the task's assignment list (e.g. generating DR enabling data, slicing DR enabling data, dispersing DR enabling data, etc.).

It is to be noted that, with reference to FIG. 21, some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

Following the brief explanation about tasks and their creation, attention is drawn to FIG. 22, showing a flowchart illustrating a sequence of operations carried out for managing a task received by a UDSP agent, according to certain examples of the presently disclosed subject matter.

In some cases, task management module 335 of UDSP agent 220 can be configured to receive a task (block 405). It is to be noted that a task can be received from a client server 218 (e.g. directly or through a gateway resource 216 that can act, inter alia, as a protocol converter), from a gateway resource 216, from another computer node 205, from an external entity (e.g. an application, etc.), or from any other source.

Following receipt of a task, task management module 335 can be configured to retrieve all or part of the data indicative of the dynamic behavior of all or part of the DSS 200 resources (e.g. computer nodes and/or storage-related resources, etc.) (block 410).

In some cases, task management module 335 can be configured to check if the task is associated with an SLS (e.g. the task relates to a specific logical storage entity, etc.) (block 412), and if so, retrieve the SLS associated with the logical storage entity associated with the task (e.g. from the UDSP data repository 330 or, if not available in UDSP data repository 330, from another computer node's UDSP data repository, etc.) (block 413). It can be appreciated that the SLS can include, inter alia, DR requirements.

Task management module 335 can be configured to utilize objective based routing module 395 to grade the suitability of one or more of the DSS 200 computer nodes 205 to execute one or more pending task assignments (block 415).

Pending task assignments are assignments that have no unfulfilled prerequisite prior to execution thereof. For example, a compression assignment can depend on prior execution of a deduplication assignment, an encryption assignment can depend on prior execution of a compression assignment, etc.

The suitability of computer nodes 205 to execute pending task assignments and thus, their grades, can be dependent for example on their resources (e.g. their processing capabilities), including their storage-related resources and/or, in case the task relates to a logical storage entity, on their ability to meet one or more SLS requirements (e.g. having a resource capable of being used for executing one or more of the task assignments in the scope of such a logical storage entity), if such requirements exist, and/or on their dynamic behavior and current state, etc. A more detailed description of the grading process is provided with respect to FIG. 23.

Based on the calculated grades, task management module 335 can be configured to utilize objective based routing module 395 to route the task for example to a more suitable computer node 205, and sometimes to the most suitable computer node, per grading results (e.g. the task can be routed to the computer node 205 having the highest grade) (block 420).

Task management module 335 can be configured to check if the task was routed to another computer node (block 425). If the task was routed to another computer node, then the process relating to the local computer node 205 (e.g. the computer node 205 running the process) ends (block 440). However, if the local computer node 205 is the most suitable one, then one or more of the pending task assignments can be executed on the local computer node 205 (block 430), for example by utilizing UDSP agent's 220 execution module 350.

It is to be noted that in some cases, not all pending task assignments that the local computer node 205 is capable of executing are executed by it, but only the pending task assignments for which it was selected as the most suitable one. Thus, for example, if a task comprises three pending task assignments, two of which can be executed by the local computer node 205, one for which it has the highest grade and one for which it does not have the highest grade—the UDSP agent 220 associated with the local computer node 205 can be configured to execute only the assignment for which the local computer node 205 has the highest grade. It is to be further noted that UDSP agent 220 of the local computer node 205 can in some cases utilize more than one processing resource of the local computer node 205 (if such exists) for parallel and/or concurrent processing of one or more assignments. In some cases, for such parallel and/or concurrent processing of more than one assignment, the local computer node 205 can utilize remote processing resources (e.g. processing resources associated with one or more remote computer nodes 205). A more detailed description of assignment/s execution is provided inter alia with respect to FIG. 24.

Task management module 335 can be further configured to check if additional assignments exist following execution of the assignments on the local computer node 205 and/or if the execution of the assignments on the local computer node 205 triggered creation of one or more new tasks (e.g. a replication assignment can result in generation of multiple write tasks, each destined at a different location) and/or assignments (block 435). If not—the process ends (block 440). If yes—the process returns to block 405, in which the task with the remaining assignments and/or the one or more new tasks are received by the UDSP agent 220 associated with the local computer node 205 and the processes of managing each of the tasks begin.

In some cases, the infrastructure layer can be updated, for example by adding one or more interconnected computer nodes 205 to the infrastructure layer, by removing one or more computer nodes 205 from the infrastructure layer, by modifying one or more existing computer nodes 205 (e.g. adding processing resources 310 and/or other storage related resources thereto, removing processing resources 310 and/or other storage related resources therefrom, etc.) of the infrastructure layer, by modifying grouping of computer nodes to storage sites (primary and/or DR storage sites), etc. In some cases such changes to the infrastructure layer can be performed dynamically (e.g. whenever a user desires), including during operation of DSS 200.

Task management module 335 can in some cases be configured to utilize objective based routing module 395 to grade the suitability of one or more of the updated infrastructure layer computer nodes 205 that have been added or modified, to execute one or more pending task assignments of following tasks. In some cases, the updated infrastructure layer can be created during such grading calculation and the calculation can be performed in respect of one or more computer nodes 205 of the updated infrastructure layer. In some cases, the calculation can be performed in respect of one or more additional or modified computer nodes 205 of the updated infrastructure layer.

Task management module 335 can in some cases be configured to execute one or more of said pending assignments of following tasks or route said following tasks to a more suitable computer node 205 (and in some cases to the most suitable computer node 205) of the updated infrastructure layer, based on the calculated grades.

It is to be noted that, with reference to FIG. 22, some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

Figure 23:
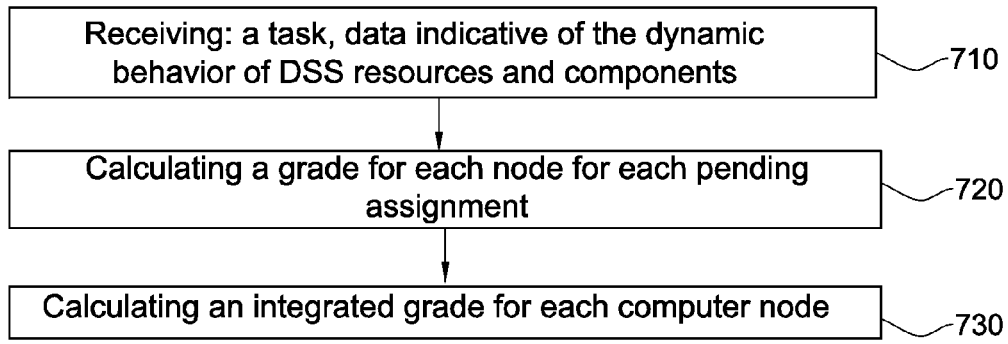
FIG. 23 is a flowchart illustrating a sequence of operations carried out for grading nodes suitability to execute pending task assignments, according to certain examples of the presently disclosed subject matter.

As detailed herein, task management module 335 can be configured to utilize objective based routing module 395 to grade the suitability of one or more of the DSS 200 computer nodes 205 to execute pending task assignments. Attention is drawn to FIG. 23 illustrating a sequence of operations carried out for grading nodes suitability to execute pending task assignments, according to certain examples of the presently disclosed subject matter.

The grading process 700 can begin, for example, by objective based routing module 395 receiving at least one of: a task to be performed, data indicative of the dynamic behavior of all or part of the DSS 200 resources (including the computer nodes and/or the storage-related resources and/or the storage sites, etc.), or any other data that can be used by the grading process (block 710). In some cases, when the task is associated with a specific logical storage entity, objective based routing module 395 can also receive the SLS associated with the logical storage entity associated with the task.

Objective based routing module 395 can be configured to grade one or more computer nodes 205 suitability to execute each of the pending task assignments (block 720). The grading can be performed, inter alia, based on the received data.

It is to be noted that a grade can be calculated for each computer node 205 connected to DSS 200, or only for some of the computer nodes 205 (e.g. according to the network topology, the geographic distance from the local computer node 205, randomly and/or deterministically selecting computer nodes 205 until a sufficient number of computer nodes 205 suitable to execute one or more pending task assignments are found, etc.). It is to be further noted that various grading algorithms can be used for grading a computer node's 205 suitability to execute pending task assignments. It is to be still further noted that the grading process can contain and/or use heuristics and/or approximations. Additionally or alternatively, the grading can be based on partial and/or not up-to-date information.

In some cases, for each computer node 205 that a grade is to be calculated for, objective based routing module 395 can be configured to check, for each pending task assignment, if the computer node 205 can execute the pending task assignment. In case the task is associated with a logical storage entity, objective based routing module 395 can also check if the computer node 205 can execute the pending task assignment while meeting the requirements defined by the respective SLS (that can include, inter alia, DR requirements). In case the computer node 205 cannot execute the pending task assignment (or cannot meet the requirements defined by the SLS when relevant), the grade for that node will be lower than the grade of a computer node 205 that is capable of executing the pending task assignment (while meeting the requirements defined by the SLS when relevant). In some cases, the grade is calculated also based on parameters data relating to one or more storage-related resources connected to the respective computer node 205 (e.g. data of parameters relating to presence and/or loads and/or availability and/or faults and/or capabilities and/or response time and/or connectivity and/or costs associated with the storage-related resources), and the capability of such storage-related resources to execute the pending task assignment (while meeting the requirements defined by the SLS when relevant).

In an exemplary manner, and for ease of understanding, the grade of a computer node 205 that cannot execute the pending task assignment (while meeting the requirements defined by the SLS, when relevant) is zero, whereas the grade of a computer node 205 that is capable of executing the pending task assignment (while meeting the requirements defined by the SLS when relevant) is greater than zero.

It is to be noted that in some cases, the calculated grades can be represented by non-scalar values, e.g. by multi-dimensional values. It is to be further noted that the calculated grades may not belong to an ordered set. It is to be still further noted that the decision of a suitable node and/or a most suitable node (e.g. the decision which grade is "higher") can be arbitrary (e.g. when the grades do not belong to an ordered set, etc.).

In some cases, if the local computer node 205 suitability to execute the assignment would be identical to that of one or more remote computer nodes 205 if they all had identical communication costs of communicating the task thereto, the local computer node's 205 grade will be higher due to the costs associated with communicating the task to any remote computer node 205.

In some cases, for each computer node 205 that a grade is to be calculated for, objective based routing module 395 can be configured to calculate an integrated grade based on the grades calculated for each pending task assignment (block 730). Such an integrated grade can be, for example, a summary of the computer node's 205 assignments grades, an average of the computer node's 205 assignments grades, or any other calculation based on the calculated computer node's 205 assignments grades.

It is to be noted that, with reference to FIG. 23, some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

Turning to FIG. 24, there is shown an illustration of a sequence of operations carried out for executing pending task assignments on a computer node, according to certain examples of the presently disclosed subject matter.

As detailed herein, task management module 335 can be configured to utilize execution module 350 for performing an assignments execution process 800 for executing one or more of the pending task assignments. In such cases, execution module 350 can be configured to execute one or more pending task assignments (block 810).

As indicated herein, it is to be noted that in some cases, not all pending task assignments that the local computer node 205 is capable of executing are executed by it, but only the pending task assignments for which it was selected. In addition, it is to be further noted that UDSP agent 220 associated with the local computer node 205 can in some cases utilize more than one processing resource (if such exists) for parallel and/or concurrent processing of one or more assignments. In some cases, for such parallel and/or concurrent processing of more than one assignment, the local computer node 205 can utilize remote processing resources (e.g. processing resources associated with one or more remote computer nodes 205).

Following execution of the one or more pending task assignments, execution module 335 can be configured to update the statuses of the executed assignments to indicate that the assignments have been executed (block 820).

In some cases assignments can be partially executed or their execution can fail. In such cases, execution module 335 can be configured to update the assignment status with relevant indications. In some cases the statuses can also contain data of the execution results.

In some cases, execution module 335 can be configured to check if there is a need to check the current DSS 200 configuration (including, inter alia, the resources availability and allocation) (block 830). Such a need can exist, for example, in case the execution of one or more of the executed assignments that is associated with a logical storage entity did not meet (or came close to not meeting, e.g. according to pre-defined thresholds, etc.) the respective SLS requirements and/or if one or more assignments execution failed and/or if execution of an assignment results in change of data of parameters relating to computer nodes 205 and/or to resources connected thereto that exceeds a pre-defined or calculated threshold (such as shortage of storage space or any other resource, etc.) and/or for any other reason.

In case there is a need to check the current configuration of DSS 200, execution module 335 can be configured to recommend UDSP agents 220 associated with one or more computer nodes 205 to check if a reconfiguration is required (block 840). It is to be noted that in some cases the recommendation can be handled by objective based configuration module 390 of the UDSP agent 220 associated with the computer node 205 on which the one or more assignments are executed. In other cases, the recommendation can be sent to UDSP agents 220 associated with one or more computer nodes 205 that can be responsible for performing the reconfiguration process (e.g. dedicated computer nodes). A further explanation regarding the reconfiguration check is provided herein, inter alia with respect to FIG. 25.

In case there is no need to check the current configuration of DSS 200 or following the recommendation to check if a reconfiguration is required, execution module 335 can be configured to check if following execution of the one or more pending task assignments the task is finished (e.g. all of the assignments associated with the task have been executed) (block 850).

In case the task is not finished the process ends (block 860). If the task is finished, execution module 335 can be configured to check if any notification indicating that the task is finished is required (e.g. a notification to the task originator, etc.) (block 870). If no notification is required, the process ends (block 860). If a notification is required, execution module 335 can be configured to issue a notification of the task execution as required (block 880) and the process ends (block 860).

According to some examples of the presently disclosed subject matter, for each required notification a dedicated assignment of sending the required notification can be created, e.g. during the task creation process described herein. In such cases, optionally, blocks 850-880 can be disregarded.

It is to be noted that, with reference to FIG. 24, some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

Figure 25:
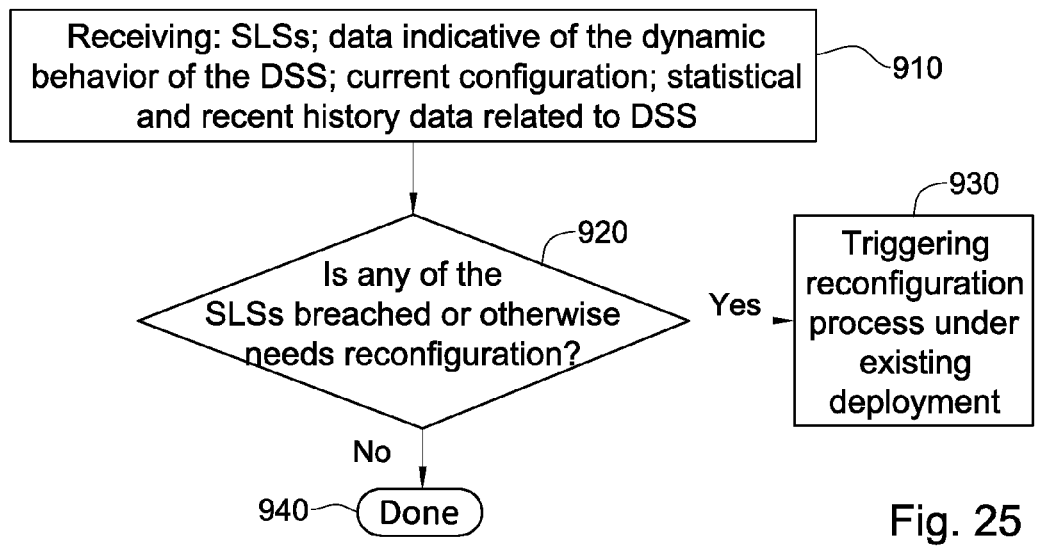
FIG. 25 is a flowchart illustrating a sequence of operations carried out for managing reconfigurations of Distributed Storage System (DSS), according to certain examples of the presently disclosed subject matter.

Attention is now drawn to FIG. 25, illustrating a sequence of operations carried out for managing reconfigurations of DSS, according to certain examples of the presently disclosed subject matter.

According to some examples of the presently disclosed subject matter, in some cases, a reconfiguration process 900 checking if a reconfiguration of DSS 200 is required can be performed. In some cases, such a check can be performed periodically (e.g. according to a pre-defined time interval, for example, every minute, every five minutes, every hour, or any other pre-defined time interval), continuously (e.g. in a repeating loop, etc.), following a triggering event (e.g. a monitored parameter exceeds a pre-defined or calculated threshold, receipt of a recommendation from a UDSP agent 220 associated with a computer node 205, as detailed inter alia with respect to FIG. 24, etc.), etc.

As indicated herein, in some cases, each UDSP agent 220 associated with a computer node 205 can be configured to perform the reconfiguration process 900, e.g. while utilizing objective based configuration module 390. In some cases, UDSP agents 220 associated with one or more computer nodes 205 (e.g. dedicated computer nodes) can be responsible for performing the reconfiguration process 900, e.g. while utilizing objective based configuration module 390.

In some cases, objective based configuration module 390 can be configured to receive any one of, or any combination of, SLSs (that can include, inter alia, DR requirements) associated with one or more logical storage entities in DSS 200, data indicative of the dynamic behavior of the DSS 200 and its resources and environment, data indicative of the current configurations of DSS 200, statistical data and historical data related to DSS 200, etc. (block 910). It is to be noted that in some cases all or part of the data can additionally or alternatively be retrieved from the UDSP data repository 330 associated with computer node 205 on which the reconfiguration process 900 is performed.

In some cases, objective based configuration module 390 can be configured to utilize the received data for checking if any of the SLSs (that can include, inter alia, DR requirements) are breached (or close to be breached, e.g. according to pre-defined thresholds, etc.) and/or if there is any other reason (e.g. failure to perform one or more assignments irrespective of an SLS, etc.) for performing a reconfiguration of the DSS 200 (block 920).

It is to be noted that whereas in some cases, every time an SLS is breached (it should be noted that breach of an SLS can sometimes include nearing such a breach, e.g. according to pre-defined thresholds, etc.) a reconfiguration of DSS 200 can be initiated, in other cases such reconfiguration of DSS 200 can be initiated depending on meeting some pre-defined criteria. Such criteria can be, for example, a pre-defined number of detected SLS breaches required is to be met, either within a pre-defined time frame or irrespective of the time, etc. Thus, for example, exemplary criteria can be detection of three SLS breaches, or detection of three SLS breaches within one day, etc. In some cases, the importance of a breach can additionally or alternatively be considered as a criterion. For this purpose, objective based configuration module 390 can be configured to utilize the statistical data and historical data related to DSS 200.

In case there is a need to reconfigure DSS 200, objective based configuration module 390 can be configured to activate the Objective Based Management System (OBMS) 100 for performing a DSS 200 configuration process, as detailed above, inter alia with respect to FIGS. 16-18 (block 930). It is to be noted, as indicated herein, that in cases of reconfiguration of DSS 200, OBMS 100 can receive the current configurations of DSS 200 as part of the inputs for the configuration process and take it into consideration when reconfiguring DSS 200. In some cases, during such reconfiguration, OBMS 100 can be configured to reserve and/or allocate and/or reallocate and/or free all or part of the resources.

If no SLS is breached (or is close to be breached) and there is no other reason for performing a reconfiguration, or following initiation of a reconfiguration of DSS 200, reconfiguration process 900 ends (block 940).

It is to be noted that, with reference to FIG. 25, some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

Attention is now drawn to FIG. 26, illustrating a sequence of operations carried out for monitoring local parameters of a computer node and resources connected thereto, according to certain examples of the presently disclosed subject matter.

In some cases, local parameters monitoring module 360 can be configured to monitor various parameters of a computer node 205 and/or storage-related resources connected thereto (block 1010). As indicated herein, the monitored parameters can be any parameters indicative of presence and/or loads and/or availability and/or faults and/or capabilities and/or response time and/or connectivity and/or costs (e.g. costs of network links, different types of data storage resources) and/or any other parameters indicative of the dynamic behavior of the computer node 205 and/or any storage-related resource connected thereto and/or any other data relating to the computer node 205 and/or to one or more of the storage-related resources connected thereto. In some cases, local parameters monitoring module 360 can be configured to monitor various parameters of a client server 218 and/or a gateway resource 216, mutatis mutandis.

It is to be noted that such monitoring can be performed periodically (e.g. according to a pre-defined time interval, for example, every minute, every five minutes, every hour, or any other pre-defined time interval), continuously (e.g. in a repeating loop, etc.), following a triggering event (e.g. connection of a new resource to the computer node 205, etc.), etc.

In some cases, local parameters monitoring module 360 can be configured to check if a new parameter or a change in the value of any of the monitored parameters was detected (block 1020). If not, local parameters monitoring module 360 can be configured to continue monitoring parameters. If, however, a new parameter or a change in the value of any of the monitored parameters has been detected, local parameters monitoring module 360 can be configured to propagate (e.g. while utilizing multicast module 340) notifications indicative of a change to one or more local parameters. In some cases, such notifications can be sent to one or more computer nodes 205 and/or client servers 218 and/or gateway resources 216 (e.g. by unicast/multicast/recast transmission) (block 1030).

It is to be noted that in some cases, local parameters monitoring module 360 can be configured to send various types of notifications that can comprise various indications (e.g. indications of various groups of one or more local parameters, etc.) in various pre-determined time periods or in response to various triggering events. It is to be further noted that some notifications can be selectively sent, for example to one or more computer nodes 205 that registered to receive such notifications.

In some cases, local parameters monitoring module 360 can be configured to update the parameter value, and in some cases additionally or alternatively, derivatives thereof (e.g. various statistical data related to the parameter) in UDSP data repository 330 (block 1040).

In some cases, local parameters monitoring module 360 can be configured to check if there is a need to check the current DSS 200 configuration. Such a need can exist, for example, in case one of the monitored parameters exceeded a pre-defined or calculated threshold associated therewith and/or for any other reason.

In case there is a need to check the current configuration of DSS 200, local parameters monitoring module 360 can be configured to recommend UDSP agents 220 associated with one or more computer nodes 205 to check if a reconfiguration is required. It is to be noted that in some cases the recommendation can be handled by objective based configuration module 390 of the UDSP agent 220 associated with the local computer node 205 on which the local parameters monitoring module 360 is running. In other cases, the recommendation can be sent to UDSP agents 220 associated with one or more computer nodes 205 that can be responsible for performing the reconfiguration process (e.g. dedicated computer nodes). A further explanation regarding the reconfiguration check is provided herein, inter alia with respect to FIG. 25.

It is to be noted that, with reference to FIG. 26, some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

Attention is now drawn to FIG. 27, illustrating a sequence of operations carried out for detecting and managing resources connected to a computer node, according to certain examples of the presently disclosed subject matter.

In some cases, resource detection and management module 385 can be configured to perform a detection and management process 1200. In some cases resource detection and management module 385 can be configured to scan for storage-related resources connected to one or more computer nodes 205 (block 1210). In some cases, resource detection and management module 385 can be configured to perform the scan continuously and/or periodically (e.g. every pre-determined time period, for example every minute, every five minutes, every hour, etc.), etc. In some case, the scan can be initiated by a user (e.g. a system administrator, etc.).

Resource detection and management module 385 can be configured to check if any new storage-related resource is found (block 1220). If no new storage-related resource is found, resource detection and management module 385 can be configured to continue scanning for storage-related resources. If one or more new storage-related resources are found, storage-related resource detection and management module 385 can be configured to check if there is a need in one or more plug-ins for using such a storage-related resource and if so whether the plug-ins exist locally (e.g. on the computer node 205 to which the new resource is attached/connected) (block 1230).

If there is a need for one or more plug-ins and they all exist locally, resource detection and management module 385 can be configured to associate the plug-ins with the new storage-related resource and the storage-related resource can be added to the local resource pool (block 1240).

If there is a need for one or more plug-ins that do not exist locally, resource detection and management module 385 can be configured to check if the one or more missing plug-ins exist, for example on one or more computer nodes 205 and/or client servers 218 and/or gateway resources 216 (e.g. while utilizing multicast module 340) and/or in a shared virtual software extensions library as detailed herein (block 1250) and/or on any other location on DSS 200, and/or on any auxiliary entity.

If resource detection and management module 385 found the required plug-ins, resource detection and management module 385 can be configured to associate the plug-ins with the new storage-related resource and the storage-related resource can be added to the local resource pool (block 1240).

In some cases, if resource detection and management module 385 did not find the required plug-ins, resource detection and management module 385 can be configured to issue one or more plug-in requests. Such plug-in requests can in some cases be sent to a user (block 1270), thus enabling such a user to add the relevant plug-ins to DSS 200 (e.g. after purchasing it, downloading it from the Internet, etc.). Following sending such a request, resource detection and management module 385 can be configured to continue scanning for storage-related resources (block 1210).

It is to be noted that in some cases, until the required plug-ins are found, retrieved (if required) and installed, the new storage-related resource can be marked as a new storage-related resource that is identified every time a scan for storage-related resources is performed and thus, the process detailed herein repeats until the required plug-ins are found.

In some cases, resource detection and management module 385 can be additionally or alternatively configured to check if a storage-related resource removal is detected following the scan for storage-related resources (block 1280). In such cases, if a storage-related resource removal is detected, resource detection and management module 385 can be configured to remove the storage-related resource from the local resource pool and, optionally, clean up any plug-ins that are no longer required (e.g. in light of the fact that the resource that utilized such plug-ins is removed) (block 1290).

It is to be noted that in some cases, resource detection and management module 385 can be additionally or alternatively configured to perform the detection and management process 1200 for storage-related resources connected/disconnected to/from one or more client servers 218 and/or gateway resources 216, mutatis mutandis. It is to be further noted that utilization of the resource detection and management module 385 can enable seamless addition and/or removal and/or attachment and/or detachment of storage-related resources to computer nodes 205 and/or to client servers 218 and/or gateway resources 216 (e.g. "plug and play"), including during operation of DSS 200, and in some cases without performing any management action by a user (including, inter alia, any preliminary management action).

It is to be further noted that in some cases, addition and/or removal of storage-related resources to/from the local resource pool can result in changes to the monitored local parameters of a computer node 205 (e.g. addition and/or removal and/or update and/or any other change of various local parameters). As indicated herein, when new parameters are detected, in some cases, appropriate notifications can be sent by local parameters monitoring module 360, as detailed herein inter alia with respect to FIG. 26. It is to be noted that in some cases such notifications can trigger reconfiguration.

It is to be noted that, with reference to FIG. 27, some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

Attention is now drawn to FIG. 28, illustrating a sequence of operations carried out for connecting a new computer node to Distributed Storage System (DSS), according to certain examples of the presently disclosed subject matter.

In some cases, when a new computer node 205, comprising a UDSP agent 220 connects to a network, cloud plug and play module 380 of the new computer node 205 can be configured to detect a new network connection and/or a change to an existing network connection (e.g. that the computer node 205 on which cloud plug and play module 380 is connected to a new or to a different network) (block 1305). Following detection of a new network connection, cloud plug and play module 380 can be configured to send (e.g. by unicast/multicast/recast transmission) a discovery message, for example by utilizing multicast module 340 (block 1310). Such discovery message can trigger any receiving computer node 205 to respond, e.g. by sending a response including at least a DSS 200 identifier (each DSS 200 can have a unique identifier that enables identification thereof).

Cloud plug and play module 380 can be configured to listen for any response received within a pre-determined time interval (e.g. a time interval that can enable the receiving computer nodes 205 to respond to the discovery message) and check if any response was received (block 1315). If no response was received, and computer node 205 did not join a DSS 200, cloud plug and play module 380 can be configured to repeat block 1310 and resend a discovery message.

If a response was received, cloud plug and play module 380 can be configured to check if the responses refer to a single DSS 200 (e.g. according to the received DSS 200 identifiers) (block 1320). If so, cloud plug and play module 380 can be configured to join computer node 205 to the detected DSS 200 (block 1325). It is to be noted that as a result of joining a DSS 200, computer node 205 can automatically begin sending and receiving various notifications, as detailed herein.

If more than one DSS 200 is detected (e.g. more than one DSS 200 identifier is received as a response to the discovery message), cloud plug and play module 380 can be configured to check if a default DSS 200 exists (block 1330). For this purpose, in some cases, an indication of a default DSS 200 can be retrieved from a local registry (e.g. a data repository accessible on the local network), from a Domain Name System (e.g. under a pre-defined DNS record, etc.), etc. In some cases an indication of a default DNS 200 can be sent by one of the responding computer nodes 205 whose response can include an indication of the default DSS 200. It is to be noted that other methods and techniques for identifying a default DSS 200 can be used as well.

If such default DSS 200 exists, cloud plug and play module 380 can be configured to join computer node 205 to the default DSS 200 (block 1325). If no default DSS 200 is detected, an indication of the new computer node 205 can be provided to a user for its selection of the DSS 200 to which the new computer node 205 is to join, and cloud plug and play module 380 can be configured to wait for such selection (block 1335). Once a selection is made, cloud plug and play module 380 can be configured to join computer node 205 to the selected DSS 200 (block 1325).

In some cases, upon detection of a new network connection (block 1305), cloud plug and play module 380 can be additionally or alternatively configured to look up a local registry (e.g. a data repository accessible on the local network) and/or a global registry (e.g. a data repository accessible on the Internet) registry service, for example on a pre-defined network address and/or on a directory service (e.g. DNS, Active Directory, etc.) (block 1340). Such registry service can enable inter alia identification of available DSS's 200 and/or a default DSS 200.

Cloud plug and play module 380 can be configured to check if a local registry is found (block 1345), and if so, it can be configured to register on the local registry (if it is not already registered) (block 1355). Such registration can include storing various configuration parameters related to the local computer node 205 in the registry. Cloud plug and play module 380 can be further configured to check if a policy defined by the local registry allows global registration (block 1355). If so, or in case that no local registry is found, cloud plug and play module 380 can be configured to check if a global registry is found (block 1360). If so—cloud plug and play module 380 can be configured to register on the global registry (if it is not already registered) (block 1365). Such registration can include storing various configuration parameters related to the local computer node 205 in the registry.

Following registration on the global registry or in case the policy defined by the local registry does not allow global registration, cloud plug and play module 380 can be configured to jump to block 1320 and continue from there.

It is to be noted that other methods can be used in order to join a new computer node 205 to a DSS 200, both automatically and manually, and the methods provided herein are mere examples.

It is to be noted that utilization of the cloud plug and play module 380 can enable computer nodes 205 to be seamlessly added and/or removed and/or attached and/or detached from the network, at any time, including during operation of DSS 200, and in some cases without performing any management action by a user (including, inter alia, any preliminary management action), provided that a UDSP agent 220 is installed on the computer node 205 (a detailed description of a UDSP agent 220 is provided herein). It is to be further noted that optionally, following addition and/or removal and/or attachment and/or detachment of one or more computer nodes 205 from the network, no user is required for enabling continued operation of the DSS 200.

It is to be still further noted that in some cases, cloud plug and play module 380 can be further configured to associate any newly added computer node 205 to one or more storage sites (e.g. primary and/or DR storage sites).

It is to be noted that, with reference to FIG. 28, some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realize them, this is by no means binding, and the blocks can be performed by elements other than those described herein.

Attention is now drawn to FIG. 29, illustrating a sequence of operations carried out for receiving a notification from a remote computer node and updating a Unified Distributed Storage Platform (UDSP) data repository accordingly, according to certain examples of the presently disclosed subject matter.

In some cases, remote nodes parameters monitoring module 370 of a UDSP agent 220 of a computer node 205 can be configured to receive various notifications (general notifications and/or notifications originating from a source to which computer node 205 registered in order to receive messages from) originating from other computer nodes 205 and/or client servers 218 and/or gateway resources 216 and/or users, etc. (block 1410).

In some cases, remote nodes parameters monitoring module 370 can be configured to update UDSP data repository 330 accordingly (block 1420).

It is to be noted that such data stored in UDSP data repository 330 can be used in order to locally maintain knowledge of the DSS 200 state (e.g. its dynamic behavior, etc.) or parts thereof which are relevant for the processes carried out by the computer node 205, as detailed herein.

It is to be noted, with reference to FIG. 29, that some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

Having described the DSS 200, there follows a description of a system and method for managing cache resources in a DSS 200. Before turning to the description of the system and method for managing cache resources in a DSS 200, it is to be noted that the system and method for managing cache resources in a DSS 200 is a separate system and method than the caching mechanism described herein with reference to FIGS. 1-14, and it differs therefrom.

As indicated herein, infrastructure layer 201 can comprise one or more, and in some cases two or more, computer nodes 205. Infrastructure layer 201 can further comprise one or more cache resources 212 and/or resources that can be used as cache resources (e.g. RAM, DRAM, SSD 213, etc.). Each cache resource 212 and/or resource that can be used as a cache resource can be connected to one or more computer nodes 205 (e.g. directly, by a network, etc.). As further indicated above, each computer node 205 can have a UDSP agent 220 installed thereon (or otherwise associated therewith).

As indicated herein, UDSP agent 220 can comprise a cache management module 397. The cache management module 397 can be configured to handle various cache related operations, inter alia over one or more cache resources on which standard and/or dedicated caching algorithms, methods and techniques are operating. The cache management module 397 can be configured to manage the cache mappings of the object spaces stored on the one or more cache resources connected to one or more computer nodes 205 connected to DSS 200.

Figure 30:
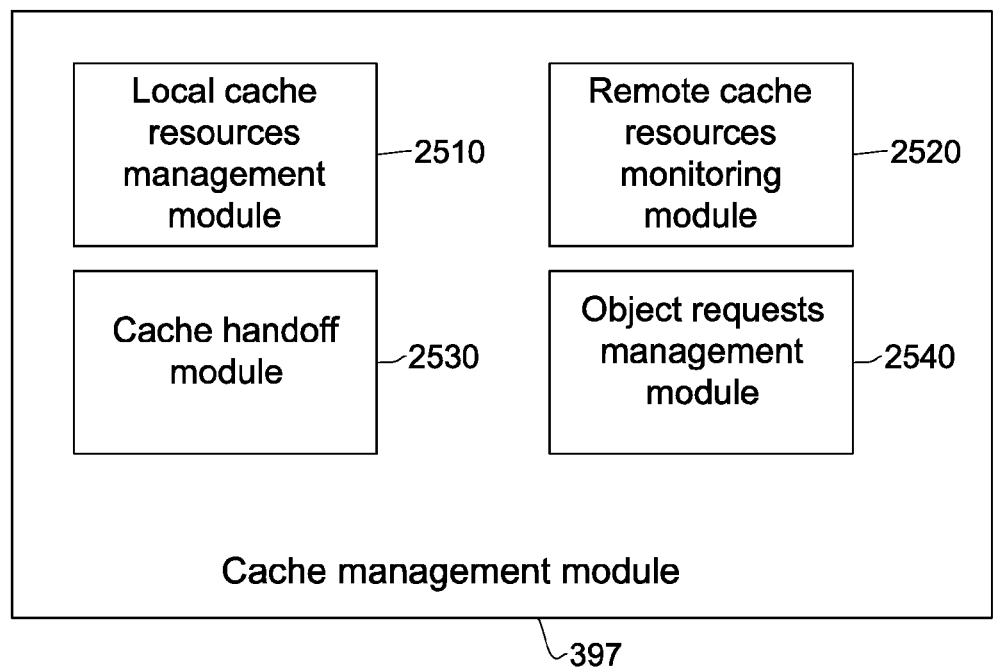
FIG. 30 is a block diagram schematically illustrating a cache management module, according to certain examples of the presently disclosed subject matter.

FIG. 30 is a block diagram schematically illustrating cache management module, according to certain examples of the presently disclosed subject matter.

According to some examples of the presently disclosed subject matter, cache management module 397 can comprise one or more of the following modules: Local cache resources management module 2510, Remote cache resources monitoring module 2520, cache handoff module 2530 and object requests management module 2540.

Figure 31:
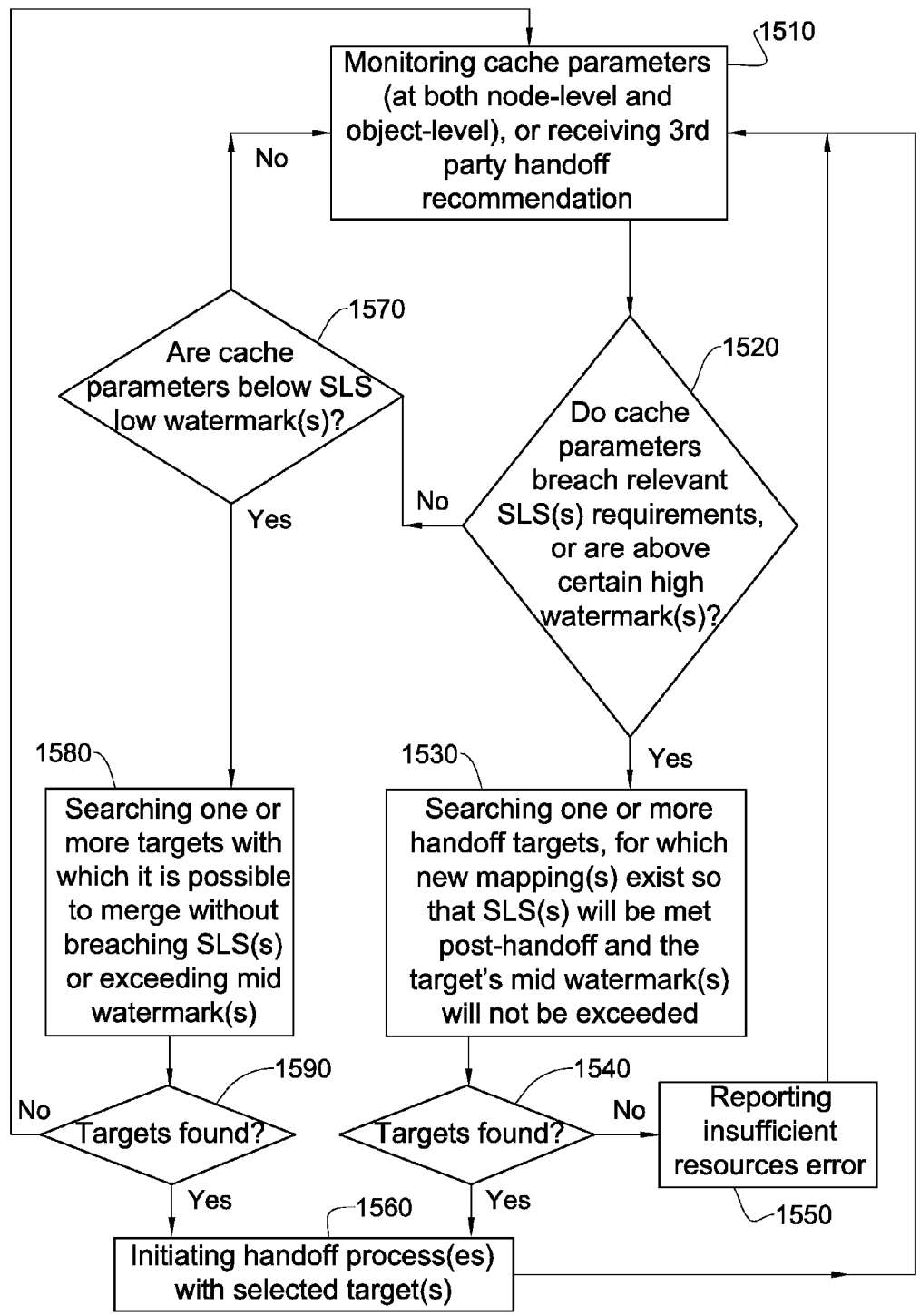
FIG. 31 is a flowchart illustrating a sequence of operations carried out for managing local cache resources of a computer node, according to certain examples of the presently disclosed subject matter.

Local cache resources management module 2510 can be configured to manage local cache resources of a computer node 205, as further detailed herein, inter alia with respect to FIG. 31.

Figure 32:
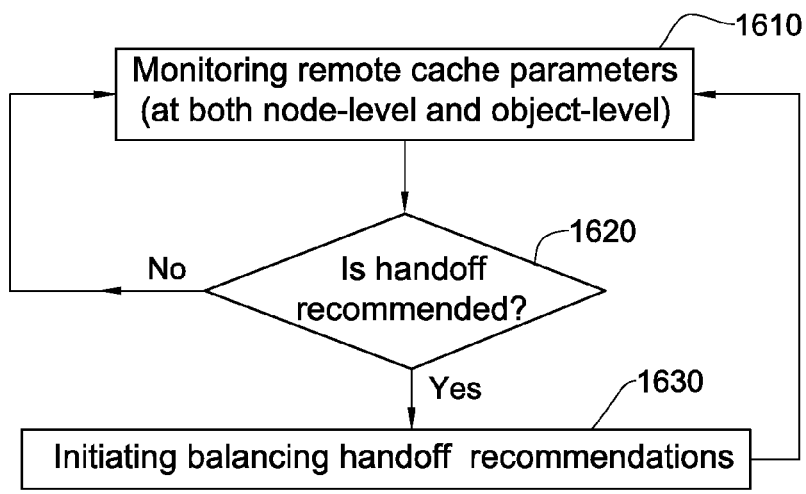
FIG. 32 is a flowchart illustrating a sequence of operations carried out for managing remote cache resources of remote computer nodes, according to certain examples of the presently disclosed subject matter.

Remote cache resources monitoring module 2520 can be configured to monitor remote cache resources of remote computer nodes 205 and issue handoff recommendations and/or instructions accordingly, as further detailed herein, inter alia with respect to FIG. 32.

Figure 34:
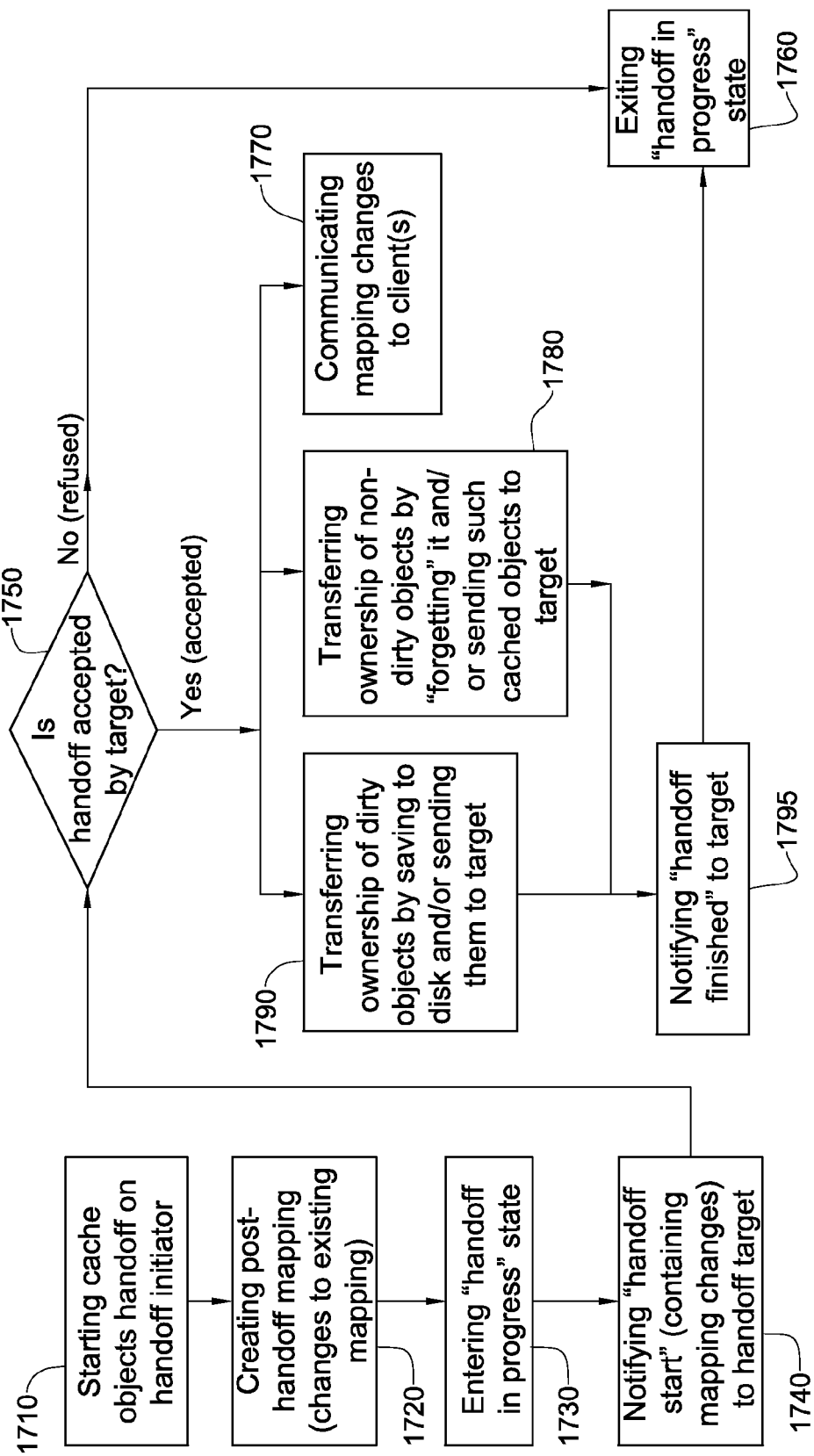
FIG. 34 is a flowchart illustrating a sequence of operations carried out for performing a cache handoff by a handoff initiator, according to certain examples of the presently disclosed subject matter.
Figure 35:
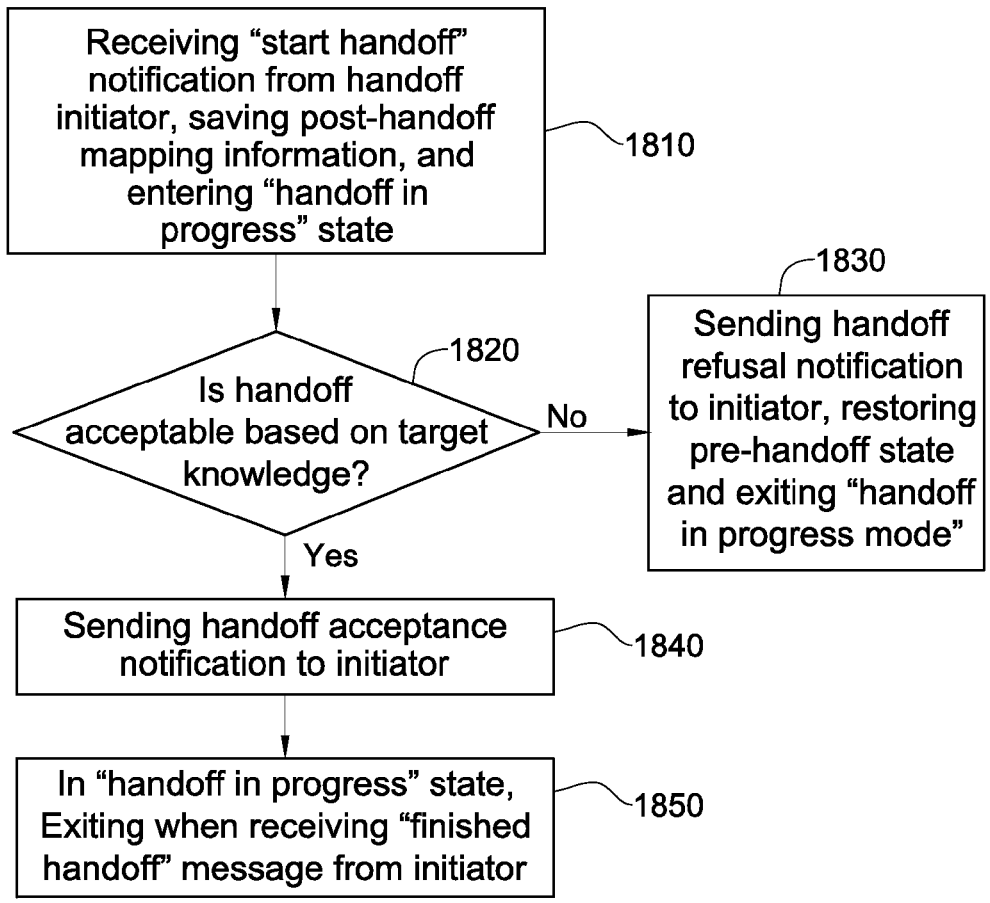
FIG. 35 is a flowchart illustrating a sequence of operations carried out for performing a cache handoff by a handoff target, according to certain examples of the presently disclosed subject matter.

Cache handoff module 2530 can be configured to perform various cache handoff related processes, as further detailed herein, inter alia with respect to FIGS. 34 and 35.

Figure 36:
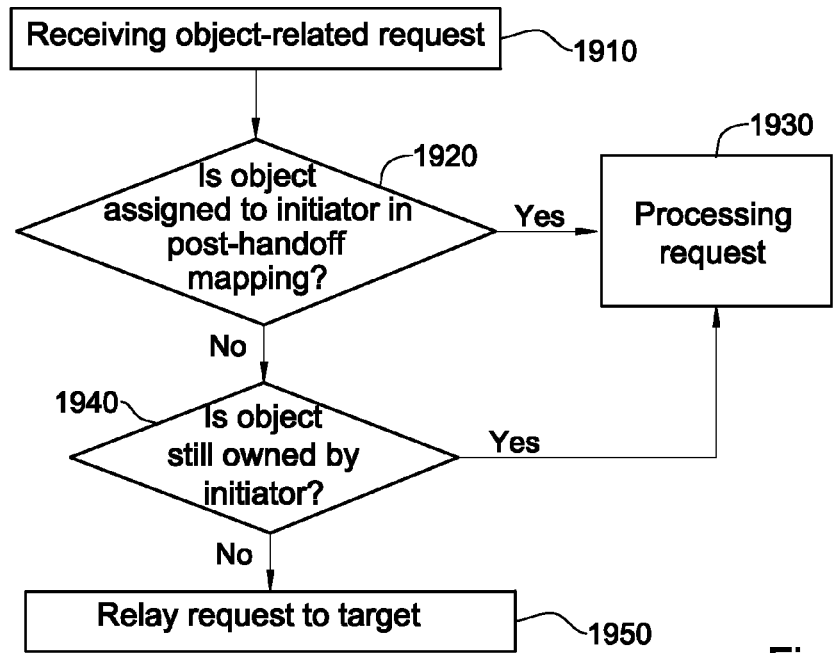
FIG. 36 is a flowchart illustrating a sequence of operations carried out for handling an object related request received by a handoff initiator during handoff, according to certain examples of the presently disclosed subject matter.
Figure 37:
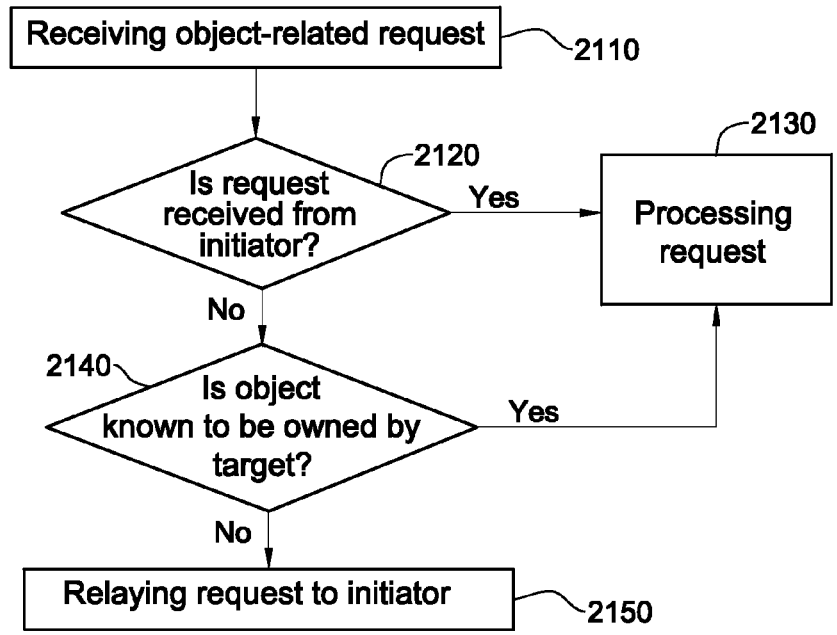
FIG. 37 is a flowchart illustrating a sequence of operations carried out for handling an object related request received by a handoff target during handoff, according to certain examples of the presently disclosed subject matter.

Object requests management module 2540 can be configured to manage object related requests received during handoff, as further detailed herein, inter alia with respect to FIGS. 36 and 37.

It is to be noted that according to some examples of the presently disclosed subject matter, some or all of the cache management module 397 modules can be combined and provided as a single module, or, by way of example, at least one of them can be realized in a form of two or more modules.

Attention is drawn to FIG. 31. FIG. 31 is a flowchart illustrating a sequence of operations carried out for managing local cache resources of a computer node, according to certain examples of the presently disclosed subject matter.

According to some examples of the presently disclosed subject matter, local cache resources management module 2510 can be configured to monitor various cache related parameters, including parameters of the cache resources connected to the computer node 205 (block 1510).

Cache related parameters 205 can include node-level cache related parameters corresponding to computer node 205 and/or resources (including cache resources) connected thereto (e.g. load parameters, performance parameters, presence parameters, availability parameters, faults parameters, capability parameters, response time parameters, connectivity parameters, costs parameters, location parameters, etc.). Cache related parameters can additionally or alternatively include object-level cache related parameters (e.g. location of the cached object, type of media on which the object is cached, etc.) pertaining to the cached objects (e.g. objects cached on the cache resources). Cache related parameters can still additionally or alternatively include external cache related parameters, such as parameters of various entities using the cache (e.g. client servers 218, etc.).

Local cache resources management module 2510 can be still further configured to receive third party recommendations (e.g. a recommendation from a remote computer node 205) to perform cache handoff (as further detailed below, inter alia with respect to FIG. 32). It is to be noted that such third party recommendations can include data of one or more cache related parameters, such data can in some cases include cache related parameters indicative of the reason according to which the third party recommends performing cache handoff. In case of receiving third party recommendations, local cache resources management module 2510 can be configured to determine if such received parameters are preferable (e.g. new and/or more updated parameters are received) over the locally known parameters (e.g. parameters stored on the UDSP data repository 330 associated with computer node 205), and if so—take them into consideration, in addition and/or instead of locally known parameters, in the following blocks.

It is to be noted that such monitoring can be performed periodically (e.g. according to a pre-defined time interval, for example, every minute, every five minutes, every hour, or any other pre-defined time interval), continuously (e.g. in a repeating loop, etc.), following a triggering event (e.g. connection/disconnection of a storage-related resource, including a cache resource, to/from the computer node 205, etc.), etc.

It is to be noted that in some cases, the monitoring of cache related parameters can be performed by local parameters monitoring module 360, as further detailed herein, inter alia with respect to FIG. 26.

In case a change in the value of one or more of the monitored parameters is detected and/or any new parameter is detected and/or any parameter is no longer detected (e.g. a certain cache resource is removed, etc.) and/or periodically (e.g. according to a pre-defined or calculated time interval, for example, every minute, every five minutes, every hour, or any other pre-defined time interval), local cache resources management module 2510 can be configured to check if the monitored parameters indicate a breach of one or more cache related requirements defined by one or more SLSs. Such a check can be performed, for example, by evaluating the monitored parameters in light of the SLSs associated with objects that are currently cached on the cache resource and/or objects that are mapped to the cache resource (using any of the mappings detailed herein), e.g. in light of the SLSs associated with the logical storage entities with which such objects are associated.

Local cache resources management module 2510 can be further configured to determine if the monitored parameters meet one or more First SLS-criteria such as one or more high watermarks (e.g. predefined maximal thresholds, calculated maximal thresholds, etc.), associated with such cache related SLSs, indicating nearing breaching (or breaching) of one or more such SLSs.

Local cache resources management module 2510 can be still further configured to determine if the monitored parameters indicate a breach or nearing such a breach (e.g. according to one or more First SLS-criteria such as one or more high watermarks) of one or more thresholds and/or SLSs that refer to the DSS 200 or parts thereof (e.g. maximal allowed site-level over-commit, maximal allowed overall over-commit, various security parameters, etc.) (block 1520).

It is to be noted that, for these purposes, local cache resources management module 2510 can be configured to retrieve the relevant SLSs from UDSP data repository 330.

If there is an SLS breach or an SLS is nearing being breached or there is breach of one or more parameters that refer to the DSS 200 or parts thereof, local cache resources management module 2510 can be configured to search one or more handoff targets (e.g. another, remote, computer node 205 having one or more cache resources 212, and/or one or more resources that can be used as a cache resource, connected thereto) to which the first, local, computer node 205 (the handoff initiator) is capable of transferring ownership (e.g. responsibility for handling) of one or more cache object spaces, so that all cache-related SLSs, and/or thresholds and/or SLSs that refer to the DSS 200 or parts thereof (e.g. maximal allowed site-level over-commit, maximal allowed overall over-commit, various security parameters, etc.), will be met post transfer (block 1530). Cache-related SLSs are any SLSs containing requirements that refer to, and/or affect, one or more cached objects, and/or one or more computer nodes 205 containing such objects and/or cache resources associated therewith, and/or any entity associated with such computer nodes 205.

It is to be noted that a handoff initiator can be responsible for handling one or more object spaces relating to one or more logical storage entities. A handoff (transfer of ownership) of one or more cache object spaces or portions thereof results in the handoff target receiving ownership of the transferred one or more cache object spaces, or portions thereof.

In some cases, local cache resources management module 2510 can be further configured to search for handoff targets to which the local computer node 205 (handoff initiator) is capable of transferring ownership of one or more cache object spaces, in some cases so that one or more Second SLS-criteria, such as the handoff target's mid watermarks (e.g. predefined middle thresholds, calculated middle thresholds, etc.), associated with one or more of the cache-related SLSs, are met.

Local cache resources management module 2510 can be further configured to check if one or more handoff targets are found (block 1540). If not, in some cases, local cache resources management module 2510 can be configured to report to a user that there are insufficient cache resources (insufficient resources error) and, optionally, recommend to a user, actions to be performed for allowing the cache resources to meet the requirements of the one or more cache-related SLSs (e.g. adding cache resources, etc.).

If one or more handoff targets are found, local cache resources management module 2510 can be configured to initiate a handoff process with one or more of the detected handoff targets (block 1560), as further detailed, inter alia with reference to FIG. 34. In some cases, following initiation of a handoff process, local cache resources management module 2510 can be configured to return to block 1510 and continue monitoring cache parameters.

It is to be noted that in some cases, as a non-limiting example, the selection of the one or more handoff targets can be performed by randomly selecting (or selecting according to any other rule, etc.) one or more of the possible handoff targets that were found in block 1530. As another non-limiting example, the selection of the one or more handoff targets can be performed by operating any type of ranking algorithm to rank the suitability of one or more of the possible handoff targets that were found in block 1530 and selecting the most suitable ones.

In case, following monitoring cache related parameters pertaining to cache resources connected to the local computer node 205, and/or to receipt of third party recommendations to perform cache handoff, there is no SLS breach or no crossing of one or more First SLS-criteria (e.g. a high watermark), local cache resources management module 2510 can be further configured to check if any of the monitored cache related parameters do not meet one or more Third SLS-criteria, such as low watermarks (e.g. predefined minimal thresholds, calculated minimal thresholds, etc.) associated with one or more cache-related SLSs and/or thresholds and/or SLSs that refer to the DSS 200 or parts thereof (e.g. maximal allowed site-level over-commit, maximal allowed overall over-commit, various security parameters, etc.), and, hence, it is considered underutilized (block 1570). If the local computer node's 205 cache resources are not underutilized, local cache resources management module 2510 can be configured to return to block 1510 and continue monitoring cache parameters.

If one or more of the local computer node's 205 cache resources, or parts thereof, are underutilized, local cache resources management module 2510 can be configured to search for one or more handoff targets to which the local computer node 205 is capable of transferring ownership of one or more cache object spaces, so that all cache-related SLSs and/or thresholds and/or SLSs that refer to the DSS 200 or parts thereof (e.g. maximal allowed site-level over-commit, maximal allowed overall over-commit, various security parameters, etc.) will be met post transfer (block 1580). In some cases, local cache resources management module 2510 can be further configured to search for handoff targets to which the local computer node 205 is capable of transferring ownership of one or more cache object spaces, so that the handoff target's Second SLSs criteria, such as mid watermarks (e.g. predefined middle thresholds, calculated middle thresholds, etc.), associated with one or more of the cache-related SLSs, are met.

It is to be noted that in some cases, as a non-limiting example, the selection of the one or more handoff targets can be performed by randomly selecting (or selecting according to any other rule, etc.) one or more of the possible handoff targets that were found in block 1530. As another non-limiting example, the selection of the one or more handoff targets can be performed by operating any type of ranking algorithm (such as algorithms that promote consolidation of cached object mappings, etc.) to rank the suitability of one or more of the possible handoff targets that were found in block 1530 and selecting the most suitable ones.

It is to be noted that such transfer of cached objects can result in releasing cache resources that can be, for example, utilized, if possible, for other purposes, either of the DSS 200 or of any other entity. Such transfer of cached objects can also result in enabling turning off the cache resources if they are entirely released (no more objects are cached thereon and no entity is using it), thus resulting in reduction of power consumption.

Local cache resources management module 2510 can be further configured to check if one or more handoff targets are found (block 1590). If one or more handoff targets are found, local cache resources management module 2510 can be configured to initiate a handoff process with one or more of the detected handoff targets (block 1560), as further detailed, inter alia with reference to FIG. 34.

In some cases, following initiation of a handoff process, local cache resources management module 2510 can be configured to return to block 1510 and continue monitoring cache parameters.

It is to be noted, with reference to FIG. 31, that some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

Attention is now drawn to FIG. 32, illustrating a sequence of operations carried out for monitoring remote cache resources of remote computer nodes, according to certain examples of the presently disclosed subject matter.

According to some examples of the presently disclosed subject matter, remote cache resources monitoring module 2520 can be configured to monitor various cache related parameters, including parameters of the cache resources connected to one or more remote computer node 205 (block 1510). Cache related parameters 205 can include node-level cache related parameters of remote computer nodes 205 and/or resources (including cache resources) connected thereto (e.g. load parameters, performance parameters, presence parameters, availability parameters, faults parameters, capability parameters, response time parameters, connectivity parameters, costs parameters, location parameters, etc.). Cache related parameters can additionally or alternatively include object-level cache related parameters (e.g. location of the cached object, type of media on which the object is cached, etc.) pertaining to the cached objects. Cache related parameters can still additionally or alternatively include external cache related parameters, such as parameters of various entities using the cache (e.g. client servers 218, etc.) (block 1610).

For this purpose, remote cache resources monitoring module 2520 can be configured to retrieve relevant cache related parameters from UDSP data repository 330.

Remote cache resources monitoring module 2520 can be configured to utilize such parameters in order to determine if one or more handoff recommendations should be issued (block 1620).

It is to be noted that a handoff recommendation should be issued, for example, if the monitored cache related parameters indicate a breach or are nearing such a breach (e.g. according to one or more First SLS-criteria such as one or more high watermarks) of one or more cache related SLSs (any SLSs containing requirements that refer to, and/or affect, one or more cached objects, and/or one or more computer nodes 205 containing such objects and/or cache resources associated therewith, and/or any entity associated with such computer nodes 205) and/or thresholds and/or SLSs that refer to the DSS 200 or parts thereof (e.g. maximal allowed site-level over-commit, maximal allowed overall over-commit, various security parameters, etc.).

As another example, in some cases, a handoff recommendation should be issued if any of the monitored cache related parameters crossed one or more Third SLS-criteria, such as low watermarks (e.g. predefined minimal thresholds, calculated minimal thresholds, etc.) and, hence, it is considered underutilized, etc.

It is to be noted that, for this purpose, remote cache resources management module 2520 can be configured to retrieve the relevant SLSs from UDSP data repository 330.

If a handoff recommendation should be issued, remote cache resources monitoring module 2520 can be configured to issue such a notification to one or more computer nodes 205 whose monitored parameters indicate an SLS breach, nearing such a breach or underutilization as detailed herein (block 1630).

In some cases, remote cache resources monitoring module 2520 can be configured to additionally or alternatively provide one or more handoff instructions. A handoff recommendation can be refused by a handoff target/initiator whilst a handoff instruction can be a command to perform cache handoff. In some cases such a handoff instruction can be issued to one or more handoff initiators, causing it to search for a handoff target and initiate a handoff therewith. In some cases, such a handoff instruction can be issued to one or more handoff initiators and one or more respective handoff targets with which a handoff can be performed, causing the one or more handoff initiators to initiate a handoff with the respective one or more handoff targets.

It is to be noted, with reference to FIG. 32, that some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

Figure 33:
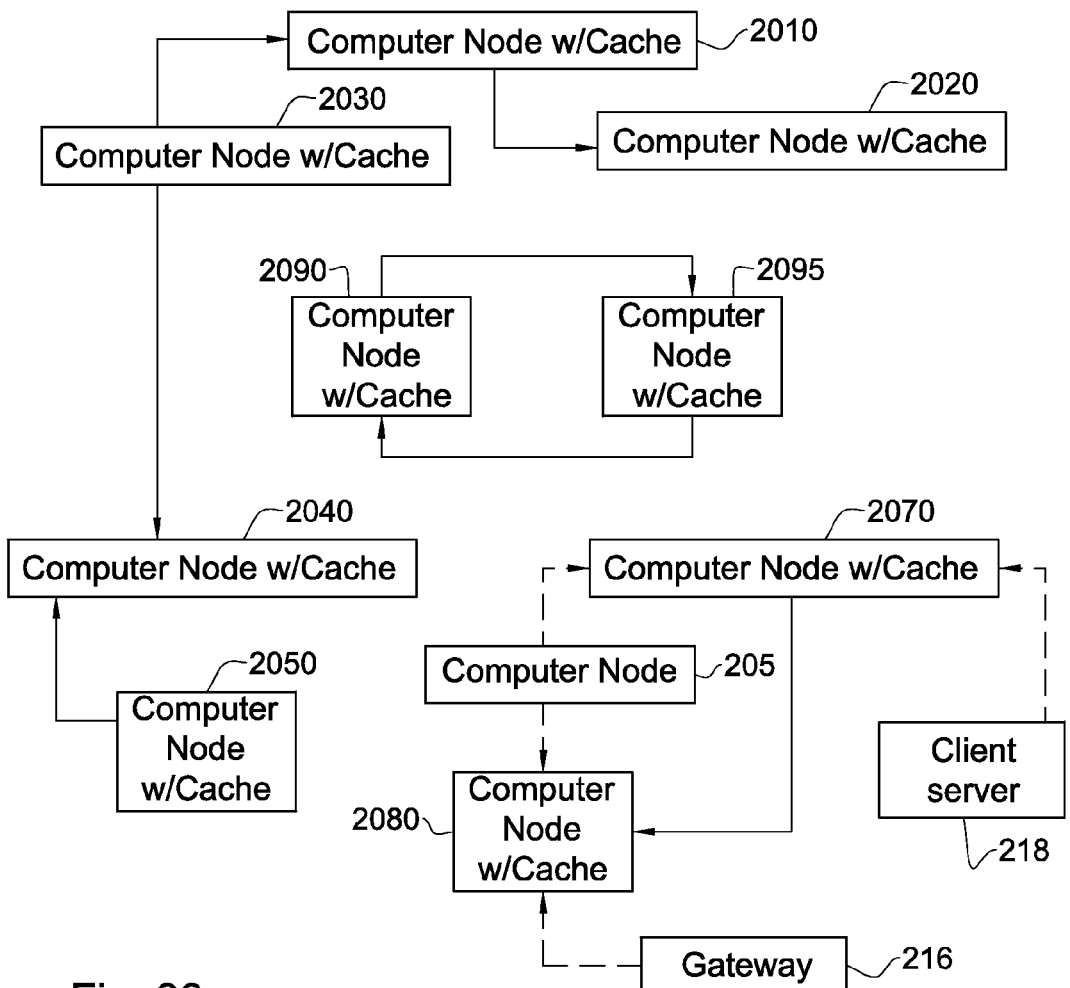
FIG. 33 schematically illustrates various scenarios of distributing cache resources, according to an exemplary embodiment of the invention.

Attention is now drawn to FIG. 33, illustrating various scenarios of distributing cache resources, according to an exemplary embodiment of the invention.

Looking at FIG. 33, it can be appreciated that computer node w/cache 2010 (when reference is made to a computer node w/cache, it refers to a computer node 205 having cache resources connected thereto), can, in some cases, act as a handoff initiator transferring ownership of one or more cache object spaces or parts thereof to computer node w/cache 2020, and as a handoff target receiving ownership of one or more cache object spaces, or parts thereof, for example from computer node w/cache 2030. It is to be noted that in some cases, computer node w/cache 2010 can simultaneously act as a handoff initiator and as a handoff target.

In some cases a certain computer node w/cache, e.g. computer node w/cache 2030 can act as a handoff initiator performing handoff with more than one other handoff targets, e.g. with computer node w/cache 2010 and computer node w/cache 2040, in some cases simultaneously.

In some cases a certain computer node w/cache, e.g. computer node w/cache 2040 can act as a handoff target performing handoff with more than one other handoff initiators, e.g. with computer node w/cache 2030 and computer node w/cache 2050, in some cases simultaneously.

In some cases a certain computer node w/cache, e.g. computer node w/cache 2090 can act as a handoff target performing handoff with a handoff initiator, e.g. with computer node w/cache 2095 and act as a handoff initiator performing handoff with the same handoff initiator, e.g. with computer node w/cache 2095, now acting as a handoff target, in some cases simultaneously. Thus, for example, computer node w/cache 2095 can initiate a handoff with computer node w/cache 2090, while computer node w/cache 2090 can initiate a handoff with computer node w/cache 2095, in some cases simultaneously.

In some cases a certain computer node (with or without cache resources connected thereto), e.g. computer node 205, can be configured to recommend one or more computer nodes w/cache, e.g. computer node w/cache 2080 and computer node w/cache 2070, to initiate one or more handoffs with one or more handoff targets.

In some cases a certain client server, e.g. client server 218, can be configured to recommend one or more computer nodes w/cache, e.g. computer node w/cache 2070, to initiate one or more handoffs with one or more handoff targets.

In some cases a certain gateway resource, e.g. gateway resource 216, can be configured to recommend one or more computer nodes w/cache, e.g. computer node w/cache 2080, to initiate one or more handoffs with one or more handoff targets (such handoffs in which computer node w/cache 2080 is initiating a handoff according to such a recommendation are not shown in the drawing).

In some cases a certain computer node w/cache, e.g. computer node w/cache 2070 and computer node w/cache 2080, can be configured to receive one or more recommendations from one or more computer nodes (with or without cache resources connected thereto) and/or client servers and/or gateway resources, e.g. computer node 205, gateway resource 216, client server 218, to initiate one or more handoffs with one or more handoff targets.

In some cases a certain computer node w/cache, e.g. computer node w/cache 2070, can be configured to receive one or more recommendations from one or more computer nodes (with or without cache resources connected thereto) and/or client servers and/or gateway resources, e.g. computer node 205, client server 218, to initiate one or more handoffs with one or more handoff targets, and act as a handoff initiator transferring ownership of one or more cache object spaces or parts thereof to another computer node w/cache, e.g. computer node w/cache 2080, in some cases simultaneously.

It is to be noted, as any person of ordinary skill in the art can appreciate, that the scenarios exemplified above are mere examples and numerous other scenarios, not presented in the illustration provided in FIG. 33, can exist.

Attention is now drawn to FIG. 34, illustrating a sequence of operations carried out for performing a cache handoff by a handoff initiator, according to certain examples of the presently disclosed subject matter.

According to some examples of the presently disclosed subject matter, cache handoff module 2530 associated with a handoff initiator (a computer node 205 having cache resources connected thereto that is initiating transfer of ownership of one or more cache object spaces, or parts thereof, to another computer node 205 having cache resources connected thereto) can be configured to start handoff of ownership of one or more cache object spaces, or parts thereof (block 1710).

For this purpose, cache handoff module 2530 can be configured to create a new post-handoff cache mapping indicative of the post handoff location of each of the cache object spaces, or parts thereof affected by the handoff process (block 1720).

It is to be noted that each client server 218 (or any other user of DSS 200) can have one or more local cache mappings indicative of one or more computer nodes 205 handling cache object spaces, relating to one or more logical storage entities to which the client server 218 (or any other user of DSS 200) refers. It can be appreciated that cache handoffs require updating of such one or more cache mappings accordingly, as further detailed, inter alia with reference to block 1770.

In some non-limiting examples, such cache mapping can be described by using a hierarchical structure of partitioning functions that reflects, in a compact manner, any partitioning, merge and location changes of the cache object spaces, resulting from handoff processes. Some examples of such partitioning functions are hash functions, splitting odd and even addressed objects, etc. It is to be noted that such cache mapping description manners and such partitioning functions are mere examples and any other known method and/or techniques can be utilized additionally or alternatively.

Cache handoff module 2530 can be further configured to enter a "handoff in progress" state, for example by setting a local flag indicative of such a state (block 1730), and send a "handoff start" notification, including the post-handoff cache mapping, to a handoff target (a computer node 205 having cache resources connected thereto that is selected to receive ownership of one or more cache object spaces or parts thereof, from the handoff initiator) to which the handoff is requested, indicative of its request to initiate a handoff process therewith (block 1740). Cache handoff module 2530 can be further configured to wait (e.g. for a predetermined or calculated time-frame, etc.) for a response to the handoff request from the handoff target. It is to be noted that a handoff target can accept such a handoff request, refuse such a handoff request, or partially accept such a handoff request (e.g. accept receiving ownership of only part of the one or more cache object spaces or parts thereof that the handoff initiator is trying to transfer thereto, etc.).

Cache handoff module 2530 can be also configured to check if the handoff request has been accepted by the handoff target (block 1750). If the handoff request has been refused (or, in some cases, if no response was received within a pre-determined time-frame, etc.), cache handoff module 2530 can be configured to exit the "handoff in progress" state (block 1760).

If however, the request was accepted, cache handoff module 2530 can be configured to send the post-handoff cache mapping to one or more client servers 218 (or any other relevant user of DSS 200), for example to client servers 218 that are associated with the one or more cache object spaces (e.g. that have access rights to the logical storage entities associated therewith), or parts thereof, to be transferred (block 1770). It is to be noted that in some cases, the new cache mapping can be sent to every client server 218 (or any other relevant user of DSS 200) connected to DSS 200.

In addition, cache handoff module 2530 can be configured to transfer ownership of non-dirty cached objects (cache objects that were not modified since last saved to persistent storage associated with the relevant cache object space) that have been mapped to the handoff target in the post handoff cache mapping, to the handoff target, for example by sending such cached objects (e.g. by transmitting their data) to the handoff target and/or by "forgetting" them (e.g. by marking them as deleted or physically deleting them from the handoff initiator's cache resources) (block 1780).

Still additionally, cache handoff module 2530 can be configured to transfer ownership of dirty cache objects (cache objects that were modified since last saved to persistent storage associated with the relevant cache object space) that are mapped to the handoff target in the post-handoff cache mapping, by flushing them (saving them to the persistent storage associated with the relevant cache object space) and/or by sending such cached objects (e.g. by transmitting their data) to the handoff target, and then "forgetting" them (block 1790).

In some cases, cache handoff module 2530 can be further configured to send a "handoff finished" notification to the handoff target, indicating that the handoff has been performed (block 1795), and to exit the "handoff in progress" state (block 1760). In some cases, block 1795 can be performed only after execution of blocks 1780 and 1790 is completed.

It is to be noted, with reference to FIG. 34, that some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

Attention is now drawn to FIG. 35, illustrating a sequence of operations carried out for performing a cache handoff by a handoff target, according to certain examples of the presently disclosed subject matter.

According to some examples of the presently disclosed subject matter, cache handoff module 2530 associated with a handoff target can be configured to receive a "handoff start" notification (including the post-handoff cache mapping) from a handoff initiator, save a backup copy of the local pre-handoff cache mapping, update the cache mapping according to the post-handoff cache mapping received from the handoff initiator and enter a "handoff in-progress" state (block 1810).

Cache handoff module 2530 can, in some cases, be further configured to check if the handoff request received from the handoff initiator is acceptable (block 1820), for example according to the handoff target knowledge of cache-related SLSs, and/or thresholds and/or SLSs that refer to the DSS 200 or parts thereof (e.g. maximal allowed site-level over-commit, maximal allowed overall over-commit, various security parameters, etc.), and/or cache-related parameters stored in the UDSP data repository 330 associated with it.

It can be appreciated that in some cases a handoff target can have access to information about the cache-related SLSs, and/or thresholds and/or SLSs that refer to the DSS 200 or parts thereof (e.g. maximal allowed site-level over-commit, maximal allowed overall over-commit, various security parameters, etc.), and/or cache-related parameters associated therewith and/or with the cache resources connected thereto, different than such information that the handoff initiator has access to (and in some cases, new and/or more updated information). For example, in some cases, by the time that a handoff request is received by a handoff target, one or more parameters relating to the cache resources connected thereto have already changed.

If the handoff request is not acceptable (e.g. based on the handoff target knowledge), cache handoff module 2530 can be configured to send a refusal notification to the handoff initiator (indicating that the handoff target does not accept the handoff request sent by the handoff initiator), restore the local pre-handoff cache mapping (saved for backup in block 1810), and exit the "handoff in-progress" state (block 1830).

If the handoff request is acceptable, cache handoff module 2530 can be configured to send an acceptance notification to the handoff initiator (indicating that the handoff target accepts the handoff request sent by the handoff initiator) (block 1840). In such cases, cache handoff module 2530 can be configured to wait for a "handoff finished" notification, indicating that the one or more cache object space, or parts thereof, have been transferred to the responsibility of the handoff target, and once such a notification is received, exit the "handoff in-progress" state (block 1850).

It is to be noted, with reference to FIG. 35, that some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

Attention is now drawn to FIG. 36, illustrating a sequence of operations carried out for handling an object related request received by a handoff initiator during handoff, according to certain examples of the presently disclosed subject matter.

According to some examples of the presently disclosed subject matter, object requests management module 2540 associated with a handoff initiator can be configured receive an object related request (e.g. a read/write request) relating to an object within the pre-handoff and/or post-handoff cache mappings, for example from a client (e.g. a client server 218, a gateway resource 216, or any other source), during handoff (block 1910).

It is to be noted that in some cases, the requesting client can send the request prior to updating its local cache mapping according to the post-handoff cache mapping (as, in some cases, the post-handoff cache mapping is not received by the client immediately, for example due to heavy traffic on the network or for any other reason). Thus such an object related request can be sent to the handoff initiator while the requested object is no longer owned (e.g. handled) by it. Accordingly, upon receipt of such an object related request, object requests management module 2540 can be configured to check if the requested object is under the ownership of the handoff initiator according to the post-handoff cache mapping (block 1920) and if so—object requests management module 2540 can be configured to process the request (block 1930).

However, if the handoff initiator is not the owner of the requested object according to the post-handoff cache mapping, then object requests management module 2540 can be configured to check if the requested object is still under the ownership of the handoff initiator (e.g. as the handoff initiator did not transfer the ownership over the requested object yet) (block 1940).

If such a requested object is still owned by the handoff initiator, object requests management module 2540 can be configured to process the request (block 1930). However, if such a requested object is no longer owned by the handoff initiator, object requests management module 2540 can be configured to relay the object related request to the handoff target (block 1950).

It is to be noted, with reference to FIG. 36, that some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

Attention is now drawn to FIG. 37, illustrating a sequence of operations carried out for handling an object related request, relating to an object included in the post-handoff cache mapping, received by a handoff target during handoff, according to certain examples of the presently disclosed subject matter.

According to some examples of the presently disclosed subject matter, object requests management module 2540 associated with a handoff target can be configured to receive an object related request (e.g. a read/write request) relating to an object within the post-handoff cache mappings, for example from a client (e.g. a client server 218, a gateway resource 216, or any other source) or from a handoff initiator (block 2110). Upon receipt of such a request, object requests management module 2540 can be configured to check if the request originated from a handoff initiator (block 2120).

As indicated herein, a handoff initiator will relay an object related request to a handoff target following a determination that the handoff initiator is not the owner of the requested object according to the post-handoff cache mapping and that the handoff initiator is not the current owner of the requested object (an indication that the handoff initiator is still the owner can be, for example, that the object is still dirty in the handoff initiator's cache, etc.). Thus, whenever the request originates from a handoff initiator, object requests management module 2540 can be configured to process the request (block 2130), as this indicates that the handoff initiator has already transferred ownership of the requested object to the handoff target.

If the request did not originate from a handoff initiator, object requests management module 2540 can be configured to check if the requested object is owned by the handoff target (as, for example, the handoff target has already received ownership of the requested object from the handoff initiator, etc.) (block 2140). If it is owned by the handoff target, object requests management module 2540 can be configured to process the request (block 2130).

If the requested object is not owned by the handoff target (as, for example, the requested object ownership was not yet transferred and the handoff process did not end), object requests management module 2540 can be configured to relay the request to the handoff initiator (block 2150). It is to be noted that such scenario can result, for example, from the fact that a certain user can have an updated post-handoff cache mapping, indicating that the requested object is mapped to the handoff target, whereas, while it requests the requested object, the handoff process is still on-going and thus the requested object ownership was not yet transferred to the handoff target.

It is to be noted, with reference to FIG. 37, that some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a machine-readable memory tangibly embodying a program of instructions executable by the machine for executing the method of the presently disclosed subject matter.

The invention claimed is:

1. A method for recovering from a disaster at a primary storage site, the method comprising:
   (a) selecting a target storage site;
   (b) triggering a consistency check within at least two Disaster Recovery (DR) storage sites storing DR enabling data, each DR storage site storing a portion of said DR enabling data, wherein at least one of said DR storage sites is a remote storage site, and wherein said consistency check is performed for a selected flushed generation number;
   (c) receiving a consistency response from each of said at least two DR storage sites, and, based on said consistency responses, determining, for each of said at least two DR storage sites, consistent DR storage sites of said at least two DR storage sites for said generation number;
   (d) in case said portions of said DR enabling data stored on said consistent DR storage sites enable recovery of at least a portion of data that is inaccessible in said primary storage site, utilizing said portions of said DR enabling data in order to recover, to said target storage site, at least said portion of said data that is inaccessible in said primary storage site as of said generation number;
   (e) in case said portions of said DR enabling data stored on said consistent DR storage sites do not enable recovery of at least said portion of said data that is inaccessible in said primary storage site, iteratively executing stages (b) to (d), each time with respect to an earlier flushed generation number than the generation number of the previous iteration, until finding a consistent generation number.

2. The method of claim 1 wherein said selected generation number is a highest generation number out of a plurality of flushed generation numbers.

3. The method of claim 1 wherein said portions of said DR enabling data are received by said DR storage sites asynchronously.

4. The method of claim 1 wherein said consistency response comprises a counter indicative of a sum of a number of successful write operations and overwrite counters associated therewith, wherein said write operations having a write generation number between said selected flushed generation number and said earlier flushed generation number.

5. A computer node configured to recover from a disaster at a primary storage site, said computer node comprising at least one processing resource configured to:
   (a) select a target storage site;
   (b) trigger a consistency check within at least two Disaster Recovery (DR) storage sites storing DR enabling data, each DR storage site storing a portion of said DR enabling data, wherein at least one of said DR storage sites is a remote storage site, and wherein said consistency check is performed for a selected flushed generation number;
   (c) receive a consistency response from each of said at least two DR storage sites, and, based on said consistency responses, determine, for each of said at least two DR storage sites, consistent DR storage sites of said at least two DR storage sites for said generation number;
   (d) in case said portions of said DR enabling data stored on said consistent DR storage sites enable recovery of at least a portion of data that is inaccessible in said primary storage site, utilize said portions of said DR enabling data in order to recover, to said target storage site, at least said portion of said data that is inaccessible in said primary storage site as of said generation number;
   (e) in case said portions of said DR enabling data stored on said consistent DR storage sites do not enable recovery of at least said portion of said data that is inaccessible in said primary storage site, iteratively execute stages (b) to (d), each time with respect to an earlier flushed generation number than the generation number of the previous iteration, until finding a consistent generation number.

6. The computer node of claim 5 wherein said selected generation number is a highest generation number out of a plurality of flushed generation numbers.

7. The computer node of claim 5 wherein said portions of said DR enabling data are received by said DR storage sites asynchronously.

8. The computer node of claim 5 wherein said consistency response comprises a counter indicative of a sum of a number of successful write operations and overwrite counters associated therewith, wherein said write operations having a write generation number between said selected flushed generation number and said earlier flushed generation number.

9. A method for recovering from a disaster at a primary storage site, the method comprising:
   (a) selecting a target storage site;
   (b) triggering a consistency check within at least two Disaster Recovery (DR) storage sites storing DR enabling data, each DR storage site storing a portion of said DR enabling data, wherein at least one of said DR storage sites is a remote storage site, and wherein said consistency check is performed for a generation number following an acknowledged consistent generation number;

(c) receiving a consistency response from each of said at least two DR storage sites, and, based on said consistency responses, determining, for each of said at least two DR storage sites, consistent DR storage sites of said at least two DR storage sites for said generation number;

(d) in case said portions of said DR enabling data stored on said consistent DR storage sites enable recovery of at least a portion of data that is inaccessible in said primary storage site, marking said generation number as a consistent generation number;

(e) iteratively executing stages (b) to (d), each time for a following generation number if said at least two DR storage sites are consistent for said generation number;

(f) utilizing said portions of said DR enabling data in order to recover, to said target storage site, at least said portion of said data that is inaccessible in said primary storage site as of said generation number.

10. The method of claim 9 wherein said selected generation number is a highest generation number out of a plurality of flushed generation numbers.

11. The method of claim 9 wherein said portions of said DR enabling data are received by said DR storage sites asynchronously.

12. The method of claim 9 wherein said consistency response comprises a counter indicative of a sum of a number of successful write operations and overwrite counters associated therewith, wherein said write operations having a write generation number between said selected flushed generation number and said earlier flushed generation number.

13. A computer node configured to recover from a disaster at a primary storage site, said computer node comprising at least one processing resource configured to:

(a) select a target storage site;

(b) trigger a consistency check within at least two Disaster Recovery (DR) storage sites storing DR enabling data, each DR storage site storing a portion of said DR enabling data, wherein at least one of said DR storage sites is a remote storage site, and wherein said consistency check is performed for a generation number following an acknowledged consistent generation number;

(c) receive a consistency response from each of said at least two DR storage sites, and, based on said consistency responses, determine, for each of said at least two DR storage sites, consistent DR storage sites of said at least two DR storage sites for said generation number;

(d) in case said portions of said DR enabling data stored on said consistent DR storage sites enable recovery of at least a portion of data that is inaccessible in said primary storage site, marking said generation number as a consistent generation number;

(e) iteratively executing stages (b) to (d), each time for a following generation number if said at least two DR storage sites are consistent for said generation number;

(f) utilizing said portions of said DR enabling data in order to recover, to said target storage site, at least said portion of said data that is inaccessible in said primary storage site as of said generation number.

14. The computer node of claim 13 wherein said selected generation number is a highest generation number out of a plurality of flushed generation numbers.

15. The computer node of claim 13 wherein said portions of said DR enabling data are received by said DR storage sites asynchronously.

16. The computer node of claim 13 wherein said consistency response comprises a counter indicative of a sum of a number of successful write operations and overwrite counters associated therewith, wherein said write operations having a write generation number between said selected flushed generation number and said earlier flushed generation number.

* * * * *